US006810332B2

(12) United States Patent
Harrison

(10) Patent No.: US 6,810,332 B2
(45) Date of Patent: Oct. 26, 2004

(54) METHOD FOR COMPUTING COMPLEXITY, CONFIDENCE AND TECHNICAL MATURITY INDICES FOR RESERVOIR EVALUATIONS

(75) Inventor: Christopher J. Harrison, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/356,266

(22) Filed: Jan. 31, 2003

(65) Prior Publication Data

US 2004/0158406 A1 Aug. 12, 2004

(51) Int. Cl.[7] ................................................ G01N 15/08

(52) U.S. Cl. ........................................... 702/13; 703/10

(58) Field of Search ............................ 703/10; 700/28; 702/9, 13, 16, 14, 12, 6; 705/8; 166/250.15

(56) References Cited

U.S. PATENT DOCUMENTS

| | | | | | |
|---|---|---|---|---|---|
| 5,695,720 | A | * | 12/1997 | Wade et al. | 422/82 |
| 6,101,447 | A | * | 8/2000 | Poe | 702/13 |
| 6,236,894 | B1 | * | 5/2001 | Stoisits et al. | 700/28 |
| 6,266,619 | B1 | * | 7/2001 | Thomas et al. | 702/6 |
| 6,272,434 | B1 | * | 8/2001 | Wisler et al. | 702/9 |
| 6,549,854 | B1 | | 4/2003 | Malinverno et al. | 702/16 |
| 6,549,879 | B1 | * | 4/2003 | Cullick et al. | 703/10 |
| 6,587,791 | B2 | | 7/2003 | Dablain et al. | 702/16 |
| 6,625,577 | B1 | | 9/2003 | Jameson | 705/8 |
| 2002/0013687 | A1 | * | 1/2002 | Ortoleva | 703/10 |
| 2002/0099505 | A1 | * | 7/2002 | Thomas et al. | 702/12 |
| 2002/0100584 | A1 | | 8/2002 | Couet et al. | 166/250.15 |
| 2003/0074138 | A1 | | 4/2003 | Dablain et al. | 702/14 |

FOREIGN PATENT DOCUMENTS

| | | | | | |
|---|---|---|---|---|---|
| GB | 2227860 | A | * | 8/1990 | G06F/15/20 |

OTHER PUBLICATIONS

Author: Assistum Software Inc, Title Date: The Assistum Newsletter dated Sep. 2000, Publisher: Assistum Inc., vol.: Issue 2, Pertinent Pages: pp. 1–18.*

Dromgoole, P., and Speers. R, Managing Uncertainty in Oilfield Reserves. 1992 http://www.slb.com/oilfield/Docs/connect/reference/Middle_East_Well_Evaluation/wert12/rel_pub_mewer12_3.pdf, Oct. 31, 2003 retrieved.

(List continued on next page.)

*Primary Examiner*—John Barlow
*Assistant Examiner*—Victor J. Taylor
(74) *Attorney, Agent, or Firm*—Richard J. Schulte

(57) ABSTRACT

A method for computing complexity, confidence and technical maturity indices for the evaluation of a reservoir is disclosed. The method comprising the steps of (a) making estimates of reservoir components which are associated with a subsurface reservoir evaluation; (b) making estimates of confidence values for the estimates of the reservoir components; and (c) computing an evaluation index for the evaluation of the reservoir based upon at least one of the estimates of the reservoir components and the estimates of the confidence values. Complexity and confidence scores are assigned to the respective estimates of the reservoir components and estimates of confidence values. These scores are combined to produce complexity and confidence indices. This evaluation tool is intended to help improve the assessment of the reliability of probabilistic reservoir production forecasts. The tool provides an indicator of the reliability of the forecast production profiles and reserves estimations. Moreover, a list of the uncertainties in the subsurface evaluation is ranked by likely impact on forecasts.

28 Claims, 10 Drawing Sheets

OTHER PUBLICATIONS

Sandsdalen, C., Barbieri, M., Tyler, K., and Aasen, J.O., Applied Certainty Analysis Using Stochastic Modeling, Society of Petroleum Engineers (SPE 35533), 361–369, 1996.

Dromgoole, P., and Speers, R., Geoscore: A Method For Quantifying Uncertainty in Field Reserve Estimates, Petroleum Geoscience, vol. 3, 1–12, 1997.

Lia, O., Omre, H., Tjemeland, H., Holden, L., and Egeland, T., Uncertainties in Reservoir Production Forecasts, AAPG Bulletin, vol. 81, No. 5, 775–802, May 1997.

Coore, B., Thore, P., De Feraudy, V., and Vincent, G., Integrated Uncertainty Assessment For Project Evaluation and Risk Analysis, Society of Petroleum Engineers (SPE 65205), 1–9, 2000.

Floris, F.J.T., Bush, M.D., Cuypers, M., Roggero, F., and Syversveen, A.–R., Methods For Quantifying The Uncertainty of Production Forecasts: A Comparative Study, Petroleum Geoscience, vol. 7, S87–S96, 2001.

* cited by examiner

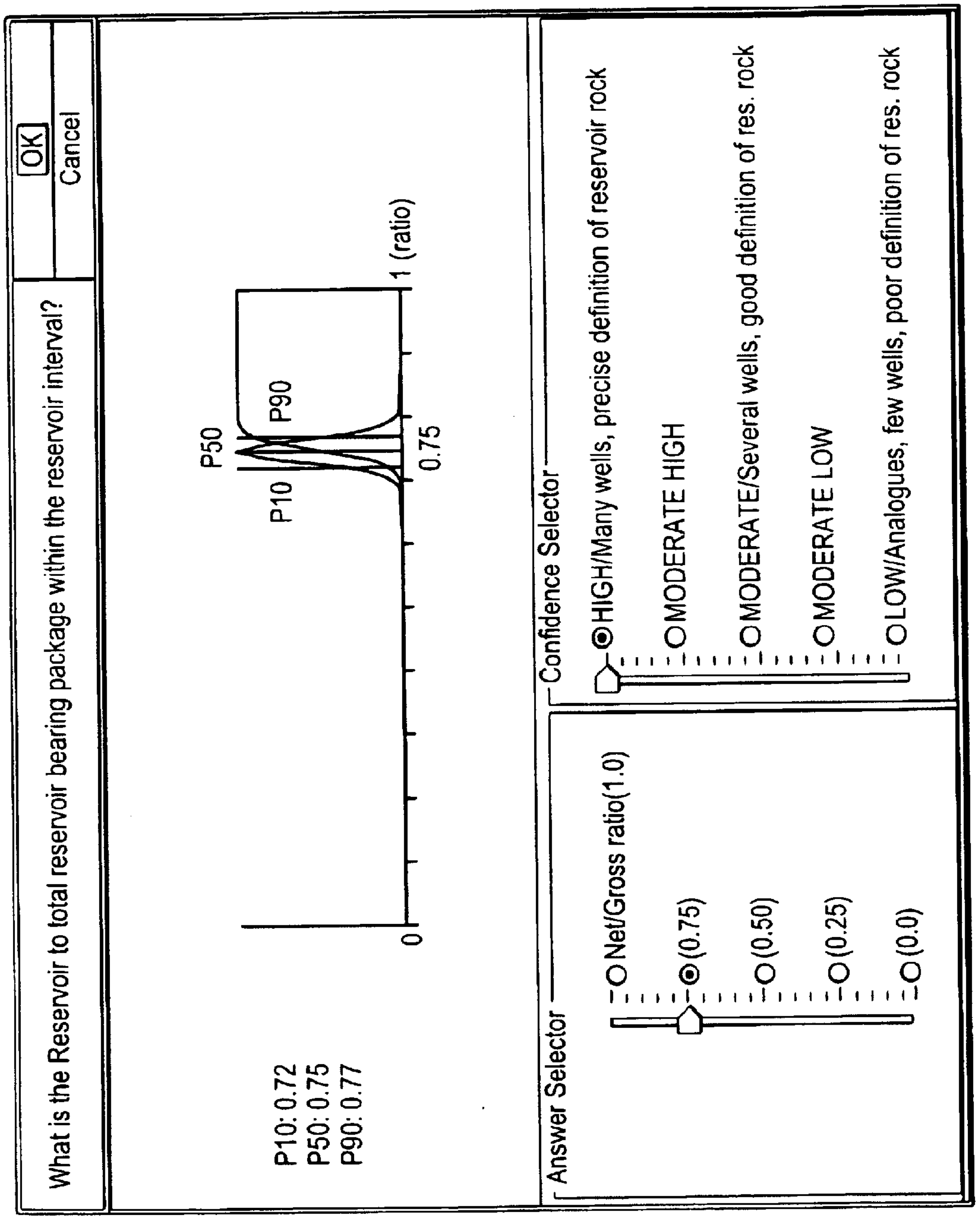

FIG. 5A

What is the Reservoir to total reservoir bearing package within the reservoir interval?

OK
Cancel

P10: 0.72
P50: 0.75
P90: 0.77

P10  P50  P90
0                    0.75    1 (ratio)

Answer Selector
○ Net/Gross ratio(1.0)
● (0.75)
○ (0.50)
○ (0.25)
○ (0.0)

Confidence Selector
● HIGH/Many wells, precise definition of reservoir rock
○ MODERATE HIGH
○ MODERATE/Several wells, good definition of res. rock
○ MODERATE LOW
○ LOW/Analogues, few wells, poor definition of res. rock

| MI_Wts LUT | Dynamic Q. | (Primary / 2ndary) | (5 yr recovery) | (Total rec) | (Aquifer size) | (Aquifer imp) | (Bubble Pt) | (Res Force) | (Mobility) | (Fractures) |
|---|---|---|---|---|---|---|---|---|---|---|
| Static Q. | Ideal conf | MI Wt | MI Wt | MI Wt | MI Wt | MI Wt | MI Wt | MI Wt | MI Wt | MI Wt |
| (Depth) | 5 | 0 | 0 | 0 | 0 | 0 | 0 | 0 | 0 | 0 |
| (DipAvg) | 5 | 0 | 2 | 1 | 0 | 0 | 0 | 0 | 0 | 0 |
| (DipVar) | 5 | 0 | 0 | 0 | 0 | 0 | 0 | 0 | 0 | 0 |
| (Form) | 5 | 0 | 0 | 0 | 0 | 0 | 0 | 0 | 0 | 0 |
| (FltTrap) | 5 | 0 | 0 | 0 | 0 | 0 | 0 | 0 | 0 | 0 |
| (CombTrap) | 5 | 0 | 0 | 0 | 0 | 0 | 0 | 0 | 0 | 0 |
| (FltStyle) | 5 | 0 | 0 | 0 | 0 | 0 | 0 | 0 | 0 | 0 |
| (FltTiming) | 5 | 0 | 0 | 0 | 0 | 0 | 0 | 0 | 0 | 0 |
| (Ncmprt) | 5 | 1 | 3 | 2 | 0 | 0 | 0 | 0 | 0 | 0 |
| (Npenetr) | 5 | 1 | 2 | 1 | 0 | 0 | 0 | 0 | 0 | 0 |
| (DepoSystem) | 5 | 0 | 0 | 0 | 0 | 0 | 0 | 0 | 0 | 0 |
| (ClasticDepoEnv) | 5 | 0 | 0 | 0 | 0 | 0 | 0 | 0 | 0 | 0 |
| (Net-to-Gross) | 5 | 0 | 0 | 0 | 0 | 0 | 0 | 0 | 0 | 0 |
| (AvGrThick) | 5 | 0 | 0 | 0 | 0 | 0 | 0 | 0 | 0 | 0 |
| (Nunits) | 5 | 1 | 2 | 2 | 0 | 0 | 0 | 0 | 0 | 0 |
| (P_comm) | 5 | 1 | 1 | 1 | 0 | 0 | 0 | 0 | 0 | 0 |
| (FU_var) | 5 | 0 | 0 | 0 | 0 | 0 | 0 | 0 | 0 | 0 |
| (RT_prop) | 5 | 0 | 0 | 0 | 0 | 0 | 0 | 0 | 0 | 0 |
| (RT_pay) | 5 | 0 | 0 | 0 | 0 | 0 | 0 | 0 | 0 | 0 |
| (MedPerm) | 5 | 3 | 3 | 2 | 0 | 0 | 0 | 0 | 0 | 0 |
| (LatPermVar) | 5 | 1 | 2 | 2 | 0 | 0 | 0 | 0 | 0 | 0 |
| (Fractures) | 5 | 2 | 2 | 2 | 0 | 0 | 0 | 0 | 0 | 3 |
| (FracOrient) | 5 | 2 | 2 | 2 | 0 | 0 | 0 | 0 | 0 | 2 |
| (Kv/Kh) | 5 | 2 | 1 | 1 | 0 | 0 | 0 | 0 | 0 | 0 |
| (Thief) | 5 | 2 | 1 | 1 | 0 | 0 | 0 | 0 | 0 | 0 |

FIG. 6

METHOD FOR COMPUTING COMPLEXITY, CONFIDENCE AND TECHNICAL MATURITY INDICES FOR RESERVOIR EVALUATIONS

TECHNICAL FIELD

The present invention relates to methods which quantify the complexities of underground reservoirs and evaluate the reliability of forecasts of oil and/or gas production from such underground reservoirs.

BACKGROUND OF THE INVENTION

Subsurface evaluations of oil and gas reservoirs are always subject to limits imposed by data quality and availability, resources, timing and costs. As a consequence, decision making should include consideration of the risks and uncertainties associated with an evaluation. Decision Analysis (DA) methods for evaluating and communicating the risks in terms of outcomes, given some defined probability distributions, are intended to be unbiased and accurate. However, comparisons of forecast and actual outcomes for projects typically show that more projects outcomes are below the median forecast (P50) values than above, indicating that in general the input probability distributions used are inaccurate and biased.

Evaluating the potential production of hydrocarbons from an underground reservoir is important in determining the economic viability of an oil- or gas-field development scheme. Several tools exist which assist in making such evaluations and predictions of oil or gas-field performance. These tools also help in deciding how best to develop a field and how to plan for contingencies related to the uncertainties in the knowledge of the subsurface characteristics of the field.

One such tool for assessing the difference between actual and predicted outcomes for a field development is a software application known as GEOSCORE™. GEOSCORE utilizes a method for quantifying anticipated changes in field reserve estimates based on an assessment of subsurface complexity. GEOSCORE assesses scores, on a 1–5 scale, from nine descriptive categories to determine an overall GEOSCORE complexity value. For a particular descriptive component, a score of 1 is associated with reservoirs which have a minimal degree of complexity while a score of 5 implies that the reservoir has a very high degree of complexity for that component. A summation of the nine scores provides the GEOSCORE complexity value. Analysis of GEOSCORE results has shown that fields with relatively low GEOSCORE complexity values are often underestimated in terms of actual production capability. Conversely, the production capability of fields which have very high complexity values often are overestimated due to the adverse effects that complexity can have on the actual producibility of the field. As published, the GEOSCORE estimates are based only on subsurface characteristic components and do not take into account effects on producibility relating to dynamic (reservoir engineering) components which depend on the development scheme selected for a field. Furthermore, no consideration is given to the certainty in the estimates of subsurface characteristic components.

Another tool which can be used to estimate the subsurface complexity of an oil- or gas-field is a software package referred to as GEOFACTOR which was developed by RDS (United Kingdom) and published as a tool via their web-site. This program also suffers from the same shortcomings as GEOSCORE, i.e., no accommodations are made for the chosen developmental schemes or the uncertainty in estimates made for the subsurface characteristics.

Continued widespread and variable inconsistencies between predicted field production and reserves and actual outcomes show there is a need for methods, software tools and analyses which can assess the confidence which should be placed in probabilistic reservoir performance predictions. The present invention is intended to address this need.

SUMMARY OF THE INVENTION

The present invention includes an evaluation tool which is intended to help improve the assessment of the reliability of probabilistic reservoir production forecasts. The tool provides an indicator of the reliability of the forecast production profiles and reserves estimations. Moreover, a list of the uncertainties in the subsurface evaluation is ranked by likely impact on the forecasts. The present invention uses simple interactive tools to capture and communicate a broad 'snapshot' of a project's subsurface complexity and the technical maturity of the evaluation, and to highlight the potential impacts that imperfect knowledge of the subsurface may have on the field development outcomes.

In the present implementation, 89 questions have been defined to capture the key subsurface characteristics and development scheme components of a particular reservoir and development project. A key feature of the analysis is the incorporation of uncertainty into the estimates of the reservoir components used to characterize the reservoir and production development scheme(s). A user's assessments of the input values for the key components and the uncertainty or confidence of these assessments are captured during the analysis via novel "Graphic Feedback" displays of implied probability distributions.

The present invention provides a method and a computer-readable medium containing executable code for computing an evaluation index for an evaluation of a reservoir. The method comprises the steps of:

(a) making estimates of reservoir components which are associated with a reservoir evaluation;

(b) making estimates of confidence values for the estimates of the reservoir components; and (c) computing an evaluation index for the reservoir evaluation based upon at least one of the estimates of the reservoir components and the estimates of the confidence values.

The evaluation index may be a complexity index, a confidence index or a technical maturity index. Ideally, the method further includes determining complexity scores associated with the estimate of the reservoir components and also determining confidence scores associated with the estimate of the confidence values. An overall complexity index can be computed from the complexity scores and an overall confidence index can be calculated utilizing the confidence scores.

The estimates of the reservoir components and the confidence values may be made in response to literal and numerical descriptions. Further, estimates of the confidence values may be made in cooperation with a graphic feedback display which depicts at least one probability curve dependent upon the relative level of an estimated confidence value.

Complexity look-up tables may be used to establish the relationship between the estimates of reservoir component complexities and their associated complexity scores. These relationships in the look-up tables are preferably established by a team of experts. Further, ideally these lookup tables can be updated using neural networks or other experience-based knowledge updating schemes. The technical maturity index (TMI) for the reservoir evaluation may be calculated which is a function of the confidence values for the reservoir components.

The TMI is established by calculating a sum of confidence measures weighted by the TMI weights. The TMI weights relate the significance of the confidence of knowing the value for a reservoir component to the predicted outcome of a reservoir evaluation, such as a production profile. These TMI weights are preferably established through the use of expert-determined relationships. In some cases, the weight is set to zero when there is believed to be virtually no impact of uncertainty in an estimate of a reservoir component on a predicted outcome. In other cases, there may be significant dependency between the certainty of the estimate of the reservoir component and a predicted outcome, which is reflected by the TMI weight.

Technical maturity, complexity and confidence indices can be established for a field containing several reservoirs. The TMI can be useful in determining the probability that a field will produce in accordance with predictions. Comparisons between indices in different fields can be useful when ranking a project and as an input to decision-making.

It is an object of this invention to provide both a method and computer readable media containing executable code for carrying out the method which calculates both static (subsurface characteristics) and dynamic (petroleum engineering) complexity and confidence indices, and furthermore, an overall Technical Maturity Index for a subsurface reservoir evaluation and an associated development scheme.

Another object is to highlight the key factors ("reservoir components") impacting the assessment of the Technical Maturity of a reservoir or field evaluation.

Yet another object is to provide an auditable trail of how a field's technical evaluation progresses over time, and which uncertainties are identified as crucial at the time of the evaluation.

BRIEF DESCRIPTION OF THE DRAWINGS

These and other objects, features and advantages of the present invention will become better understood with regard to the following description, pending claims and accompanying drawings where:

FIG. 6 illustrates a portion of a Technical Maturity Index (TMI) Weights Look-Up Table (MI_Wts_LUT) showing exemplary weights used in calculating a Technical Maturity Index;

DETAILED DESCRIPTION OF THE INVENTION

I. Introduction

The software tool of the present invention is referred to as the CIRCE tool or program. CIRCE is an acronym for Complexity Indices for Reservoir Characterization and Evaluation. The CIRCE tool is used to determine the Technical Maturity Index for a subsurface characterization and an associated development scheme used as a basis for production forecasts and reserves estimates. The calculated Technical Maturity Index, based on evaluations of subsurface characteristic and development scheme complexities and uncertainties, allows relative confidence levels for probabilistic forecasts and estimates to be assessed. Further, the tool calculates complexity and confidence indices for subsurface characteristic (static) analyses and developmental scheme (dynamic) analyses of a reservoir or field evaluation.6

II. Project Definition

A project may consist of a field with multiple reservoirs each with separate subsurface characteristics and individual development schemes, and may also contain several alternative development schemes. The reservoirs comprising a field can be addressed individually or as aggregates. In the latter case, user inputs represent aggregated values estimated externally to the application. If multiple reservoirs are defined for a project, the proportion of total hydrocarbon-in-place ("HCIP") estimated for each reservoir is also provided as part of the project definition to facilitate subsequent calculation of aggregated static complexity scores. A project can have multiple development schemes defined. For projects with multiple reservoirs, each development scheme definition includes the amount of hydrocarbons recovered from each reservoir as a fraction of the total hydrocarbons recovered for the field over some period.

III. Overall Process Flow Through the Circle Tool

Figure 1:
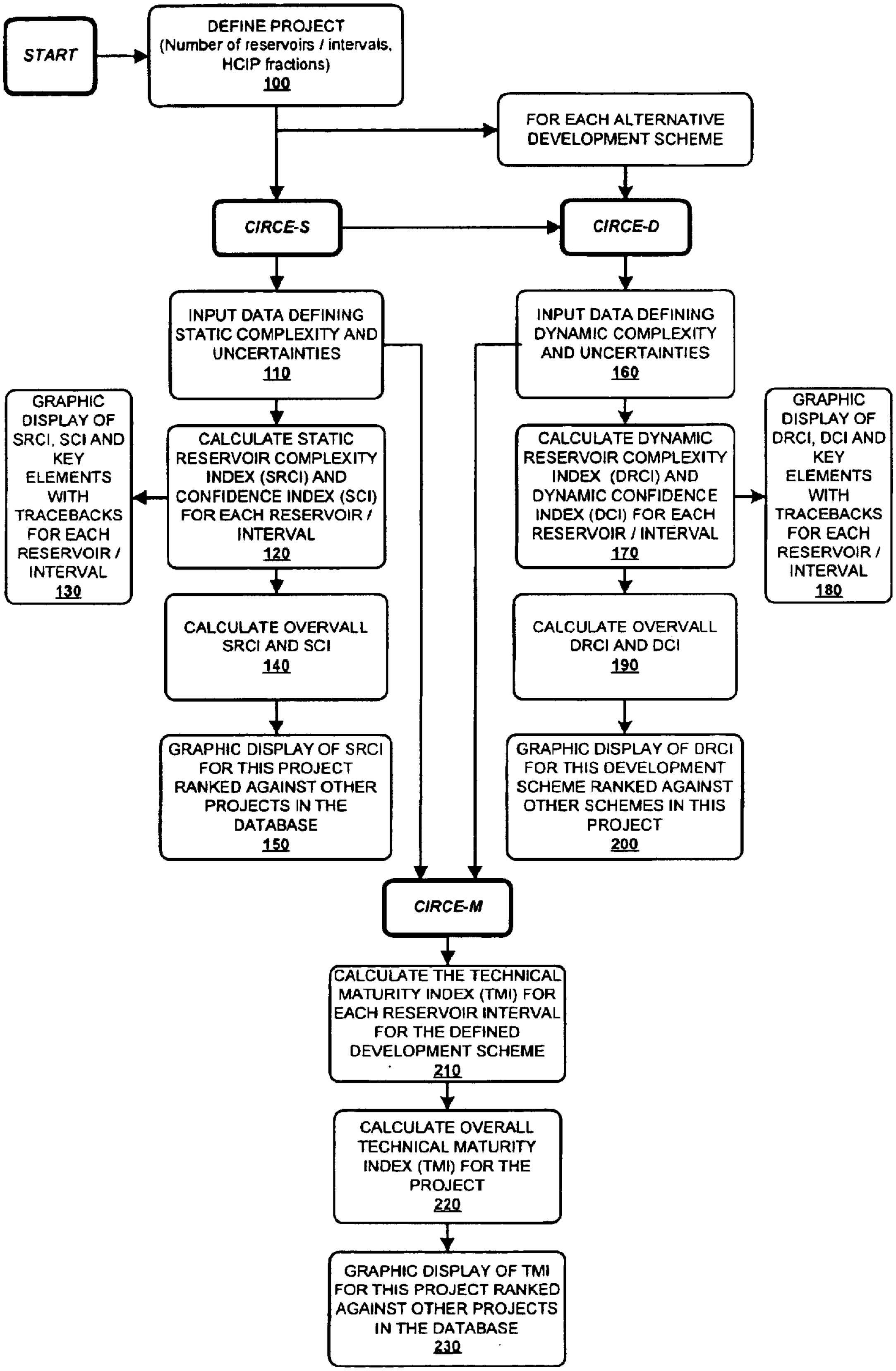
FIG. 1 is a flowchart showing an overview of steps, in accordance with the present invention, used in calculating static (CIRCE-S) complexity and confidence indices, dynamic (CIRCE-D) complexity and confidence indices, and a Technical Maturity Index (CIRCE-M) for a project.

FIG. 1 shows a flow chart which illustrates that various inputs relating to subsurface characteristics and development scheme components of a reservoir and the relative confidence level in the accuracy of each respective input, are entered into the CIRCE program. These inputs are converted into relative complexity scores and confidence scores. These scores are used in the calculation of complexity and technical maturity indices plus various supporting information. As shown in FIG. 1, the CIRCE tool calculates (1) a Static Reservoir Complexity Index (SRCI) and a Static Confidence Index (SCI) in a CIRCE-S module; (2) a Dynamic Reservoir Complexity Index (DRCI) and associated Dynamic Confidence Index in a CIRCE-D module; and (3) an overall Technical Maturity Index (TMI) in a CIRCE-M module of the program.

In general "stauc" reservoir components arise from subsurface characteristics and are assessed by earth scientists, whereas "dynamic" reservoir components are mostly dependent on development plans and engineering issues and are assessed by petroleum engineers. In practice, these reservoir components are typically assessed during work sessions of multi-disciplinary project teams.

The Static Reservoir Complexity Index (SRCI) score is a measure of the inherent complexity in a reservoir arising from the structural form, geometries, depositional environment and petrophysical issues. A SRCI score and its associated Static Confidence Index (SCI) provide measures of how complex the subsurface (geological) definition of a reservoir is and how well this complexity is defined at the time of an evaluation.

The Dynamic Reservoir Complexity Index (DRCI) score is primarily determined by the complexity of an actual or proposed recovery mechanism and development plan for a particular reservoir. The DRCI score and associated Dynamic Confidence Index (DCI) suggest the relative complexity introduced by the proposed development scheme and the certainty with which the details of that scheme are known.

Referring to FIG. 1, a project is first defined (step 100) in the CIRCE tool. The project definition includes the number of reservoirs or intervals and the HCIP fractions for those reservoirs. Upon entry into a CIRCE-S module, data is input (step 10) related to the estimates of a number of static reservoir components. Further in this step, data is input for the confidence value that a user has in their estimate of a reservoir component. The CIRCE-S module then computes (step 120) a static reservoir complexity index (SRCI) and static confidence index (SCI) for each reservoir or interval A data input tree (see FIG. 2) is used to display the SRCI, the SCI, calculation branches and reservoir components which are most outcome determinative in the computations of the SRCI and SCI (tracebacks). After entering the estimates for the reservoir components and their relative confidence values in those estimates and computing the SRCI and SCI for each reservoir or interval, an overall SRCI and SCI can be calculated (step 140) for the project. The CIRCE tool may then graphically display (step 150) the ranking of the SRCI for this project against other projects in a database.

In a similar fashion, the CIRCE tool employs a CIRCE-D module. For each alternative development scheme for producing oil and/or gas from a reservoir, data defining estimates of dynamic reservoir components and their relative confidence values is input (step 160). A Dynamic Reservoir Complexity Index (DRCI) and Dynamic Confidence Index (DCI) is computed based upon these user inputs for each reservoir or interval. Again, a data input tree (see FIG. 3) is displayed (step 180) on which the DRCI and DCI are annotated. Also, trace backs are highlighted showing which calculations and entries of estimates of reservoir components and estimates of confidence values are most outcome determinative in computing the DRCI and DCI. This process of computing DRCI's and DCI's is repeated for the selected alternative development scheme for each reservoir or interval in the project. An overall DRCI and DCI is then computed (step 190) for the selected alternative development scheme for the project. The overall DRCI and DCI for each develop scheme can be ranked and displayed (step 200) relative to other schemes in the project.

Finally, the CIRCE tool employs a CIRCE-M module to calculate a Technical Maturity Index (TMI) for the project. The estimates of the static and dynamic reservoir components and their associated estimates of confidence values, which have been entered in the CIRCE-S and CIRCE-D modules, are used in the CIRCE-M module to calculate (step 210) the TMI for each reservoir or interval for the defined development scheme. The overall TMI for the project is then calculated (step 220). Finally, a graphic display is made (step 230) of this TMI ranked against the TMI's of other projects in a database.

IV. Characterizing Reservoir Components

Questions are put forth to a user to characterize each of the subsurface characteristic and development scheme reservoir components of interest. Questions in subgroups A–E correspond to requests for characterizations of static reservoir components needed by the CIRCE-S module and questions in subgroups F–J relate to dynamic reservoir components input in the CIRCE-D module. Alphanumeric identifiers are located within input nodes of the data input trees of FIGS. 2 and 3 which correspond to the questions in Appendix A. The input nodes are linked together into summation "roll-up" nodes as the information from a particular subset or branch of trees are combined to produce intermediate computations, eventually leading to the computations of the SRCI and DRCI and related confidence indices for a particular reservoir and proposed development scheme.

In this particular exemplary embodiment of this invention, a maximum 76 questions are presented which are listed in Appendix A—QUESTIONS FOR CHARACTERIZING RESERVOIR COMPONENTS. Depending on the answer to a particular question, other questions may not be presented as those questions may be irrelevant. For example, question E1 asks whether the development scheme uses primary or enhanced oil recovery. If there is no enhanced oil recovery, i.e., using injection wells, then questions regarding use of injections wells are not presented or used in calculations.

A. Static Subsurface Characteristics Reservoir Components—CIRCES S

Figure 2:
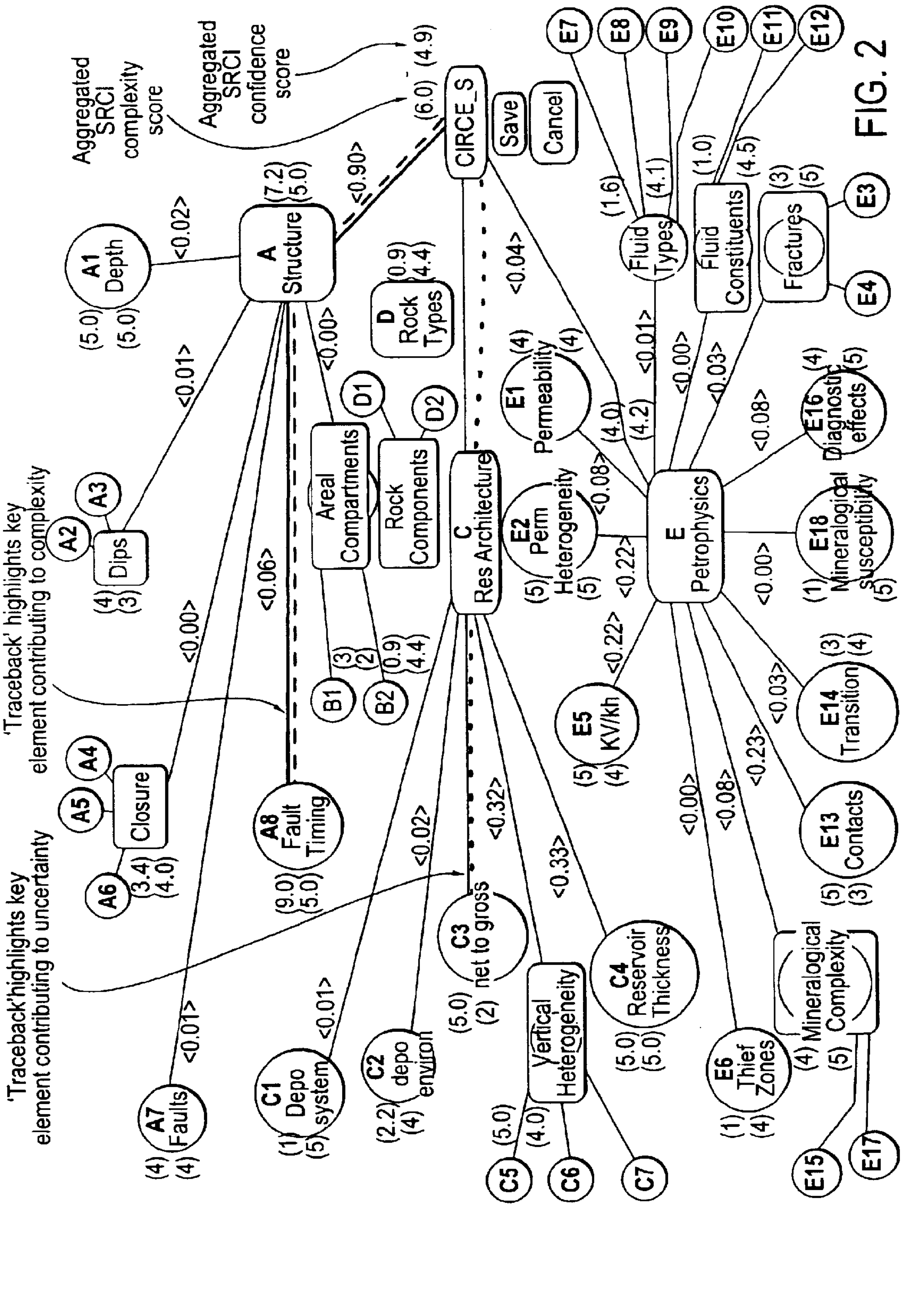
FIG. 2 depicts a data input tree used in a CIRCE-S module for subsurface characteristic complexity and confidence analyses.

Reservoir components in the static or CIRCE-S module are chosen to bring in information concerning the subsurface characteristics of a reservoir. Major subgroups in the CIRCE-S module include (A) Structure; (B) Compartmentalization; (C) Reservoir Architecture; (D) Rock Types; and (E) Petrophysics. As seen in FIG. 2, some of these subgroups are comprised of further subgroups. Subgroups are chosen which consist of subsurface characteristics which are related to one another.

- Structure components include geometric form and closure, depth, fault style and timing, dips, and compartmentalization. (Questions A1–A8 and B1–B2)
- Reservoir Architecture components comprise depositional system, depositional environment, net-to-gross ratio, vertical heterogeneity, and interval thicknesses. (Questions C1–C7)
- Rock Type components relate to lithological components and pay distributions. (Questions D1–D2)
- Petrophysics components include fluid type, contacts, lateral permeability heterogeneity, vertical-to-horizontal permeability ratios, and diagenetic and mineralogical issues. (Questions E1–E18)

B. Dynamic Reservoir Components—CIRCE D

Within a project several alternative development schemes can be considered. A development scheme can include different dynamic reservoir components for each reservoir if multiple reservoirs are defined in the project. When defining a development scheme for a project with multiple reservoirs, an estimate of the proportion of reserves expected to be recovered from each reservoir defined for the project is input by the user as part of the development scheme definition to control the subsequent aggregation of Dynamic Reservoir Complexity Index (DRCI) and Technical Maturity Index (TMI) scores.

For a given development scheme, there is a subset of dynamic components which are common to all individual reservoirs which produce hydrocarbons in that scheme. These common components are collected along three primary input branches in FIG. 3 and include (H) Unwanted fluids, (I) Production well design, and (J) Injection well design. These reservoir components are common to all reservoirs in a field. Ideally, these values need be input only once and will be utilized by the CIRCE tool for each of the reservoirs this scheme applies to.

Unwanted fluids components include excessive water production, water production, excessive gas, and gas disposition (Questions H1–H4)

Production well design components comprise co-mingled completions, sub-sea trees, infill drilling, well recompletions, and remedial well profile control (Questions I4–16 and I11–I12)

Injection well design components capture forecast-sub-sea trees, forecast-infill drilling, well recompletions, and remedial well profile control (Questions J5–J6 and J9–J10)

For an individual reservoir or group of reservoirs, within a given development scheme, a set of dynamic reservoir components are then defined using the same input mechanism (pop-up panels) as discussed for the static complexity analysis (above). Reservoir components for the reservoir specific assessment of dynamic complexity are arranged along four input branches of the data input tree (F) Reservoir mechanism; (G). Improved Oil Recovery; (I) Production wells; and (J) Injection wells:

Reservoir mechanism components include recovery factor, recovery rate, aquifer support, mobility ratio, reservoir force, reservoir pressure, and the impact of fractures. (Questions F1–F9)

Improved Oil Recovery components include incremental recovery factor, injection fluid type and compatibility, injection well location, and injection rate. (Questions G1–G5)

Production well components include well geometry, completion types, sand control, stimulation, and artificial lift. (Questions I1–I13, I7–I10)

Injection well components include well geometry, injectivity, completion types, sand control, and stimulation. (Questions J1–J4, J7–J8)

Figure 3:
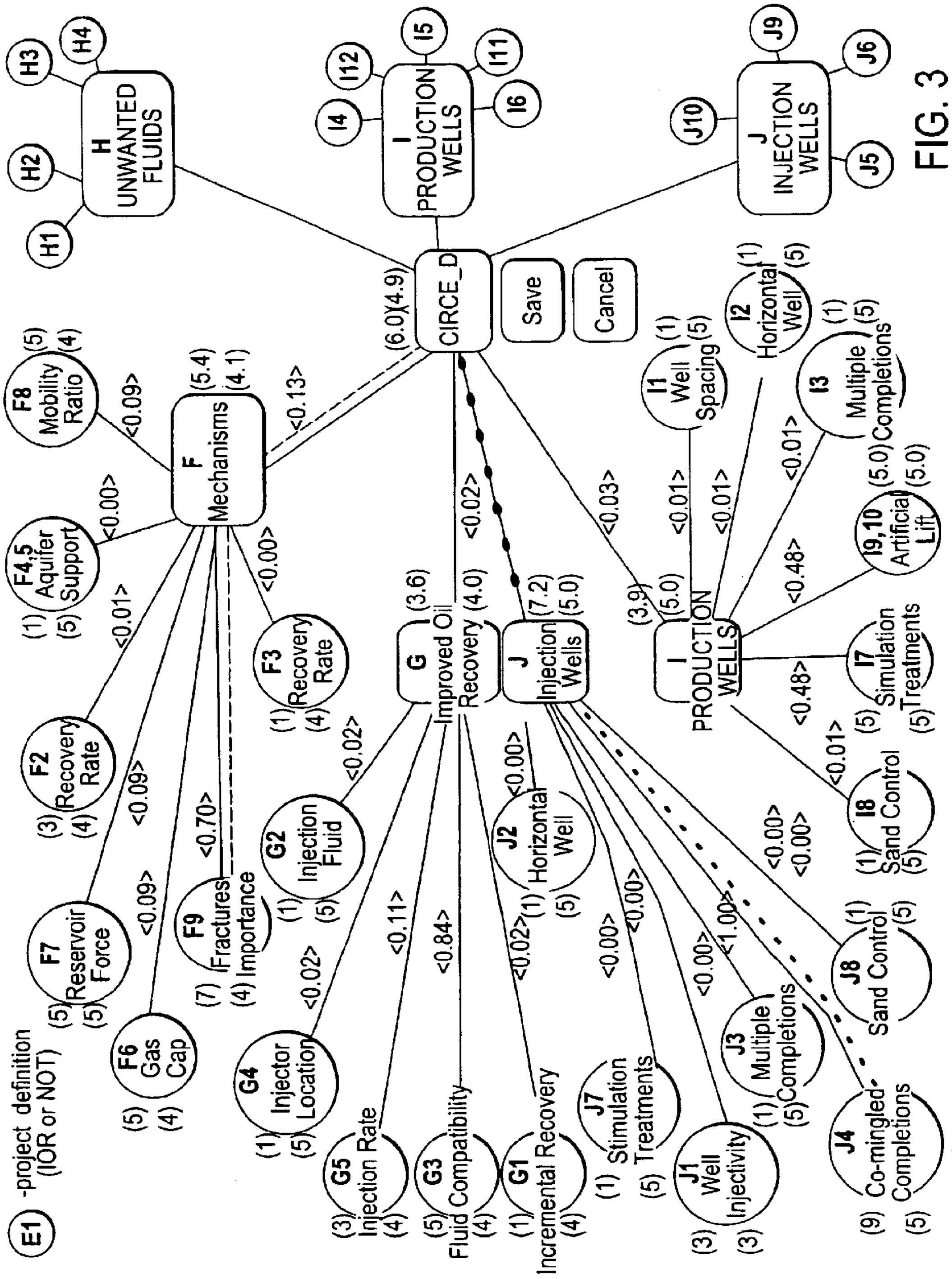
FIG. 3 shows a data input tree used in a CIRCE-D module for developmental scheme complexity and confidence analyses.

Note in FIG. 3 that input node, F1, is connected by any branches to the output node. In this preferred embodiment, input node F1 operates only as a toggle switch to determine whether certain questions may be irrelevant. For example, if development scheme uses a primary recovery and not enhanced oil recovery including injection wells, then no questions will be asked with regard to injection wells nor will their complexity or confidence scores be input.

Figure 4:
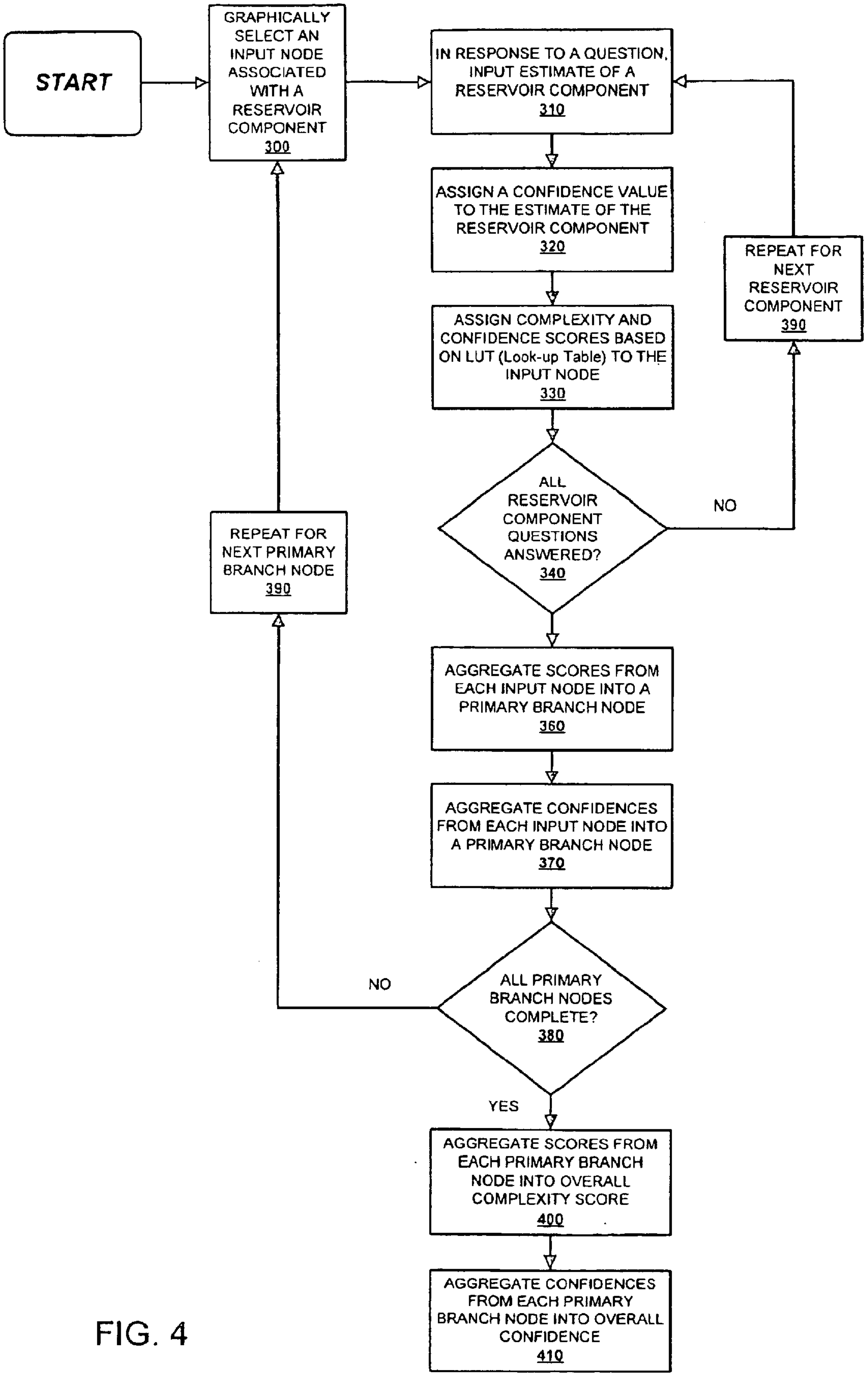
FIG. 4 shows a flowchart of the steps used in calculating complexity and confidence indices.

C. Input of Estimates of Reservoir Components and Corresponding Confidence Values The CIRCE-S and CIRCE-D modules facilitate the capture of the reservoir components which define the static and dynamic characterization of a field, its constituent reservoir (s) and development scheme(s) through a simple interface that, most significantly, includes a user's confidence in each of the estimates of a characterizing reservoir component. FIG. 4 describes how these inputs are then used to create complexity and confidence indices.

Questions from Appendix A are presented to a user by way of pop-up screens or panels in response to a user graphically selecting (step 300 of FIG. 4) one of the input nodes found in FIGS. 2 or 3 to activate the pop-up screen or panels. The pop-up screen will present a question related to a reservoir component. Either a numeric or literal descriptor, or both, is presented to the user which presents a choice of appropriate answers for a particular question. The user selects (step 310) the descriptor which most likely characterizes the subsurface characteristic or the development scheme to input an estimate for that reservoir component In cases where there is some uncertainty related to the choice of the estimate for the characterization of the reservoir component, the user is also asked to select an estimate of a confidence value associated with the reservoir component descriptor. Accordingly, the user assigns (step 320) a confidence value to the estimate of the reservoir component. This process of assigning complexity and confidence estimates is continued (step 350) until all reservoir components have been characterized (step 340). As will be described below, complexity and confidence scores will be assigned (step 330) to these estimates of complexity and confidence.

EXAMPLE 1

Figure 5B:
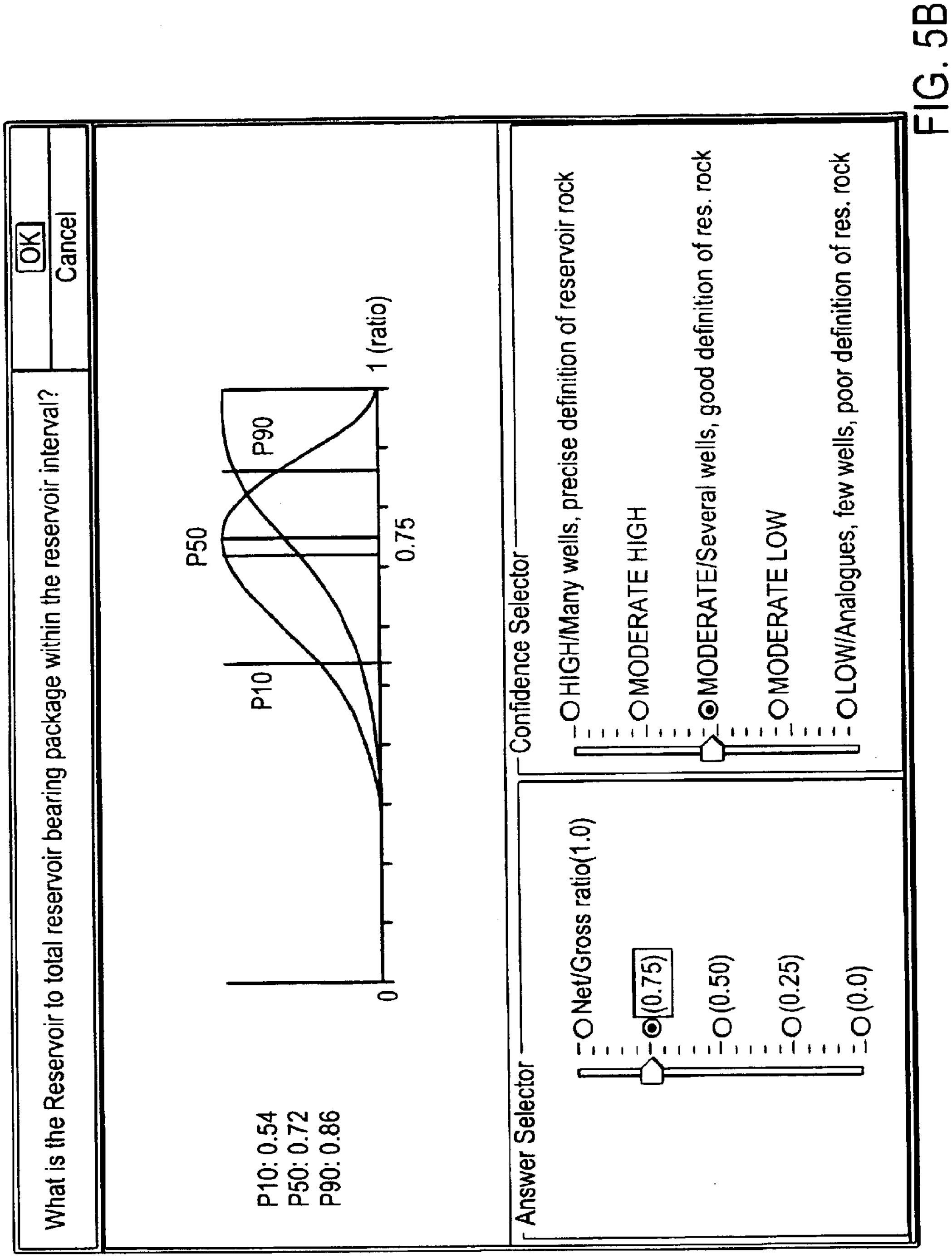
FIGS. 5 A–C illustrate exemplary pop-up screens used in prompting a user for estimates of values for reservoir components and associated confidence values with the assistance of feedback displays including probability curves.
Figure 5C:
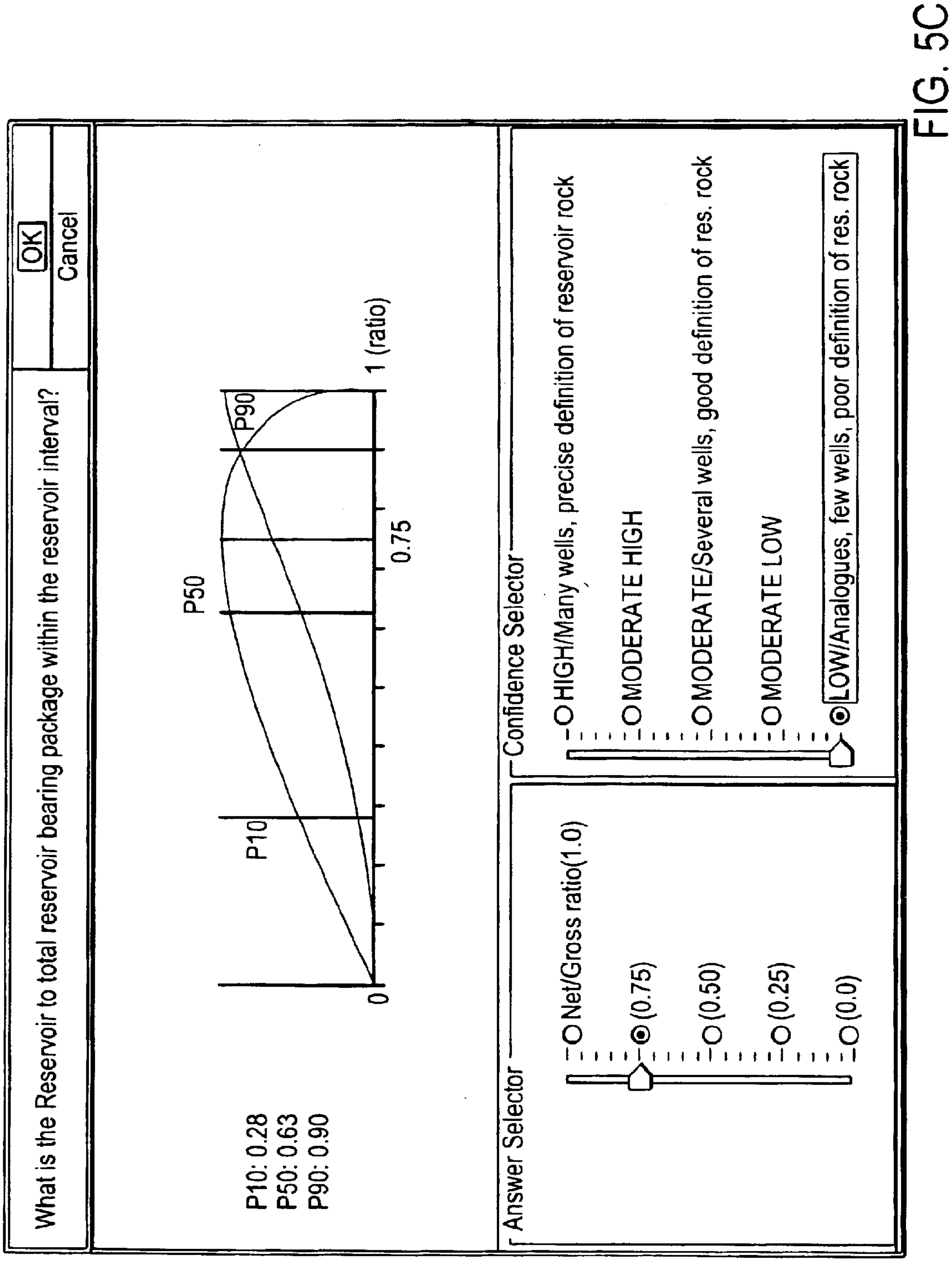

FIGS. 5A–C show exemplary pop-up input panels which are provided to a user in response to selecting input node C3 in FIG. 2. In this case, an estimated value for a reservoir component is requested by the question "What is the Reservoir to Total Reservoir Bearing package ratio within this reservoir/interval?" A user selects the appropriate button or adjusts a slider control to indicate the most likely estimate (mode) for the answer. For this particular question, the ratio must be within a range between 0.0 and 1.0. In FIG. 5A, the estimate for the question characterizing this reservoir component has been selected as "0.75".

Further, the user is also queried with respect to the level of confidence he or she has in their knowledge of this estimate for this ratio. Again, a button is selected or a slider control is adjusted by the user to indicate his or her confidence in the answer selected.

The user is assisted in determining the estimate of confidence for the characterization of reservoir component through the use of a "Graphic Feedback" tool, which is shown at various confidence levels in FIGS. 5A–C. For further details on the "Graphic Feedback" tool, see Appendix B at the end of the specification.

In this example, the user has provided the same input, a ratio of 0.75, as the most likely reservoir component value in each of the screen cases. However, the confidence values selected vary between the screens. Literal descriptors offer assistance in choosing an appropriate confidence value by offering the following choices: (1) Low/Analogues, few wells, poor definition of rock; (2) Moderate Low; (3) Moderate/Several wells, good definition of reservoir rock; (4) Moderate high; and (5) High/Many Wells, precise definition of reservoir rock. These literal descriptors are commensurate with increasing amounts of data and analysis available to evaluate this particular reservoir component. See Appendix A for the list of questions and their answer choices. For other reservoir components, the literal descriptors are defined appropriately.

Moving the arrow on the Confidence Selector within the Low to High range causes the probability curves and the mode, P10, P50 and P90 values annotated on the Graphic Feedback displays of FIGS. 5A–C to be concurrently updated. In FIG. 5A, the Net-to-Gross (NTG) is 0.75. With a high confidence selected, this results in a mode and P50 value of 0.75 and a P10–P90 range of 0.72 to 0.77. FIG. 5B shows that a "moderate" level of confidence has been chosen. The mode value of NTG remains 0.75. However, the P10–P50–P90 values are altered to 0.54, 0.72 and 0.86, respectively. Finally, with low confidence in the estimate for the selected estimate of 0.75 for the NTG, the mode value is 0.75 with a broader range of P10–P50–P90 values at 0.28, 0.63, and 0.90, respectively.

The advantages of using this form of input are that the interactive "Graphic Feedback" tool display.

(1) allows a user to understand how his inputs are being interpreted by the CIRCE tool by relating the inputs directly to P10–50–90 values; and (2) allows interactive updating prior to saving the inputs.

In the manner described above, estimates for the reservoir components and their confidence values are input to the CIRCE-S and CIRCE-D modules until each of the reservoir components of the CIRCE-S and CIRCE-D modules have been characterized and related confidences or certainties estimated.

V. Complexity and Confidence Scoring

A. Complexity Scoring

The CIRCE tool converts (step 330) each of the estimates of the reservoir components, acquired by answering the static and dynamic questions, to a complexity score via Complexity Look-Up Tables (LUTs). The Complexity LUTs for converting each estimate to a complexity score for each of the CIRCE-S and CIRCE-D modules, in the present embodiment, have been determined by a group of experts. The LUT scoring depends on the complexity of the estimate or selected answer for each reservoir component chosen by the answer selector in a particular pop-up panel. These complexity scores are assigned values ranging from 1–10.

EXAMPLE 2

Question A1 from Appendix A asks "How deep is the target reservoir?" This question is presented because reservoirs at greater depths typically have lower reliabilities of production of forecasts than equivalent reservoirs at shallower depths. The complexity score associated with the estimate for this reservoir component will ultimately contribute to the Static Reservoir Complexity Index (SRCI). Table 1 below describes the relationship between the estimate of the target reservoir depth and the assigned complexity scores wich are used by Complexity LUT for the CIRCE-S module.

TABLE 1

LUT Relationship For Depth

| Estimate of Reservoir Component (Feet) | Look-Up Table (LUT) |
|---|---|
| 1000 | 0 |
| 3000 | 1 |
| 5000 | 2 |
| 10000 | 3 |
| 15000 | 5 |
| 25000 | 8 |
| 30000 | 10 |

In the current implementation, a panel of experts has determined that for a reservoir at 1000 feet the component for depth contributes a complexity score of 0 (out of a possible maximum of 10) to the overall structural component of the SRCI. In the contrasting case for a target reservoir at a depth of 30,000 feet, a complexity score of 10 is assigned indicating that the depth of the target reservoir is now a major contributor to the complexity of the structural component of the SRCI. For depths of target reservoirs between 1000 and 30,000 feet, scores are assigned intermediate values between 1 and 10 as shown above. As an example, if a user selects from the corresponding pop-up panel (not shown) an estimate of reservoir depth of 15,000 feet, the LUT assigns a corresponding score of 5.

A group of experts follows the above logic process and establishes appropriate scoring relationships between each estimate (potential answer selected by answer selector) of a reservoir component and a complexity score to be assigned for that estimate. The LUT values may be updated using an experience based knowledge updating scheme. For example, a neural net might be used to update and improve the relationships in the complexity LUT. Appendix A shows many of correlations between the answer choices (estimates) and the assigned complexity scores.

The values within the complexity LUT can be non-linear and/or discrete (as shown above), or can be continuous and evaluated on the basis of a function chosen by expert assessments. For example, the LUT relationship for a depth Z of a target reservoir may alternatively be assigned as:

$$\text{Complexity Score} = 10 * \left(\frac{Z}{30000}\right)$$

It will be appreciated by those skilled in the art that there are a number of other potential LUT relationships and functions which can be established by experts to reflect their belief in how best to correlate a selected characterizing answer (an estimate of a reservoir component) with a complexity score.

B. Confidence Scoring

In a manner similar to the conversion of estimates for reservoir components into corresponding complexity scores, the estimates for the confidence values are converted into confidence scores for each of the reservoir components. Where the confidence in the reservoir component varies significantly, the slider arrow in a pop-up panel linearly assigns a confidence score of 1 to 5 based upon the position of the selector arrow. Alternatively, where the estimate for the reservoir component is highly certain, a maximum confidence score of "5" may be assigned for all choices of depth for a target reservoir. For example, the depth of a target reservoir is known with great certainty. Therefore, no confidence selector would be offered to a user.

The complexity and confidence scores assigned to an input node are ideally annotated next to that input node in FIGS. 2 and 3. The complexity scores range from 0–10 and the confidence scores vary from 1–5. These annotations allow for ready identification of the particular complexity and confidence scores assigned for each input node (reservoir component).

VI. Aggregation of Complexity and Confidence Scores to Establish Complexity and Confidence Indices A. Complexity Indices The static (SRCI) and dynamic (DRCI) complexity indices for a reservoir/interval are calculated by the aggregation ('roll up') of the individual component complexity scores. A key characteristic of the aggregation, in this preferred embodiment, is that it is non-linear such that it emphasizes high complexity component scores in the aggregated total. As currently implemented, an exponential/power law weighting scheme (described below) is employed in which the relative weights incorporate the complexity scores themselves. Once sufficient examples are collected, a neural net or other method can be incorporated into the CIRCE tool to control the aggregation of the complexity scores.

This algorithmic approach to score aggregation is applied successively at each level or subgroup within a data input tree starting at the input node level, until the final aggregated scores which are the Static and Dynamic Reservoir Complexity Indices (SRCI and DRCI) are obtained. After the final score aggregation is completed, the relative contributions and confidences from each node are determined for each roll-up and displayed as an aid in analyzing the results of the CIRCE tool.

B. Aggregation of Scores Within the Application

The questions within the static and dynamic complexity analysis are arranged hierarchically. Within each branch of a data input tree, the complexity scores and confidence scores are aggregated ("rolled up") (steps 360, 370 of FIG. 4) to provide representative complexity and confidence scores at the immediately upstream aggregating node (see FIGS. 2 and 3). These aggregating nodes are depicted in square boxes as opposed to round circles which have been used to identify the input nodes. This process is continued (step 380) until scores for all input nodes have been aggregated (step 390). Similarly, all aggregating nodes are aggregated until the overall complexity and confidence indices have been computed (steps 400, 410). In the example shown in FIG. 2, the aggregated SRCI score is 8.0 and the SCI score is 4.9. In FIG. 3, the aggregated DRCI is 6.0 and DCI is 4.9.

The characteristics of the aggregating or "roll-up" algorithm are that it is stable (non-pathological), propagates high scores (i.e., non-linear), and is adaptable to updating in a machine learning application as and when a database of examples has been obtained. In the currently preferred embodiment of this invention, the algorithm implemented aggregates the complexity scores using an exponentiated power law average which calculates the aggregated score ($S_a$) as the natural log of the power law average of the exponentials of the N input complexity scores $x_i$:

$$S_a = \ln\left(\frac{\sum_{i=1}^{N} e^{(x_i * p)}}{N}\right)^{\frac{1}{p}}$$

Where p=a power law factor varying greater than 0. When p=1, the aggregating equation becomes a simple exponential average. Increases in the p-factor serve to increasingly emphasize the high complexity components of an aggregate score and can be used to tune the response of the system by calibrating with known outcomes. In the present embodiment of this invention, p is set to "1".

The aggregating algorithm currently used in the application was selected after an evaluation of several feasible alternatives. Other algorithms can be envisaged which would provide a similar response. By way of example, and not limitation, arithmetic, power law, logistic sigmoid, exponential weighting schemes, and other schemes may be used to aggregate the complexity scores.

The input node which contributes the most to the aggregated node with the highest aggregated complexity score is annotated and highlighted on the graphic display to provide a visual 'trace-back' through the data input tree, thus showing the largest contributor to each aggregated complexity score. For example, in FIG. 2, the pathway highlighted by a dashed line advises the user that the 'Fault Timing' component, input node A8, is the largest contributor of complexity to the aggregated node which contributes most to the final static reservoir complexity index (SRCI) score.

The "Fault Timing" component from FIG. 2 contributes 96% of the complexity to the roll-up at aggregation node designated as "A-structure". In turn, this aggregation node contributes 90% of the complexity to the overall SRCI.

Having determined an aggregated complexity score at an aggregated node, the equation can be used to estimate the relative contribution of each input complexity score $x_i$ to the aggregated score. This is done by rearranging the equations defining the aggregate scores:

$$Ne^{pS_a} = \sum_{i=1}^{N} (e^{x_i * p})$$

And then calculating the component contributions $C_{x(i)}$:

$$C_{x(i)} = \frac{e^{x_i * p}}{Ne^{pS_a}}$$

The value $C_{x(i)}$ represents the proportion of an aggregated score which is contributed by the component complexity score $x_i$.

The confidence scores are aggregated using the proportions calculated using the complexity score for the relevant node (as calculated above) as linear weights. This propagates the relative contribution of each input node into the uncertainty scores. As shown in FIG. 2, the pathway highlighted by the dotted line (trace back) advises the user that the 'Net-to-Gross' component, input node C3, is the largest contributor of uncertainty to the aggregated node which contributes most to the final Static Confidence Index (SCI).

FIG. 3 illustrates the CIRCE-D data Input tree for computing the Dynamic Reservoir Complexity Index (DRCI) and the Dynamic Confidence Index (DCI). These calculations are made in the fashion described above with regard to CIRCE-S. The DRCI is 6 and the DCI is 4.9. Trace-backs show that input node F9—"Fractures Importance" is the critical component to the overall DRCI and input node J4—Co-mingled Completions" is the most outcome determinative of the components to DCI.

Upon calculation of the SRCI and DRCI scores, the CIRCE-S and CIRCE-D modules highlight the principal sources of static and dynamic complexity and the prime sources of uncertainty in the analyses on respective graphical displays. For fields with multiple reservoirs, total field aggregated scores are calculated using the proportions of HCIP and reserves proportions which were captured in the project definition and input to the CIRCE-D module. For example, if the HCIP for a first reservoir is 60% of the total HCIP, and a second reservoir has a HCIP of 40%, then the overall SRCI=0.60*SRCI (reservoir 1)+0.40*SRCI (reservoir 2). If the respective reserve proportion of the first reservoir and second reservoirs is 30% and 70%, then the overall DRCI=0.30*DRCI (reservoir 1)+0.70*DRCI (reservoir 2).

A high level of static and dynamic subsurface complexity in and of themselves will not necessarily lead to inaccurate predictions. For instance, the case of a geologically complex but mature field with excellent data and many years of production would be an example where a high static complexity and a high dynamic complexity may be perfectly aligned and therefore accurate and reliable performance predictions could be expected.

These types of situations are addressed by the CIRCE-M module of the tool, which relates the factors necessary for accurate predictions of the performance of a proposed development scheme to the understanding of subsurface complexity and the confidence in the subsurface evaluation.

VII. Overview of the Technical Maturity Index

The CIRCE-M module calculates the technical maturity of a project based on the inputs to the static and dynamic subsurface characterizations provided in the CIRCE-S and CIRCE-D modules. The results are presented in terms of a "Technical Maturity Index" score which is a measure of the overall technical maturity of the subsurface project. The TMI is based on a weighted ranked evaluation of the confidences placed in each of the components comprising a subsurface evaluation and an associated development scheme as captured through the static and dynamic complexity analyses.

A TMI score provides a measure of how robust or technically consistent a proposed development scheme is given the complexities and uncertainties in the definition of the scheme and of the reservoir(s). For fields with multiple reservoirs, a total aggregated TMI score is calculated using the reserves proportions which are supplied as inputs to the CIRCE-D module. The TMI scores and ranked lists of uncertainties allow comparison with other development schemes and with other projects in a database, assist in planning additional subsurface technical work by highlighting the key uncertainties which are likely to impact the outcomes, and are valuable in determining the relative confidence of the probabilistic production estimates for the field.

A. Maturity Index Weights Look-Up Table (MI Wts LUT)

FIG. 6 shows, as an example, a portion of the Maturity Index Weights Look-Up Table (MI_Wts_LUT) used in the calculation of the TMI. A full table in included in Appendix B of this specification. The MI_Wts_LUT is a matrix where the rows represent the static reservoir components captured through the CIRCE-S module and the columns represents dynamic reservoir components captured through the CIRCE-D module. The matrix value at a particular intersection of a row and a column is typically calculated by a function which defines the impact of uncertainty that that static reservoir component (row) will have on the predicted outcome of a reservoir evaluation, such as a production profile.

Stated alternatively, the MI_Wts_LUT organizes the reservoir components into Controlled versus Uncontrolled variables. The rows are primarily the static reservoir components as defined in CIRCE-S, which are generally Uncontrolled as a consequence of the inherent variability of the subsurface and the incomplete knowledge of its configuration. The columns in the MI_Wts_LUT represent the dynamic reservoir components from the CIRCE-D inputs, which are typically Controlled variables, determined by the design and implementation of a development scheme.

As an example of how the MI_Wts_LUT weighting functions can be established for a matrix cell representing a selected Controlled variable (dynamic component), a MI_weight function is developed by establishing an agreed answer to the question "For this particular dynamic reservoir component (Controlled variable), how important to our assessment is the certainty in the estimate of the static reservoir component (Uncontrolled variable) which this cell represents?" A value of "0" means it is completely irrelevant. A score of "3" indicates it is of high importance.

In the present embodiment, some of the static (Uncontrolled) subsurface component variables are captured in the CIRCE-D module for convenience (since a Petroleum Engineer is better able to provide these inputs than would be an Earth Scientist.) Consequently, these components may appear as both Controlled and Uncontrolled variables in the MI_WTS_LUT (e.g., Mobility Ratio component). In these cases, the cell which is at the intersection of the row and column representing, e.g., the Mobility Ratio, has its MI_weight set to "0". Appendix B provides the entire listing of columns and rows which make up an exemplary MI_Wts_LUT. For convenience, this table has been split up with the first five pages containing the upper half of the matrix while the last five pages contain the lower half.

Elsewhere in the MI_Wts_LUT, non-zero weights are dynamically calculated using weighting functions. In the present embodiment, the functions have been determined by a group of experts establishing the sensitivity of each Controlled variable (dynamic component) to each Uncontrolled variable (static component), with the individual MI_weights lying within a range of 0 to 3. In cases where there is no perceived sensitivity, the MI_weight for that variable pair is fixed at 0 (zero). In other cases, the sensitivity may be fixed in the range 1 to 3, i.e., the Controlled variable sensitivity to the Uncontrolled variable is independent of other variables (Controlled or Uncontrolled). In yet other cases, a Controlled variable may be sensitive to a combination of other variables (Controlled and/or Uncontrolled) and the MI_weight is calculated by evaluating a dynamic formula incorporating multiple component scores as variables.

EXAMPLE 3

For this example, consider the cell in FIG. 6 at the intersection of the column headed "Question F2 (5 yr recovery)" and the row labeled "Question A2, DipAvg". The inquiry for determining the LUT entry would be "How important is confidence in the estimate for Average Dip to the estimate of recovery rate (% production in the first 5 years)?"

In the present embodiment, the relevant cell is related to a formula in a LUT (not shown) which includes a functional response:

If [(RecoveryMechanism=IOR), MI_Wt(DipAvg)=2] else MI_Wt(DipAvg)=0

The formula defines that the MI_Weight for the DipAvg component (Uncontrolled variable) in regard to the Recovery Rate component (Controlled variable) is dependent on the answer to the Recovery Mechanism component (Controlled variable) in the dynamic complexity inputs. If the Recovery Mechanism component input to the CIRCE-D module indicates that the development scheme utilizes an Improved Oil Recovery (IOR) mechanism, then the MI_Weight for the DipAvg component in the context of the Recovery Rate component is set equal to 2 (with the possible range of MI_Weights being 0 to 3); otherwise (i.e., with primary recovery only as the Recovery Mechanism in the dynamic reservoir component) then the MI_Weight for the 'DipAvg' component is set to 0 for this matrix cell. In this example, the selected MI_Weight is set to "2".

Numerous types of formulae and nested formulae can be and are used to introduce the desired logic into the calculation of the MI_Weights. Again, groups of experts can readily determine their desired relationships for entry into the MI_Wts_LUT. These relationships, of course, will differ depending on which set of expert(s) determines the relationships and what are their unique and individual backgrounds and experiences.

B. Calculation of the Technical Maturity Index (TMI)

The TMI score is a combination of the MI_Weights with the confidences of the dynamic and static inputs. The first step in calculating the TMI is to determine how much the confidence for each static and dynamic component differs from perfect, i.e., the confidence difference, Δconf=(5—Confidence score) is calculated for each reservoir component. Following this, each MI_Weight in a row from the MI_Wts_LUT (described above) is multiplied by the relevant component confidence difference score (Δconf). The sum of the weighted confidence differences, Σ(MI_Wts*Δconf), is then calculated from all the cells in the MI_Wts_LUT. The TMI is the sum of the weighted confidence differences normalized to the range between 'perfect knowledge' (all confidences=5, all Δconf=0, sum of all weighted confidence differences =0), and 'perfect ignorance' (zero confidence in all components, all Δconf=5, sum of all weighted confidence differences=Σ(MI_Wts*5)): i.e., $$TMI = \left( \frac{\sum (\text{MI\_Wts} * 5) - \sum (\text{MI\_Wts} * \Delta conf)}{\left(\sum (\text{MI\_Wts} * 5)\right)} \right)$$

The TMI therefore ranges between 0.0 and 1.0. Note that the value of Σ(MI_Wts*5) typically is different for different development schemes.

Figure 7:
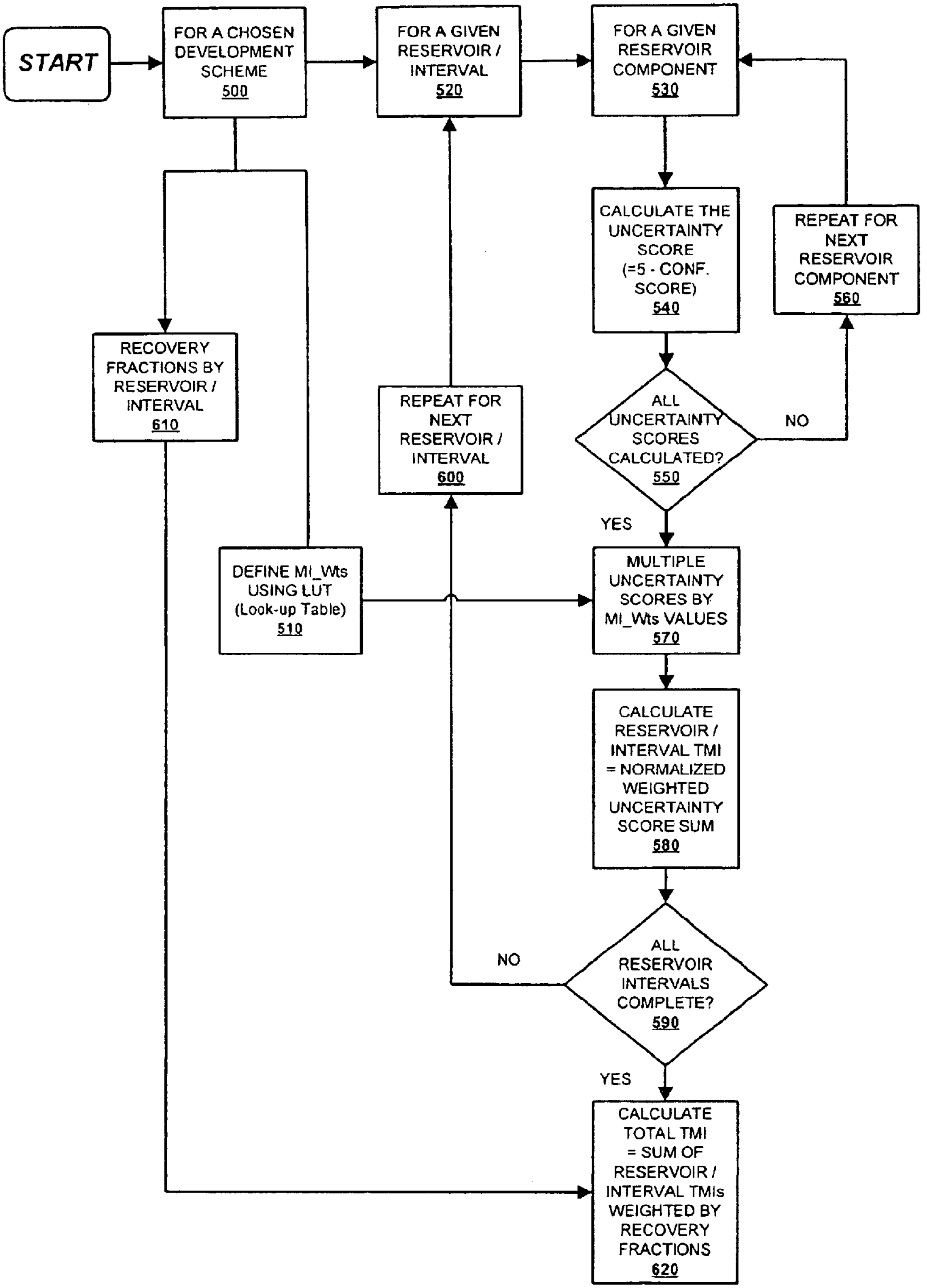
FIG. 7 illustrates a flowchart describing steps made in calculating a Technical Maturity Index.

FIG. 7 illustrates the process flow by which the CIRCE-M module uses the uncertainties associated with the key drivers of a proposed development scheme and combines them into a weighted score (TMI) which reflects the level of technical maturity of the proposed project. A particular development scheme (step 500) is first chosen. The MI_Wts for this development scheme are then created (step 510) by answering the question, "For this particular dynamic reservoir component (Controlled variable), how important is the certainty in the static reservoir component (Uncontrolled variable) which this cell represents to outcome?" Then for a given reservoir/interval (step 520) and for a given reservoir component (step 530), a calculation (step 540) is made to determine an uncertainty score, i.e. (5—Confidence Score). This process is repeated (step 560) until all uncertainty scores are calculated (step 550). A summation is then made (step 580) of the uncertainty scores multiplied by the corresponding MI_Wts values from the MI_Wts LUT. The reservoir/interval TMI is calculated (step 580) to produce a normalized weighted uncertainty score sum. This process is continued (step 600) until all reservoir intervals of interest have been considered (step 590). The recovery fraction by reservoir/interval are then introduced (step 610) and the total TMI is calculated (step 620) which is equal to the sum of the reservoir/interval TMI's multiplied (weighted) by the recovery fractions for the respective intervals.

In simple terms, the TMI calculates an answer to the question, "Based on what is known and unknown in the subsurface, what is the likelihood of the project outcomes being as predicted (i.e., that this will be a technically successful project)?" The TMI is a value which theoretically ranges from 0.0 to 1.0, where 1.0 indicates that all components of the subsurface which impact the performance of a development scheme are known with absolute confidence and 0.0 indicates that there is zero confidence in all the significant components of the subsurface for this development scheme. The TMI, therefore, provides a quality measure for the technical evaluation of the subsurface, at a given point in time, in terms of the reliability of the probabilistic performance predictions. A low TMI may be associated with a broad P10–50–90 range of outcomes, but in addition a low TMI indicates that the P50 value and the shape of the cumulative probability distribution ("S-curve") are poorly constrained. The TMI therefore provides a quality measure for probabilistic predictions.

C. Pareto Chart

Figure 8:
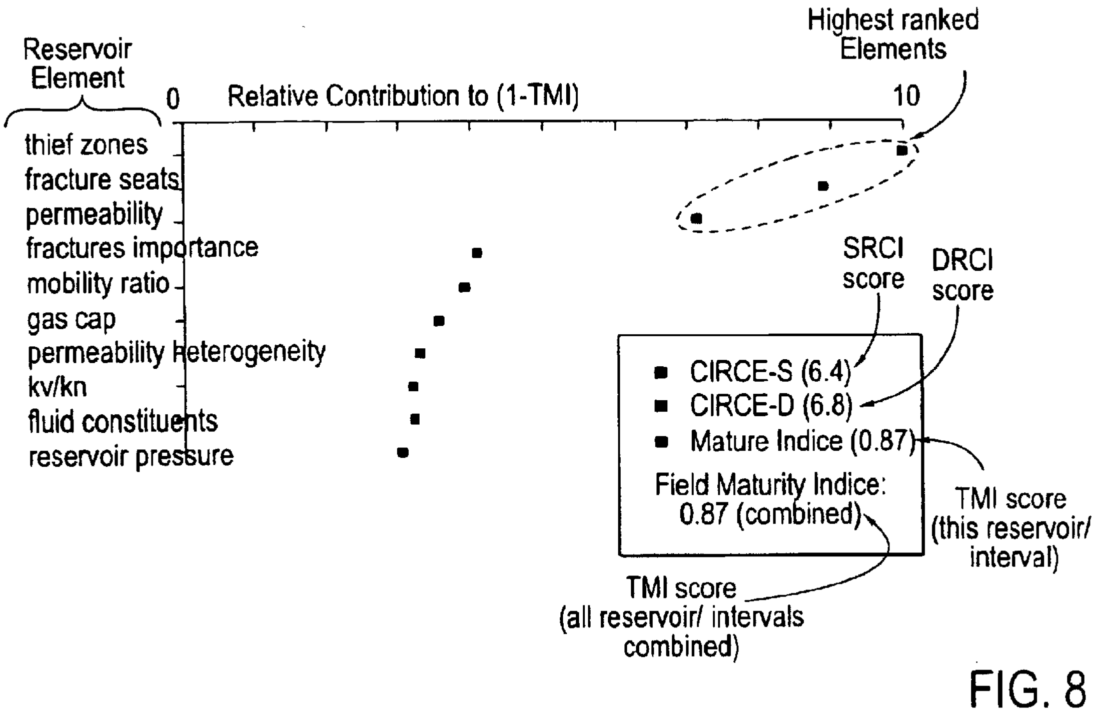
FIG. 8 shows an exemplary Pareto chart displaying the top ten ranked reservoir components which limit the technical maturity of a project.

FIG. 8 shows a Pareto Chart. To identify the most crucial items for the TMI, the tool determines which reservoir components are most responsible for the TMI being less than 1.0, i.e., which components contribute the most to the sum of all weighted confidence differences. This is determined by calculating the row sums in the MI_Wts_LUT, and then ranking the static and dynamic reservoir components (i.e., Uncontrolled and Controlled variables) by the row sums. The results for the top 10 reservoir components row sums are then normalized to a maximum of 10 and plotted in a Pareto chart. The Pareto chart shows which elements contribute most to the difference between the project's TMI score and a score of 1.0. In this case, the confidence assessment in estimating the "thief zone" is the most important to the difference.

The confidence assessments for each individual component are measures of uncertainty. The key intent of the TMI is to weigh these uncertainties by relevance (potential impact) for the development scheme being considered.

D. Comparison of TMI Between Projects

Figure 9:
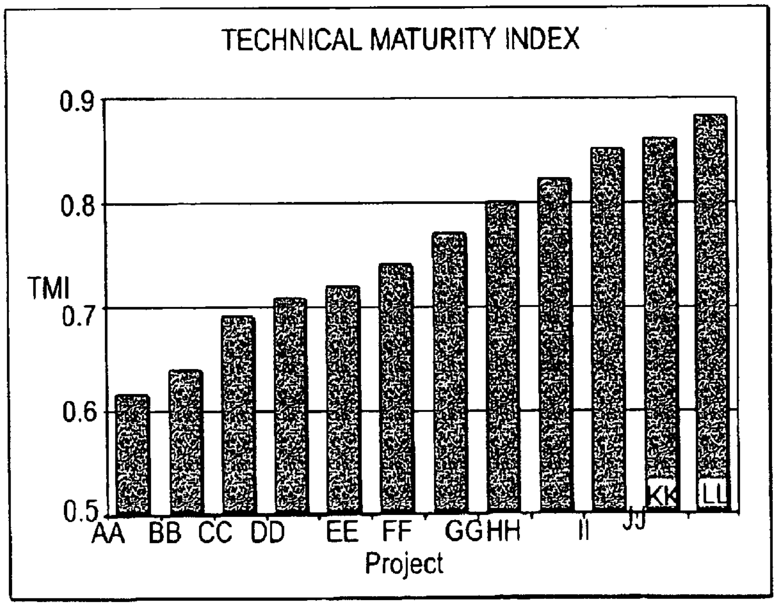
FIG. 9 illustrates a comparison of technical maturity indices (TMI) for a number of projects.

FIG. 9 illustrates a range of projects evaluated by the CIRCE tool to arrive at TMI scores which correspond to the maturity of the evaluations. Projects typically progress to higher TMI scores when the amount of data and levels of analyses increase overtime.

Examples of projects where low TMI scores are likely include early farm-in evaluations, or projects evaluated immediately following the drilling of a discovery well (e.g., project AA). Projects in mature fields and areas would typically have a relatively high TMI (e.g., project LL). The TMI score for a project typically will increase with time as new data and analyses are incorporated in the evaluation. Similarly, the TMI for an Operator's evaluation of a project could be significantly higher than that of a partner or potential purchaser if the Operator has access to more data or has a higher level of confidence in the reservoir characterisation and the development scheme definition.

Note that the TMI does not address the economic or business basis for decision making but is focused strictly on the current state of a technical subsurface evaluation. Consequently, there is no 'threshold' TMI required for a project to proceed to sanction (otherwise, for example, a typical new venture or farm-in would never be pursued since by definition the project is immature). The TMI provides a quality measure to be included in a project decision, but in isolation can not be used to select an alternative project (e.g., from FIG. 9, PROJECT LL is evaluated by the CIRCE tool as more mature than PROJECT AA, but PROJECT LL does not represent a preferred opportunity when economic and commercial issues are included in the decision-making process).

while in the foregoing specification this invention has been described in relation to certain preferred embodiments thereof, and many details have been set forth for purposes of illustration, it will be apparent to those skilled in the art that the invention is susceptible to alteration and that certain other details described herein, including the number, scope and detail of the questions, the scoring mechanisms, and the depiction of results, can vary considerably without departing from the basic principles of the invention.

What is claimed is:

1. A method for computing an evaluation index for an evaluation of a reservoir, the method comprising the steps of:

(a) making estimates of reservoir components which are associated with a subsurface reservoir evaluation;

(b) making estimates of confidence values for the estimates of the reservoir components; and (c) computing an evaluation index for the evaluation of the reservoir based upon at least one of the estimates of the reservoir components and the estimates of the confidence values.

2. The method of claim 1 further comprising:

(a) determining component complexity scores associated with the estimate of the reservoir components; and (b) computing a complexity index as the evaluation index based upon the complexity scores.

3. The method of claim 1 further comprising:

(a) determining confidence scores associated with the estimate of the confidence values; and (b) computing a confidence index as the evaluation index based upon the confidence scores.

4. The method of claim 1 wherein:

the reservoir components include at least one subsurface characteristic component.

5. The method of claim 1 wherein:

the reservoir components include at least one developmental scheme component of the reservoir.

6. The method of claim 1 wherein:

the reservoir components include at least one of a subsurface characteristic component and at least one developmental scheme characteristic.

7. The method of claim 1 wherein:

estimating confidence values is made in cooperation with a graphic feedback display which depicts at least one probability curve dependent upon the relative level of an estimated confidence value.

8. The method of claim 1 wherein:

at least one of the estimates of the reservoir components and the confidence values is made in response to literal and numerical descriptions.

9. The method of claim 1 wherein:

a complexity look-up table is used to establish the relationship between the estimate of reservoir components and their associated complexity scores.

10. The method of claim 9 wherein:

the complexity look-up table is updated using an experience based knowledge updating scheme.

11. The method of claim 1 wherein:

a non-linear weighting scheme is used in computing the complexity index.

12. The method of claim 11 wherein:

the weighting scheme is one an exponentiated power law average scheme and an arithmetic power law scheme and a logistic sigmoid exponential weighting scheme.

13. The method of claim 2 further comprising:

determining which of the estimates of the reservoir components is most outcome determinative in computing the complexity index.

14. The method of claim 13 further comprising:

(a) visually displaying an data input tree which includes input nodes representative of reservoir components and connecting branches leading to an output node representative of the overall complexity index; and (b) visually displaying which branch of the data input tree is most outcome determinative of the complexity index.

15. The method of claim 3 further comprising:

(a) visually displaying an data input tree which includes input nodes representative of reservoir components and connecting branches leading to an output node representative of the overall confidence index; and (b) visually displaying which branch of the data input tree is most outcome determinative of the confidence index.

16. The method of claim 1 wherein:

the evaluation index is a technical maturity index (TMI) for the reservoir evaluation which is a function of the confidence values for the reservoir components and a function of maturity index weights which relate the impact of uncertainty that a reservoir component will have on the predicted outcome of a reservoir evaluation.

17. The method of claim 16 wherein:

a maturity lookup table is used to determine the estimated maturity index weights.

18. The method of claim 16 further comprising:

determining which of the confidence scores associated with a reservoir component is most outcome determinative of the TMI score.

19. The method of claim 1 wherein a technical maturity index is calculated using the following formula:

$$TMI = \left( \frac{\sum (\mathrm{MI\_Wts} * 5) - \sum (\mathrm{MI\_Wts} * \Delta conf)}{(\sum (\mathrm{MI\_Wts} * 5)} \right)$$

where TMI=technical maturity index;

MI_Wts=maturity index weight; and

Δconf=confidence difference between perfect knowledge and the confidence score for an estimate of a reservoir component.

20. A computer readable media containing executable code for carrying out the operational steps of:

(a) making estimates of reservoir components which are associated with a subsurface reservoir evaluation;

(b) making estimates of confidence values for the estimates of the reservoir components; and (c) computing an evaluation index for the evaluation of the reservoir based upon at least one of the estimates of the reservoir components and the estimates of the confidence values.

21. The media of claim 20 further carrying out operational steps comprising:

(a) determining component complexity scores associated with the estimate of the reservoir components; and (b) computing a complexity index as the evaluation index based upon the complexity scores.

22. The media of claim 20 further carrying out operational steps comprising:

(a) determining confidence scores associated with the estimate of the confidence values; and (b) computing a confidence index as the evaluation index based upon the confidence scores.

23. The media of claim 20 wherein:

the reservoir components include at least one of a subsurface characteristic component and at least one developmental scheme characteristic.

24. The media of claim 20 wherein:

estimating confidence values is made in cooperation with a graphic feedback display which depicts at least one probability curve dependent upon the relative level of an estimated confidence value.

25. The media of claim 22 further carrying out the operational steps of:

(a) visually displaying an data input tree which includes input nodes representative of reservoir components and connecting branches leading to an output node representative of the overall complexity index; and (b) visually displaying which branch of the data input tree is most outcome determinative of the complexity index.

26. The media of claim 22 further carrying out the operational steps of:

(a) visually displaying an data input tree which includes input nodes representative of reservoir components and connecting branches leading to an output node representative of the overall confidence index; and (b) visually displaying which branch of the data input tree is most outcome determinative of the confidence index.

27. The media of claim 22 wherein:

the evaluation index is a technical maturity index (TMI) for the reservoir evaluation which is a function of the confidence values for the reservoir components and a function of maturity index weights which relate the impact of uncertainty that a reservoir component will have on the predicted outcome of a reservoir evaluation.

28. The media of claim 27 wherein:

the technical maturity index is calculated using the following formula:

$$TMI = \left( \frac{\sum (\mathrm{MI\_Wts} * 5) - \sum (\mathrm{MI\_Wts} * \Delta conf)}{\left(\sum (\mathrm{MI\_Wts} * 5)\right)} \right)$$

where TMI=technical maturity index;

MI_Wts=maturity index weight; and

Δconf=confidence difference between perfect knowledge and the confidence score for an estimate of a reservoir component.

* * * * *

UNITED STATES PATENT AND TRADEMARK OFFICE

CERTIFICATE OF CORRECTION

PATENT NO. : 6,810,332 B2
APPLICATION NO. : 10/356266
DATED : October 26, 2004
INVENTOR(S) : Harrison It is certified that error appears in the above-identified patent and that said Letters Patent is hereby corrected as shown below:

Please Delete columns 1 line 1 through columns 20 line 20 and Insert columns 1 line 1 through columns 108 line 19

Signed and Sealed this

Eighteenth Day of November, 2008

JON W. DUDAS
*Director of the United States Patent and Trademark Office*

1

METHOD FOR COMPUTING COMPLEXITY, CONFIDENCE AND TECHNICAL MATURITY INDICES FOR RESERVOIR EVALUATIONS

TECHNICAL FIELD

The present invention relates to methods which quantify the complexities of underground reservoirs and evaluate the reliability of forecasts of oil and/or gas production from such underground reservoirs.

BACKGROUND OF THE INVENTION

Subsurface evaluations of oil and gas reservoirs are always subject to limits imposed by data quality and availability, resources, timing and costs. As a consequence, decision making should include consideration of the risks and uncertainties associated with an evaluation. Decision Analysis (DA) methods for evaluating and communicating the risks in terms of outcomes, given some defined probability distributions, are intended to be unbiased and accurate. However, comparisons of forecast and actual outcomes for projects typically show that more projects outcomes are below the median forecast (P50) values than above, indicating that in general the input probability distributions used are inaccurate and biased.

Evaluating the potential production of hydrocarbons from an underground reservoir is important in determining the economic viability of an oil- or gas-field development scheme. Several tools exist which assist in making such evaluations and predictions of oil or gas-field performance. These tools also help in deciding how best to develop a field and how to plan for contingencies related to the uncertainties in the knowledge of the subsurface characteristics of the field.

One such tool for assessing the difference between actual and predicted outcomes for a field development is a software application known as GEOSCORE™. GEOSCORE utilizes a method for quantifying anticipated changes in field reserve estimates based on an assessment of subsurface complexity. GEOSCORE assesses scores, on a 1–5 scale, from nine descriptive categories to determine an overall GEOSCORE complexity value. For a particular descriptive component, a score of 1 is associated with reservoirs which have a minimal degree of complexity while a score of 5 implies that the reservoir has a very high degree of complexity for that component. A summation of the nine scores provides the GEOSCORE complexity value. Analysis of GEOSCORE results has shown that fields with relatively low GEOSCORE complexity values are often underestimated in terms of actual production capability. Conversely, the production capability of fields which have very high complexity values often are overestimated due to the adverse effects that complexity can have on the actual producibility of the field. As published, the GEOSCORE estimates are based only on subsurface characteristic components and do not take into account effects on producibility relating to dynamic (reservoir engineering) components which depend on the development scheme selected for a field. Furthermore, no consideration is given to the certainty in the estimates of subsurface characteristic components.

Another tool which can be used to estimate the subsurface complexity of an oil- or gas-field is a software package referred to as GEOFACTOR which was developed by RDS (United Kingdom) and published as a tool via their web-site. This program also suffers from the same shortcomings as GEOSCORE, i.e., no accommodations are made for the chosen developmental schemes or the uncertainty in estimates made for the subsurface characteristics.

2

Continued widespread and variable inconsistencies between predicted field production and reserves and actual outcomes show there is a need for methods, software tools and analyses which can assess the confidence which should be placed in probabilistic reservoir performance predictions. The present invention is intended to address this need.

SUMMARY OF THE INVENTION

The present invention includes an evaluation tool which is intended to help improve the assessment of the reliability of probabilistic reservoir production forecasts. The tool provides an indicator of the reliability of the forecast production profiles and reserves estimations. Moreover, a list of the uncertainties in the subsurface evaluation is ranked by likely impact on the forecasts. The present invention uses simple interactive tools to capture and communicate a broad 'snapshot' of a project's subsurface complexity and the technical maturity of the evaluation, and to highlight the potential impacts that imperfect knowledge of the subsurface may have on the field development outcomes.

In the present implementation, 89 questions have been defined to capture the key subsurface characteristics and development scheme components of a particular reservoir and development project. A key feature of the analysis is the incorporation of uncertainty into the estimates of the reservoir components used to characterize the reservoir and production development scheme(s). A user's assessments of the input values for the key components and the uncertainty or confidence of these assessments are captured during the analysis via novel "Graphic Feedback" displays of implied probability distributions.

The present invention provides a method and a computer-readable medium containing executable code for computing an evaluation index for an evaluation of a reservoir. The method comprises the steps of:

(a) making estimates of reservoir components which are associated with a reservoir evaluation;

(b) making estimates of confidence values for the estimates of the reservoir components; and (c) computing an evaluation index for the reservoir evaluation based upon at least one of the estimates of the reservoir components and the estimates of the confidence values.

The evaluation index may be a complexity index, a confidence index or a technical maturity index. Ideally, the method further includes determining complexity scores associated with the estimate of the reservoir components and also determining confidence scores associated with the estimate of the confidence values. An overall complexity index can be computed from the complexity scores and an overall confidence index can be calculated utilizing the confidence scores.

The estimates of the reservoir components and the confidence values may be made in response to literal and numerical descriptions. Further, estimates of the confidence values may be made in cooperation with a graphic feedback display which depicts at least one probability curve dependent upon the relative level of an estimated confidence value.

Complexity look-up tables may be used to establish the relationship between the estimates of reservoir component complexities and their associated complexity scores. These relationships in the look-up tables are preferably established by a team of experts. Further, ideally these lookup tables can be updated using neural networks or other experience-based knowledge updating schemes. The technical maturity index (TMI) for the reservoir evaluation may be calculated which is a function of the confidence values for the reservoir components.

The TMI is established by calculating a sum of confidence measures weighted by the TMI weights. The TMI weights relate the significance of the confidence of knowing the value for a reservoir component to the predicted outcome of a reservoir evaluation, such as a production profile. These TMI weights are preferably established through the use of expert-determined relationships. In some cases, the weight is set to zero when there is believed to be virtually no impact of uncertainty in an estimate of a reservoir component on a predicted outcome. In other cases, there may be significant dependency between the certainty of the estimate of the reservoir component and a predicted outcome, which is reflected by the TMI weight.

Technical maturity, complexity and confidence indices can be established for a field containing several reservoirs. The TMI can be useful in determining the probability that a field will produce in accordance with predictions. Comparisons between indices in different fields can be useful when ranking a project and as an input to decision-making.

It is an object of this invention to provide both a method and computer readable media containing executable code for carrying out the method which calculates both static (subsurface characteristics) and dynamic (petroleum engineering) complexity and confidence indices, and furthermore, an overall Technical Maturity Index for a subsurface reservoir evaluation and an associated development scheme.

Another object is to highlight the key factors ("reservoir components") impacting the assessment of the Technical Maturity of a reservoir or field evaluation.

Yet another object is to provide an auditable trail of how a field's technical evaluation progresses over time, and which uncertainties are identified as crucial at the time of the evaluation.

BRIEF DESCRIPTION OF THE DRAWINGS

These and other objects, features and advantages of the present invention will become better understood with regard to the following description, pending claims and accompanying drawings where:

FIG. 1 is a flowchart showing an overview of steps, in accordance with the present invention, used in calculating static (CIRCE-S) complexity and confidence indices, dynamic (CIRCE-D) complexity and confidence indices, and a Technical Maturity Index (CIRCE-M) for a project;

FIG. 2 depicts a data input tree used in a CIRCE-S module for subsurface characteristic complexity and confidence analyses;

FIG. 3 shows a data input tree used in a CIRCE-D module for developmental scheme complexity and confidence analyses;

FIG. 4 shows a flowchart of the steps used in calculating complexity and confidence indices;

FIGS. 5A-C illustrate exemplary pop-up screens used in prompting a user for estimates of values for reservoir components and associated confidence values with the assistance of feedback displays including probability curves;

FIG. 6 illustrates a portion of a Technical Maturity Index (TMI) Weights Look-Up Table (MI_Wts_LUT) showing exemplary weights used in calculating a Technical Maturity Index;

FIG. 7 illustrates a flowchart describing steps made in calculating a Technical Maturity Index;

FIG. 8 shows an exemplary Pareto chart displaying the top ten ranked reservoir components which limit the technical maturity of a project; and FIG. 9 illustrates a comparison of technical maturity indices (TMI) for a number of projects.

DETAILED DESCRIPTION OF THE INVENTION

I. Introduction

The software tool of the present invention is referred to as the CIRCE tool or program. CIRCE is an acronym for Complexity Indices for Reservoir Characterization and Evaluation. The CIRCE tool is used to determine the Technical Maturity Index for a subsurface characterization and an associated development scheme used as a basis for production forecasts and reserves estimates. The calculated Technical Maturity Index, based on evaluations of subsurface characteristic and development scheme complexities and uncertainties, allows relative confidence levels for probabilistic forecasts and estimates to be assessed. Further, the tool calculates complexity and confidence indices for subsurface characteristic (static) analyses and developmental scheme (dynamic) analyses of a reservoir or field evaluation.6

II. Project Definition

A project may consist of a field with multiple reservoirs each with separate subsurface characteristics and individual development schemes, and may also contain several alternative development schemes. The reservoirs comprising a field can be addressed individually or as aggregates. In the latter case, user inputs represent aggregated values estimated externally to the application. If multiple reservoirs are defined for a project, the proportion of total hydrocarbon-in-place ("HCIP") estimated for each reservoir is also provided as part of the project definition to facilitate subsequent calculation of aggregated static complexity scores. A project can have multiple development schemes defined. For projects with multiple reservoirs, each development scheme definition includes the amount of hydrocarbons recovered from each reservoir as a fraction of the total hydrocarbons recovered for the field over some period.

III. Overall Process Flow Through the Circle Tool

FIG. 1 shows a flow chart which illustrates that various inputs relating to subsurface characteristics and development scheme components of a reservoir and the relative confidence level in the accuracy of each respective input, are entered into the CIRCE program. These inputs are converted into relative complexity scores and confidence scores. These scores are used in the calculation of complexity and technical maturity indices plus various supporting information. As shown in FIG. 1, the CIRCE tool calculates (1) a Static Reservoir Complexity Index (SRCI) and a Static Confidence Index (SCI) in a CIRCE-S module; (2) a Dynamic Reservoir Complexity Index (DRCI) and associated Dynamic Confidence Index in a CIRCE-D module; and (3) an overall Technical Maturity Index (TMI) in a CIRCE-M module of the program.

In general "static" reservoir components arise from subsurface characteristics and are assessed by earth scientists, whereas "dynamic" reservoir components are mostly dependent on development plans and engineering issues and are assessed by petroleum engineers. In practice, these reservoir components are typically assessed during work sessions of multi-disciplinary project teams.

The Static Reservoir Complexity Index (SRCI) score is a measure of the inherent complexity in a reservoir arising from the structural form, geometries, depositional environment and petrophysical issues. A SRCI score and its associated Static Confidence Index (SCI) provide measures of how complex the subsurface (geological) definition of a reservoir is and how well this complexity is defined at the time of an evaluation.

The Dynamic Reservoir Complexity Index (DRCI) score is primarily determined by the complexity of an actual or proposed recovery mechanism and development plan for a particular reservoir. The DRCI score and associated Dynamic Confidence Index (DCI) suggest the relative complexity introduced by the proposed development scheme and the certainty with which the details of that scheme are known.

Referring to FIG. 1, a project is first defined (step 100) in the CIRCE tool. The project definition includes the number of reservoirs or intervals and the HCIP fractions for those reservoirs. Upon entry into a CIRCE-S module, data is input (step 10) related to the estimates of a number of static reservoir components. Further in this step, data is input for the confidence value that a user has in their estimate of a reservoir component. The CIRCE-S module then computes (step 120) a static reservoir complexity index (SRCI) and static confidence index (SCI) for each reservoir or interval A data input tree (see FIG. 2) is used to display the SRCI, the SCI, calculation branches and reservoir components which are most outcome determinative in the computations of the SRCI and SCI (tracebacks). After entering the estimates for the reservoir components and their relative confidence values in those estimates and computing the SRCI and SCI for each reservoir or interval, an overall SRCI and SCI can be calculated (step 140) for the project. The CIRCE tool may then graphically display (step 150) the ranking of the SRCI for this project against other projects in a database.

In a similar fashion, the CIRCE tool employs a CIRCE-D module. For each alternative development scheme for producing oil and/or gas from a reservoir, data defining estimates of dynamic reservoir components and their relative confidence values is input (step 160). A Dynamic Reservoir Complexity Index (DRCI) and Dynamic Confidence Index (DCI) is computed based upon these user inputs for each reservoir or interval. Again, a data input tree (see FIG. 3) is displayed (step 180) on which the DRCI and DCI are annotated. Also, trace backs are highlighted showing which calculations and entries of estimates of reservoir components and estimates of confidence values are most outcome determinative in computing the DRCI and DCI. This process of computing DRCI's and DCI's is repeated for the selected alternative development scheme for each reservoir or interval in the project. An overall DRCI and DCI is then computed (step 190) for the selected alternative development scheme for the project. The overall DRCI and DCI for each develop scheme can be ranked and displayed (step 200) relative to other schemes in the project.

Finally, the CIRCE tool employs a CIRCE-M module to calculate a Technical Maturity Index (TMI) for the project. The estimates of the static and dynamic reservoir components and their associated estimates of confidence values, which have been entered in the CIRCE-S and CIRCE-D modules, are used in the CIRCE-M module to calculate (step 210) the TMI for each reservoir or interval for the defined development scheme. The overall TMI for the project is then calculated (step 220). Finally, a graphic display is made (step 230) of this TMI ranked against the TMI's of other projects in a database.

IV. Characterizing Reservoir Components

Questions are put forth to a user to characterize each of the subsurface characteristic and development scheme reservoir components of interest. Questions in subgroups A–E correspond to requests for characterizations of static reservoir components needed by the CIRCE-S module and questions in subgroups F–J relate to dynamic reservoir components input in the CIRCE-D module. Alphanumeric identifiers are located within input nodes of the data input trees of FIGS. 2 and 3 which correspond to the questions in Appendix A. The input nodes are linked together into summation "roll-up" nodes as the information from a particular subset or branch of trees are combined to produce intermediate computations, eventually leading to the computations of the SRCI and DRCI and related confidence indices for a particular reservoir and proposed development scheme.

In this particular exemplary embodiment of this invention, a maximum 76 questions are presented which are listed in Appendix A—QUESTIONS FOR CHARACTERIZING RESERVOIR COMPONENTS. Depending on the answer to a particular question, other questions may not be presented as those questions may be irrelevant. For example, question E1 asks whether the development scheme uses primary or enhanced oil recovery. If there is no enhanced oil recovery, i.e., using injection wells, then questions regarding use of injections wells are not presented or used in calculations.

A. Static Subsurface Characteristics Reservoir Components—CIRCES S

Reservoir components in the static or CIRCE-S module are chosen to bring in information concerning the subsurface characteristics of a reservoir. Major subgroups in the CIRCE-S module include (A) Structure; (B) Compartmentalization; (C) Reservoir Architecture; (D) Rock Types; and (E) Petrophysics. As seen in FIG. 2, some of these subgroups are comprised of further subgroups. Subgroups are chosen which consist of subsurface characteristics which are related to one another.

- Structure components include geometric form and closure, depth, fault style and timing, dips, and compartmentalization. (Questions A1–A8 and B1–B2)
- Reservoir Architecture components comprise depositional system, depositional environment, net-to-gross ratio, vertical heterogeneity, and interval thicknesses. (Questions C1–C7)
- Rock Type components relate to lithological components and pay distributions. (Questions D1–D2)
- Petrophysics components include fluid type, contacts, lateral permeability heterogeneity, vertical-to-horizontal permeability ratios, and diagenetic and mineralogical issues. (Questions E1–E18)

B. Dynamic Reservoir Components—CIRCE D

Within a project several alternative development schemes can be considered. A development scheme can include different dynamic reservoir components for each reservoir if multiple reservoirs are defined in the project. When defining a development scheme for a project with multiple reservoirs, an estimate of the proportion of reserves expected to be recovered from each reservoir defined for the project is input by the user as part of the development scheme definition to control the subsequent aggregation of Dynamic Reservoir Complexity Index (DRCI) and Technical Maturity Index (TMI) scores.

For a given development scheme, there is a subset of dynamic components which are common to all individual reservoirs which produce hydrocarbons in that scheme. These common components are collected along three primary input branches in FIG. 3 and include (H) Unwanted fluids, (I) Production well design, and (J) Injection well design. These reservoir components are common to all reservoirs in a field. Ideally, these values need be input only once and will be utilized by the CIRCE tool for each of the reservoirs this scheme applies to.

Unwanted fluids components include excessive water production, water production, excessive gas, and gas disposition (Questions H1–H4)

Production well design components comprise co-mingled completions, sub-sea trees, infill drilling, well recompletions, and remedial well profile control (Questions I4–I6 and I11–I12)

Injection well design components capture forecast-sub-sea trees, forecast-infill drilling, well recompletions, and remedial well profile control (Questions J5–J6 and J9–J10)

For an individual reservoir or group of reservoirs, within a given development scheme, a set of dynamic reservoir components are then defined using the same input mechanism (pop-up panels) as discussed for the static complexity analysis (above). Reservoir components for the reservoir specific assessment of dynamic complexity are arranged along four input branches of the data input tree (F) Reservoir mechanism; (G). Improved Oil Recovery; (I) Production wells; and (J) Injection wells:

Reservoir mechanism components include recovery factor, recovery rate, aquifer support, mobility ratio, reservoir force, reservoir pressure, and the impact of fractures. (Questions F1–F9)

Improved Oil Recovery components include incremental recovery factor, injection fluid type and compatibility, injection well location, and injection rate. (Questions G1–G5)

Production well components include well geometry, completion types, sand control, stimulation, and artificial lift. (Questions I1–I13, I7–I10)

Injection well components include well geometry, injectivity, completion types, sand control, and stimulation. (Questions J1–J4, J7–J8)

Note in FIG. 3 that input node, F1, is connected by any branches to the output node. In this preferred embodiment, input node F1 operates only as a toggle switch to determine whether certain questions may be irrelevant. For example, if development scheme uses a primary recovery and not enhanced oil recovery including injection wells, then no questions will be asked with regard to injection wells nor will their complexity or confidence scores be input.

C. Input of Estimates of Reservoir Components and Corresponding Confidence Values The CIRCE-S and CIRCE-D modules facilitate the capture of the reservoir components which define the static and dynamic characterization of a field, its constituent reservoir(s) and development scheme(s) through a simple interface that, most significantly, includes a user's confidence in each of the estimates of a characterizing reservoir component. FIG. 4 describes how these inputs are then used to create complexity and confidence indices.

Questions from Appendix A are presented to a user by way of pop-up screens or panels in response to a user graphically selecting (step 300 of FIG. 4) one of the input nodes found in FIGS. 2 or 3 to activate the pop-up screen or panels. The pop-up screen will present a question related to a reservoir component. Either a numeric or literal descriptor, or both, is presented to the user which presents a choice of appropriate answers for a particular question. The user selects (step 310) the descriptor which most likely characterizes the subsurface characteristic or the development scheme to input an estimate for that reservoir component. In cases where there is some uncertainty related to the choice of the estimate for the characterization of the reservoir component, the user is also asked to select an estimate of a confidence value associated with the reservoir component descriptor. Accordingly, the user assigns (step 320) a confidence value to the estimate of the reservoir component. This process of assigning complexity and confidence estimates is continued (step 350) until all reservoir components have been characterized (step 340). As will be described below, complexity and confidence scores will be assigned (step 330) to these estimates of complexity and confidence.

EXAMPLE 1

FIGS. 5A–C show exemplary pop-up input panels which are provided to a user in response to selecting input node C3 in FIG. 2. In this case, an estimated value for a reservoir component is requested by the question "What is the Reservoir to Total Reservoir Bearing package ratio within this reservoir/interval?" A user selects the appropriate button or adjusts a slider control to indicate the most likely estimate (mode) for the answer. For this particular question, the ratio must be within a range between 0.0 and 1.0. In FIG. 5A, the estimate for the question characterizing this reservoir component has been selected as "0.75".

Further, the user is also queried with respect to the level of confidence he or she has in their knowledge of this estimate for this ratio. Again, a button is selected or a slider control is adjusted by the user to indicate his or her confidence in the answer selected.

The user is assisted in determining the estimate of confidence for the characterization of reservoir component through the use of a "Graphic Feedback" tool, which is shown at various confidence levels in FIGS. 5A–C. For further details on the "Graphic Feedback" tool, see Appendix B at the end of the specification.

In this example, the user has provided the same input, a ratio of 0.75, as the most likely reservoir component value in each of the screen cases. However, the confidence values selected vary between the screens. Literal descriptors offer assistance in choosing an appropriate confidence value by offering the following choices: (1) Low/Analogues, few wells, poor definition of rock; (2) Moderate Low; (3) Moderate/Several wells, good definition of reservoir rock; (4) Moderate high; and (5) High/Many Wells, precise definition of reservoir rock. These literal descriptors are commensurate with increasing amounts of data and analysis available to evaluate this particular reservoir component. See Appendix A for the list of questions and their answer choices. For other reservoir components, the literal descriptors are defined appropriately.

Moving the arrow on the Confidence Selector within the Low to High range causes the probability curves and the mode, P10, P50 and P90 values annotated on the Graphic Feedback displays of FIGS. 5A–C to be concurrently updated. In FIG. 5A, the Net-to-Gross (NTG) is 0.75. With a high confidence selected, this results in a mode and P50 value of 0.75 and a P10–P90 range of 0.72 to 0.77. FIG. 5B shows that a "moderate" level of confidence has been chosen. The mode value of NTG remains 0.75. However, the P10–P50–P90 values are altered to 0.54, 0.72 and 0.86, respectively. Finally, with low confidence in the estimate for the selected estimate of 0.75 for the NTG, the mode value is 0.75 with a broader range of P10–P50–P90 values at 0.28, 0.63, and 0.90, respectively.

The advantages of using this form of input are that the interactive "Graphic Feedback" tool display.

(1) allows a user to understand how his inputs are being interpreted by the CIRCE tool by relating the inputs directly to P10-50-90 values; and (2) allows interactive updating prior to saving the inputs.

In the manner described above, estimates for the reservoir components and their confidence values are input to the CIRCE-S and CIRCE-D modules until each of the reservoir components of the CIRCE-S and CIRCE-D modules have been characterized and related confidences or certainties estimated.

V. Complexity and Confidence Scoring

A. Complexity Scoring

The CIRCE tool converts (step 330) each of the estimates of the reservoir components, acquired by answering the static and dynamic questions, to a complexity score via Complexity Look-Up Tables (LUT's). The Complexity LUT's for converting each estimate to a complexity score for each of the CIRCE-S and CIRCE-D modules, in the present embodiment, have been determined by a group of experts. The LUT scoring depends on the complexity of the estimate or selected answer for each reservoir component chosen by the answer selector in a particular pop-up panel. These complexity scores are assigned values ranging from 1–10.

EXAMPLE 2

Question A1 from Appendix A asks "How deep is the target reservoir?" This question is presented because reservoirs at greater depths typically have lower reliabilities of production of forecasts than equivalent reservoirs at shallower depths. The complexity score associated with the estimate for this reservoir component will ultimately contribute to the Static Reservoir Complexity Index (SRCI). Table 1 below describes the relationship between the estimate of the target reservoir depth and the assigned complexity scores wich are used by Complexity LUT for the CIRCE-S module.

TABLE 1

LUT Relationship For Depth

| Estimate of Reservoir Component (Feet) | Look-Up Table (LUT) |
|---|---|
| 1000 | 0 |
| 3000 | 1 |
| 5000 | 2 |
| 10000 | 3 |
| 15000 | 5 |
| 25000 | 8 |
| 30000 | 10 |

In the current implementation, a panel of experts has determined that for a reservoir at 1000 feet the component for depth contributes a complexity score of 0 (out of a possible maximum of 10) to the overall structural component of the SRCI. In the contrasting case for a target reservoir at a depth of 30,000 feet, a complexity score of 10 is assigned indicating that the depth of the target reservoir is now a major contributor to the complexity of the structural component of the SRCI. For depths of target reservoirs between 1000 and 30,000 feet, scores are assigned intermediate values between 1 and 10 as shown above. As an example, if a user selects from the corresponding pop-up panel (not shown) an estimate of reservoir depth of 15,000 feet, the LUT assigns a corresponding score of 5.

A group of experts follows the above logic process and establishes appropriate scoring relationships between each estimate (potential answer selected by answer selector) of a reservoir component and a complexity score to be assigned for that estimate. The LUT values may be updated using an experience based knowledge updating scheme. For example, a neural net might be used to update and improve the relationships in the complexity LUT. Appendix A shows many of correlations between the answer choices (estimates) and the assigned complexity scores.

The values within the complexity LUT can be non-linear and/or discrete (as shown above), or can be continuous and evaluated on the basis of a function chosen by expert assessments. For example, the LUT relationship for a depth Z of a target reservoir may alternatively be assigned as:

$$\text{Complexity Score} = 10 * \left(\frac{Z}{30000}\right)^{n}$$

It will be appreciated by those skilled in the art that there are a number of other potential LUT relationships and functions which can be established by experts to reflect their belief in how best to correlate a selected characterizing answer (an estimate of a reservoir component) with a complexity score.

B. Confidence Scoring

In a manner similar to the conversion of estimates for reservoir components into corresponding complexity scores, the estimates for the confidence values are converted into confidence scores for each of the reservoir components. Where the confidence in the reservoir component varies significantly, the slider arrow in a pop-up panel linearly assigns a confidence score of 1 to 5 based upon the position of the selector arrow. Alternatively, where the estimate for the reservoir component is highly certain, a maximum confidence score of "5" may be assigned for all choices of depth for a target reservoir. For example, the depth of a target reservoir is known with great certainty. Therefore, no confidence selector would be offered to a user.

The complexity and confidence scores assigned to an input node are ideally annotated next to that input node in FIGS. 2 and 3. The complexity scores range from 0–10 and the confidence scores vary from 1–5. These annotations allow for ready identification of the particular complexity and confidence scores assigned for each input node (reservoir component).

VI. Aggregation of Complexity and Confidence Scores to Establish Complexity and Confidence Indices

A. Complexity Indices

The static (SRCI) and dynamic (DRCI) complexity indices for a reservoir/interval are calculated by the aggregation ('roll up') of the individual component complexity scores. A key characteristic of the aggregation, in this preferred embodiment, is that it is non-linear such that it emphasizes high complexity component scores in the aggregated total. As currently implemented, an exponential/power law weighting scheme (described below) is employed in which the relative weights incorporate the complexity scores themselves. Once sufficient examples are collected, a neural net or other method can be incorporated into the CIRCE tool to control the aggregation of the complexity scores.

This algorithmic approach to score aggregation is applied successively at each level or subgroup within a data input tree starting at the input node level, until the final aggregated scores which are the Static and Dynamic Reservoir Complexity Indices (SRCI and DRCI) are obtained. After the final score aggregation is completed, the relative contributions and confidences from each node are determined for each roll-up and displayed as an aid in analyzing the results of the CIRCE tool.

B. Aggregation of Scores Within the Application

The questions within the static and dynamic complexity analysis are arranged hierarchically. Within each branch of a data input tree, the complexity scores and confidence scores are aggregated ("rolled up") (steps 360, 370 of FIG. 4) to provide representative complexity and confidence scores at the immediately upstream aggregating node (see FIGS. 2 and 3). These aggregating nodes are depicted in square boxes as opposed to round circles which have been used to identify the input nodes. This process is continued (step 380) until scores for all input nodes have been aggregated (step 390). Similarly, all aggregating nodes are aggregated until the overall complexity and confidence indices have been computed (steps 400, 410). In the example shown in FIG. 2, the aggregated SRCI score is 8.0 and the SCI score is 4.9. In FIG. 3, the aggregated DRCI is 6.0 and DCI is 4.9.

The characteristics of the aggregating or "roll-up" algorithm are that it is stable (non-pathological), propagates high scores (i.e., non-linear), and is adaptable to updating in a machine learning application as and when a database of examples has been obtained. In the currently preferred embodiment of this invention, the algorithm implemented aggregates the complexity scores using an exponentiated power law average which calculates the aggregated score ($S_a$) as the natural log of the power law average of the exponentials of the N input complexity scores $x_i$:

$$S_a = \ln\left[\frac{\sum_{i=1}^{N} e^{p \cdot x_i}}{N}\right]^{\frac{1}{p}}$$

Where p=a power law factor varying greater than 0. When p=1, the aggregating equation becomes a simple exponential average. Increases in the p-factor serve to increasingly emphasize the high complexity components of an aggregate score and can be used to tune the response of the system by calibrating with known outcomes. In the present embodiment of this invention, p is set to "1".

The aggregating algorithm currently used in the application was selected after an evaluation of several feasible alternatives. Other algorithms can be envisaged which would provide a similar response. By way of example, and not limitation, arithmetic, power law, logistic sigmoid, exponential weighting schemes, and other schemes may be used to aggregate the complexity scores.

The input node which contributes the most to the aggregated node with the highest aggregated complexity score is annotated and highlighted on the graphic display to provide a visual 'trace-back' through the data input tree, thus showing the largest contributor to each aggregated complexity score. For example, in FIG. 2, the pathway highlighted by a dashed line advises the user that the 'Fault Timing' component, input node A8, is the largest contributor of complexity to the aggregated node which contributes most to the final static reservoir complexity index (SRCI) score.

The "Fault Timing" component from FIG. 2 contributes 96% of the complexity to the roll-up at aggregation node designated as "A-structure". In turn, this aggregation node contributes 90% of the complexity to the overall SRCI.

Having determined an aggregated complexity score at an aggregated node, the equation can be used to estimate the relative contribution of each input complexity score $x_i$ to the aggregated score. This is done by rearranging the equations defining the aggregate scores:

$$N \cdot e^{p \cdot S_a} = \sum_{i=1}^{N} e^{p \cdot x_i}$$

And then calculating the component contributions $C_{x(i)}$:

$$C_{x(i)} = \frac{e^{p \cdot x_i}}{N \cdot e^{p \cdot S_a}}$$

The value $C_{x(i)}$ represents the proportion of an aggregated score which is contributed by the component complexity score $x_i$.

The confidence scores are aggregated using the proportions calculated using the complexity score for the relevant node (as calculated above) as linear weights. This propagates the relative contribution of each input node into the uncertainty scores. As shown in FIG. 2, the pathway highlighted by the dotted line (trace back) advises the user that the 'Net-to-Gross' component, input node C3, is the largest contributor of uncertainty to the aggregated node which contributes most to the final Static Confidence Index (SCI).

FIG. 3 illustrates the CIRCE-D data Input tree for computing the Dynamic Reservoir Complexity Index (DRCI) and the Dynamic Confidence Index (DCI). These calculations are made in the fashion described above with regard to CIRCE-S. The DRCI is 6 and the DCI is 4.9. Trace-backs show that input node F9—"Fractures Importance" is the critical component to the overall DRCI and input node J4—Co-mingled Completions" is the most outcome determinative of the components to DCI.

Upon calculation of the SRCI and DRCI scores, the CIRCE-S and CIRCE-D modules highlight the principal sources of static and dynamic complexity and the prime sources of uncertainty in the analyses on respective graphical displays. For fields with multiple reservoirs, total field aggregated scores are calculated using the proportions of HCIP and reserves proportions which were captured in the project definition and input to the CIRCE-D module. For example, if the HCIP for a first reservoir is 60% of the total HCIP, and a second reservoir has a HCIP of 40%, then the overall SRCI=0.60*SRCI (reservoir 1)+0.40*SRCI (reservoir 2). If the respective reserve proportion of the first reservoir and second reservoirs is 30% and 70%, then the overall DRCI=0.30*DRCI (reservoir 1)+0.70*DRCI (reservoir 2).

A high level of static and dynamic subsurface complexity in and of themselves will not necessarily lead to inaccurate predictions. For instance, the case of a geologically complex but mature field with excellent data and many years of production would be an example where a high static complexity and a high dynamic complexity may be perfectly aligned and therefore accurate and reliable performance predictions could be expected.

These types of situations are addressed by the CIRCE-M module of the tool, which relates the factors necessary for accurate predictions of the performance of a proposed development scheme to the understanding of subsurface complexity and the confidence in the subsurface evaluation.

VII. Overview of the Technical Maturity Index

The CIRCE-M module calculates the technical maturity of a project based on the inputs to the static and dynamic subsurface characterizations provided in the CIRCE-S and CIRCE-D modules. The results are presented in terms of a "Technical Maturity Index" score which is a measure of the overall technical maturity of the subsurface project. The TMI is based on a weighted ranked evaluation of the confidences placed in each of the components comprising a subsurface evaluation and an associated development scheme as captured through the static and dynamic complexity analyses.

A TMI score provides a measure of how robust or technically consistent a proposed development scheme is given the complexities and uncertainties in the definition of the scheme and of the reservoir(s). For fields with multiple reservoirs, a total aggregated TMI score is calculated using the reserves proportions which are supplied as inputs to the CIRCE-D module. The TMI scores and ranked lists of uncertainties allow comparison with other development schemes and with other projects in a database, assist in planning additional subsurface technical work by highlighting the key uncertainties which are likely to impact the outcomes, and are valuable in determining the relative confidence of the probabilistic production estimates for the field.

A. Maturity Index Weights Look-Up Table (MI Wts LUT)

FIG. 6 shows, as an example, a portion of the Maturity Index Weights Look-Up Table (MI_Wts_LUT) used in the calculation of the TMI. A full table in included in Appendix B of this specification. The MI_Wts_LUT is a matrix where the rows represent the static reservoir components captured through the CIRCE-S module and the columns represents dynamic reservoir components captured through the CIRCE-D module. The matrix value at a particular intersection of a row and a column is typically calculated by a function which defines the impact of uncertainty that that static reservoir component (row) will have on the predicted outcome of a reservoir evaluation, such as a production profile.

Stated alternatively, the MI_Wts_LUT organizes the reservoir components into Controlled versus Uncontrolled variables. The rows are primarily the static reservoir components as defined in CIRCE-S, which are generally Uncontrolled as a consequence of the inherent variability of the subsurface and the incomplete knowledge of its configuration. The columns in the MI_Wts_LUT represent the dynamic reservoir components from the CIRCE-D inputs, which are typically Controlled variables, determined by the design and implementation of a development scheme.

As an example of how the MI_Wts_LUT weighting functions can be established for a matrix cell representing a selected Controlled variable (dynamic component), a MI_weight function is developed by establishing an agreed answer to the question "For this particular dynamic reservoir component (Controlled variable), how important to our assessment is the certainty in the estimate of the static reservoir component (Uncontrolled variable) which this cell represents?" A value of "0" means it is completely irrelevant. A score of "3" indicates it is of high importance.

In the present embodiment, some of the static (Uncontrolled) subsurface component variables are captured in the CIRCE-D module for convenience (since a Petroleum Engineer is better able to provide these inputs than would be an Earth Scientist.) Consequently, these components may appear as both Controlled and Uncontrolled variables in the MI_WTS_LUT (e.g., Mobility Ratio component). In these cases, the cell which is at the intersection of the row and column representing, e.g., the Mobility Ratio, has its MI_weight set to "0". Appendix B provides the entire listing of columns and rows which make up an exemplary MI_Wts_LUT. For convenience, this table has been split up with the first five pages containing the upper half of the matrix while the last five pages contain the lower half.

Elsewhere in the MI_Wts_LUT, non-zero weights are dynamically calculated using weighting functions. In the present embodiment, the functions have been determined by a group of experts establishing the sensitivity of each Controlled variable (dynamic component) to each Uncontrolled variable (static component), with the individual MI_weights lying within a range of 0 to 3. In cases where there is no perceived sensitivity, the MI_weight for that variable pair is fixed at 0 (zero). In other cases, the sensitivity may be fixed in the range 1 to 3, i.e., the Controlled variable sensitivity to the Uncontrolled variable is independent of other variables (Controlled or Uncontrolled). In yet other cases, a Controlled variable may be sensitive to a combination of other variables (Controlled and/or Uncontrolled) and the MI_weight is calculated by evaluating a dynamic formula incorporating multiple component scores as variables.

EXAMPLE 3

For this example, consider the cell in FIG. 6 at the intersection of the column headed "Question F2 (5 yr recovery)" and the row labeled "Question A2, DipAvg". The inquiry for determining the LUT entry would be "How important is confidence in the estimate for Average Dip to the estimate of recovery rate (% production in the first 5 years)?"

In the present embodiment, the relevant cell is related to a formula in a LUT (not shown) which includes a functional response:

If {(RecoveryMechanism=IOR), MI_Wt(DipAvg)=2} else MI_Wt(DipAvg)=0

The formula defines that the MI_Weight for the DipAvg component (Uncontrolled variable) in regard to the Recovery Rate component (Controlled variable) is dependent on the answer to the Recovery Mechanism component (Controlled variable) in the dynamic complexity inputs. If the Recovery Mechanism component input to the CIRCE-D module indicates that the development scheme utilizes an Improved Oil Recovery (IOR) mechanism, then the MI_Weight for the DipAvg component in the context of the Recovery Rate component is set equal to 2 (with the possible range of MI_Weights being 0 to 3); otherwise (i.e., with primary recovery only as the Recovery Mechanism in the dynamic reservoir component) then the MI_Weight for the 'DipAvg' component is set to 0 for this matrix cell. In this example, the selected MI_Weight is set to "2".

Numerous types of formulae and nested formulae can be and are used to introduce the desired logic into the calculation of the MI_Weights. Again, groups of experts can readily determine their desired relationships for entry into the MI_Wts_LUT. These relationships, of course, will differ depending on which set of expert(s) determines the relationships and what are their unique and individual backgrounds and experiences.

B. Calculation of the Technical Maturity Index (TMI)

The TMI score is a combination of the MI_Weights with the confidences of the dynamic and static inputs. The first step in calculating the TMI is to determine how much the confidence for each static and dynamic component differs from perfect, i.e., the confidence difference, Δconf=(5—Confidence score) is calculated for each reservoir component. Following this, each MI_Weight in a row from the MI_Wts_LUT (described above) is multiplied by the relevant component confidence difference score (Δconf). The sum of the weighted confidence differences, Σ(MI_Wts*Δconf), is then calculated from all the cells in the MI_Wts_LUT. The TMI is the sum of the weighted confidence differences normalized to the range between 'perfect knowledge' (all confidences=5, all Δconf=0, sum of all weighted confidence differences =0), and 'perfect ignorance' (zero confidence in all components, all Δconf=5, sum of all weighted confidence differences=Σ(MI_Wts*5)): i.e., $$TMI = \left\{ \frac{\Sigma(MI\_Wts*5) - \Sigma(MI\_Wts*\Delta conf)}{\Sigma(MI\_Wts*5)} \right\}$$

The TMI therefore ranges between 0.0 and 1.0. Note that the value of Σ(MI_Wts*5) typically is different for different development schemes.

FIG. 7 illustrates the process flow by which the CIRCE-M module uses the uncertainties associated with the key drivers of a proposed development scheme and combines them into a weighted score (TMI) which reflects the level of technical maturity of the proposed project. A particular development scheme (step 500) is first chosen. The MI_Wts for this development scheme are then created (step 510) by answering the question, "For this particular dynamic reservoir component (Controlled variable), how important is the certainty in the static reservoir component (Uncontrolled variable) which this cell represents to outcome?" Then for a given reservoir/interval (step 520) and for a given reservoir component (step 530), a calculation (step 540) is made to determine an uncertainty score, i.e. (5—Confidence Score). This process is repeated (step 560) until all uncertainty scores are calculated (step 550). A summation is then made (step 580) of the uncertainty scores multiplied by the corresponding MI_Wts values from the MI_Wts LUT. The reservoir/interval TMI is calculated (step 580) to produce a normalized weighted uncertainty score sum. This process is continued (step 600) until all reservoir intervals of interest have been considered (step 590). The recovery fraction by reservoir/interval are then introduced (step 610) and the total TMI is calculated (step 620) which is equal to the sum of the reservoir/interval TMI's multiplied (weighted) by the recovery fractions for the respective intervals.

In simple terms, the TMI calculates an answer to the question, "Based on what is known and unknown in the subsurface, what is the likelihood of the project outcomes being as predicted (i.e., that this will be a technically successful project)?" The TMI is a value which theoretically ranges from 0.0 to 1.0, where 1.0 indicates that all components of the subsurface which impact the performance of a development scheme are known with absolute confidence and 0.0 indicates that there is zero confidence in all the significant components of the subsurface for this development scheme. The TMI, therefore, provides a quality measure for the technical evaluation of the subsurface, at a given point in time, in terms of the reliability of the probabilistic performance predictions. A low TMI may be associated with a broad P10-50-90 range of outcomes, but in addition a low TMI indicates that the P50 value and the shape of the cumulative probability distribution ("S-curve") are poorly constrained. The TMI therefore provides a quality measure for probabilistic predictions.

C. Pareto Chart

FIG. 8 shows a Pareto Chart. To identify the most crucial items for the TMI, the tool determines which reservoir components are most responsible for the TMI being less than 1.0, i.e., which components contribute the most to the sum of all weighted confidence differences. This is determined by calculating the row sums in the MI_Wts_LUT, and then ranking the static and dynamic reservoir components (i.e., Uncontrolled and Controlled variables) by the row sums. The results for the top 10 reservoir components row sums are then normalized to a maximum of 10 and plotted in a Pareto chart. The Pareto chart shows which elements contribute most to the difference between the project's TMI score and a score of 1.0. In this case, the confidence assessment in estimating the "thief zone" is the most important to the difference.

The confidence assessments for each individual component are measures of uncertainty. The key intent of the TMI is to weigh these uncertainties by relevance (potential impact) for the development scheme being considered.

D. Comparison of TMI Between Projects

FIG. 9 illustrates a range of projects evaluated by the CIRCE tool to arrive at TMI scores which correspond to the maturity of the evaluations. Projects typically progress to higher TMI scores when the amount of data and levels of analyses increase overtime.

Examples of projects where low TMI scores are likely include early farm-in evaluations, or projects evaluated immediately following the drilling of a discovery well (e.g., project AA). Projects in mature fields and areas would typically have a relatively high TMI (e.g., project LL). The TMI score for a project typically will increase with time as new data and analyses are incorporated in the evaluation. Similarly, the TMI for an Operator's evaluation of a project could be significantly higher than that of a partner or potential purchaser if the Operator has access to more data or has a higher level of confidence in the reservoir characterisation and the development scheme definition.

Note that the TMI does not address the economic or business basis for decision making but is focused strictly on the current state of a technical subsurface evaluation. Consequently, there is no 'threshold' TMI required for a project to proceed to sanction (otherwise, for example, a typical new venture or farm-in would never be pursued since by definition the project is immature). The TMI provides a quality measure to be included in a project decision, but in isolation can not be used to select an alternative project (e.g., from FIG. 9, PROJECT LL is evaluated by the CIRCE tool as more mature than PROJECT AA, but PROJECT LL does not represent a preferred opportunity when economic and commercial issues are included in the decision-making process).

while in the foregoing specification this invention has been described in relation to certain preferred embodiments thereof, and many details have been set forth for purposes of illustration, it will be apparent to those skilled in the art that the invention is susceptible to alteration and that certain other details described herein, including the number, scope and detail of the questions, the scoring mechanisms, and the depiction of results, can vary considerably without departing from the basic principles of the invention.

APPENDIX A
CIRCE "S" -
STATIC QUESTIONS

| | | | (LUT) | Answer | FIELDNAME Score | FIELDNAME Conf |
|---|---|---|---|---|---|---|
| **A** | **Structural issues** | | | 14000 | 5 | 5 |
| A1 | How deep is the target reservoir? | Feet | | | | |
| | | 1000 | 0 | | | |
| | | 3000 | 1 | | | |
| | | 5000 | 2 | | | |
| | | 10000 | 3 | | | |
| | | 15000 | 5 | | | |
| | | 25000 | 8 | | | |
| | | 30000 | 10 | | | |
| | Confidence assumed 100% (5) | | | | | |
| A2 | (For this reservoir) what is the average dip within the field? | Degrees | | 1 | 0 | 4 |
| | | 2 | 1 | | | |
| | | 5 | 2 | | | |
| | | 15 | 6 | | | |
| | | 30 | 10 | | | |
| | Confidence level: | Low = few wells + 2D seismic<br>Medium = several wells + 3D seismic time migrations<br>High = many wells + 3D depth migrated seismic | | | | |
| A3 | (For this reservoir) what is the dip variation across the field? | Degrees | | 20 | 10 | 5 |
| | | 2 | | | | |
| | | 5 | | | | |
| | | 10 | | | | |

APPENDIX A
CIRCE "S" -
STATIC QUESTIONS

| | | | | | |
|---|---|---|---|---|---|
| | Confidence level: | Low = few wells + 2D seismic<br>Medium = several wells + 3D seismic time migrations<br>High = many wells + 3D depth migrated seismic | | | |
| A4 | (For this reservoir) what is the structural form of the trap? | [Reef/Carbonate buildup ▼]<br>Simple anticline (4 way dip closed)<br>Reef/Carbonate buildup<br>Pure strat trap<br>Fault trap<br>Combination (Strat + Struct) | <br>0<br>2<br>4<br>6<br>8 | 2 | 5 |
| | Confidence level: | Low = few wells + 2D seismic;<br>Medium = several wells + 3D seismic time migrations<br>High = many wells + 3D depth migrated seismic, full to spill pt | | | |
| A5 | If fault trap, (for this reservoir) how is the trap defined? | [N.A. ▼]<br>N.A.<br>Simple (1 trapping fault + 3 way dip)<br>Moderate (2 trapping faults)<br>Complex (3+ trapping faults) | <br>1<br>3<br>5<br>7 | 1 | 5 |
| | Confidence level: | Low = few wells + 2D seismic; | | | |

APPENDIX A
CIRCE "S" -
STATIC QUESTIONS

| | | | | | | |
|---|---|---|---|---|---|---|
| | | Medium = several wells + 3D seismic time migrations<br>High = many wells + 3D depth migrated seismic, full to spill pt | | | | |
| A6 | If combination trap, (for this reservoir) how is the trap defined? | N.A.<br>Strat + dip<br>Strat + 1 Fault<br>Strat + Multiple Faults | N.A. ▼<br>1<br>4<br>7<br>10 | 1 | 5 | |
| | Confidence level: | Low = few wells + 2D seismic;<br>Medium = several wells + 3D seismic time migrations;<br>High = many wells + 3D depth migrated seismic | | | | |
| A7 | (For this reservoir) what is the trapping fault style? | N.A.<br>Extensional<br>Compressional<br>Wrench<br>Multiple styles | N.A. ▼<br>1<br>3<br>5<br>7<br>9 | 1 | 5 | |
| | Confidence level; | Low = analogues, multiple interpretations possible;<br>Medium = few wells supported by 3D seismic data;<br>High = many wells, unequivocal tectonic history | | | | |

APPENDIX A
CIRCE "S" -
STATIC QUESTIONS

A5 (For this reservoir) what is the fault timing?

| | | | | | |
|---|---|---|---|---|---|
| | N.A. | 0 | N.A. | 9 | 5 |
| | Post depositional | 3 | | | |
| | Syn depositional | 6 | | | |
| | Reactivation | 9 | | | |
| Confidence level; | Low = analogues, no or poor quality seismic data, multiple interpretations possible; Medium = few wells supported by 3D seismic data; High = many wells, unequivocal tectonic history | | | | |

B Compartmentalization Issues

B1 (For this reservoir) how many (fault bounded) areal compartments are present?

| | | | | | |
|---|---|---|---|---|---|
| | 0 | 0 | 0 | 0 | 5 |
| | 1 | 1 | | | |
| | 3 | 3 | | | |
| | 5 | 5 | | | |
| | 10 | 10 | | | |
| Confidence Level; | Low = few wells, compartments are known to be present but number and geometry are poorly defined; Medium=several wells, main compartments penetrated but others could be present; | | | | |

APPENDIX A
CIRCE "S" -
STATIC QUESTIONS

| | | | | | | |
|---|---|---|---|---|---|---|
| | | High = many wells, all internal compartments clearly defined | | | | |
| B2 | (For this reservoir) what percentage of the areal reservoir compartments have been penetrated by wells? | % | | 100 | 0 | 5 |
| | | 10 | 9 | | | |
| | | 30 | 7 | | | |
| | | 50 | 5 | | | |
| | | 70 | 3 | | | |
| | | 90 | 1 | | | |
| | Confidence Level; | Low = few wells, compartments are known to be present but number and geometry are poorly defined; Medium=several wells, main compartments penetrated but others could be present; High = many wells, all internal compartments clearly defined | | | | |
| **C** | **Reservoir Architecture** | | | | | |
| C1 | (For this reservoir) what is the depositional system? | | Carbonate ▼ | | 4 | 5 |
| | | Siliciclastic | 1 | | | |
| | | Carbonate | 4 | | | |
| | | Siliceous shale | 7 | | | |
| | | Other (volcanic, granite, tuff) | 10 | | | |
| | Confidence Level; | | | | | |
| C2 | (For this reservoir) what is the depositional environment? | Siliciclastic: | | | 5 | 5 |

APPENDIX A
CIRCE "S" -
STATIC QUESTIONS

| | | | | | |
|---|---|---|---|---|---|
| | Enter answer in E131 based on lookup tables (word documents) | Carbonate:  | | | |
| | Confidence level; | Low = few wells, no core, regional setting + analogues;<br>Medium = several wells with core, sequence strat framework established;<br>High = many wells with core, high resolution sequence stratigraphy established | | | |
| C3 | (For this reservoir) what is the Reservoir to Non-reservoir rock proportion? | NTG 0.1 / 0.3 / 0.5 / 0.7 / 0.9 — 9 / 7 / 5 / 3 / 1 | 1 | 0 | 5 |
| | Confidence Level; | Low = analogues, few wells and/or poor areal distribution of wells, poor definition of Reservoir Rock; | | | |

APPENDIX A
CIRCE "S" -
STATIC QUESTIONS

| | | | | | | | |
|---|---|---|---|---|---|---|---|
| | | Medium = several wells broadly distributed, good definition of Reservoir Rock, extrapolation guided by depositional model;<br>High = many wells, precise definition of Reservoir Rock, interpolation guided by depositional model and seismic data | | | | | |
| C4 | (For this reservoir) what is the average gross thickness? | Gross, feet<br>10<br>30<br>50<br>70<br>90 | <br>9<br>7<br>5<br>3<br>1 | 1500 | 1 | 5 |
| | Confidence assumed 100% (5) | | | | | |
| C5 | How many vertically stacked reservoir units are there? | 1<br>2<br>3<br>4<br>5 | 0<br>3<br>6<br>9<br>10 | 10 | 18 | 5 |
| | Confidence Level: | Low = few wells and/or poor areal distribution of wells; ;<br>Medium = several wells, broadly distributed, individual reservoir units at or below seismic resolution<br>High = many wells covering the field area, reservoir units mappable from seismic data | | | | |

APPENDIX A
CIRCE "S" -
STATIC QUESTIONS

| | | | | | | |
|---|---|---|---|---|---|---|
| C6 | What proportion of stacked reservoir units are expected to be in pressure communication during field life? | % | | 100 | 0 | 5 |
| | | 0 | 10 | | | |
| | | 10 | 9 | | | |
| | | 30 | 7 | | | |
| | | 50 | 5 | | | |
| | | 70 | 3 | | | |
| | | 90 | 1 | | | |
| | Confidence Level; | Low = analogy<br>Medium = static measurements (RFT pressures, oil geochem), connectivity from seismic;<br>High = dynamic measurements, EWT, interference tests etc | | | | |
| C7 | How variable are average thicknesses of the flow units within the reservoir interval? | Thickest/Thinnest ratio | | 10 | 10 | 5 |
| | | 1 | 1 | | | |
| | | 2 | 2 | | | |
| | | 5 | 5 | | | |
| | | 10 | 10 | | | |
| | Confidence Level; | Low = few wells and/or poor areal distribution of wells;<br>Medium = several wells, broadly distributed, ambiguous flow unit correlations between wells;<br>High = many wells covering the field area, flow units correlated and mapped | | | | |

APPENDIX A
CIRCE "S" -
STATIC QUESTIONS

D Rock Types

D1 What reservoir rock types and proportions are present in the gross reservoir interval?

| % Clastic | | | | |
|---|---|---|---|---|
| | | 8 | 0 | 8 |
| 10 | 1 | | | |
| 33 | 5 | | | |
| 50 | 10 | | | |
| 67 | 5 | | | |
| 90 | 1 | | | |

APPENDIX A
CIRCE "S" -
STATIC QUESTIONS

| | | | | | | |
|---|---|---|---|---|---|---|
| | Confidence Level; | Low = few wells and/or poor areal distribution of wells, highly variable rock type proportions from well to well;<br>Medium = several wells, broadly distributed, variable rock type proportions from well to well ;<br>High = many wells covering the field area, rock type proportions relatively consistent from well to well or variable but predictable | | | | |
| D2 | What proportion of the net pay is in minority rock type? | % of net pay<br>10<br>30<br>50<br>70<br>90 | <br>0<br>0<br>0<br>0<br>0 | 1 | 0 | 5 |
| | Confidence Level; | Low/analogy<br>Medium/estimated<br>High/studied | | | | |
| **E** | **Petrophysics** | | | | | |
| E1 | (For this reservoir) what is the median permeability of the matrix at the flow unit scale? | md<br>1000<br>100<br>10 | <br>1<br>4<br>7 | 10 | 7 | 4 |

APPENDIX A
CIRCLE "S" -
STATIC QUESTIONS

1

10

APPENDIX A
CIRCE "S" -
STATIC QUESTIONS

| | | | | | | |
|---|---|---|---|---|---|---|
| | Confidence Level: | Low=analogy, sparse core plug data;<br>Medium = few well test derived measurements and/or calculated by upscaling of core data;<br>High = many flow-based measurements | | | | |
| E2 | (For this reservoir) how laterally heterogeneous is the matrix permeability over the areal extent of the reservoir?<br>Low (half an order of magnitude or less)<br>Moderate (+/- an order of magnitude)<br>High (> 2 orders of magnitude) | range (orders of magnitude)<br>0<br>1<br>2 | <br>1<br>4<br>9 | 3 | 10 | 3 |
| | Confidence Level: | Low = analogy, sparse wells and/or core data;<br>Medium = several wells, multiple core data, single test calibration;<br>High = many wells, several dynamic flow estimations | | | | |
| E3 | Are fractures present in this reservoir? | Absent<br>Sparse<br>Many | 0<br>3<br>5 | Many | 5 | 5 |
| | Confidence Level: | Low = assumption, analogy, model based;<br>Medium = inference, sparse direct observations; | | | | |

APPENDIX A
CIRCE "S" -
STATIC QUESTIONS

| | | | | | | |
|---|---|---|---|---|---|---|
| | | High = many direct observations | | | | |
| E4 | If fractures are present, are the fracture orientations known? (multiplicative on E2 score) | | | No ▼ | 2 | 2 |
| | | N.A. | 0 | | | |
| | | Yes | 1 | | | |
| | | No | 2 | | | |
| | Confidence Level; | Low = analogy, inference; Medium = few measurements and/or model studies; High = direct observation, many measurements | | | | |
| E5 | What is the Kv/Kh ratio within an individual reservoir unit (as opposed to core plug scale)? | | | 0.1 | 3 | 3 |
| | high | 0.5 | 1 | | | |
| | good | 0.3 | 2 | | | |
| | moderate | 0.1 | 3 | | | |
| | low | 0.01 | 7 | | | |
| | poor | 0.001 | 10 | | | |
| | Confidence Level; | Low = analogy, sparse core plug data; Medium = few dynamic measurements and/or calculated by upscaling from comprehensive core data; High = many dynamic measurements | | | | |

APPENDIX A
CIRCE "S" -
STATIC QUESTIONS

| | | | | | | |
|---|---|---|---|---|---|---|
| E6 | (For this reservoir) are thief zones expected to be present? | No<br>Yes | 1<br>9 | Yes | 10 | 4 |
| | Confidence Level: | Low = analogy, sparse well data; Medium = several well correlations; High = many production derived measurements | | | | |
| E7 | (For this reservoir) what is the principal reservoir hydrocarbon? | Oil<br>Gas<br>Oil+gas | 1<br>5<br>9 | Oil | 1 | 5 |
| | Confidence assumed 100% (5) | | | | | |
| E8 | (For this reservoir) what is the API of the oil? | API<br>10<br>20<br>35<br>40 | <br>9<br>6<br>1<br>3 | 44 | 4 | 5 |
| | Confidence assumed 100% (5) | | | | | |
| E9 | (For this reservoir) how close is the reservoir pressure to the bubble point? | N.A.<br>P>>Psat<br>P>Psat<br>P=Psat | 0<br>1<br>5<br>9 | P>>Psat | 1 | 5 |

APPENDIX A
CIRCE "S" -
STATIC QUESTIONS

| | | | | | |
|---|---|---|---|---|---|
| | Confidence Level; | Low = analogy;<br>Medium = single or inconsistent fluid sample measurements ;<br>High = several consistent measurements | | | |
| E10 | (For this reservoir) how close is the reservoir pressure to the dew point? | N.A.<br>P>>Pdew<br>P>Pdew<br>P=Pdew | N.A. ▼<br>0<br>1<br>5<br>9 | 0 | 5 |
| | Confidence Level; | Low = analogy;<br>Medium = single or inconsistent fluid sample measurements ;<br>High = several consistent measurements | | | |
| E11 | (For this reservoir) are wax, asphaltine or bitumen precipitation anticipated to be a problem? | No<br>Some<br>Significant | No ▼<br>1<br>5<br>9 | 1 | 5 |
| | Confidence Level; | 1) Low = analogy, assumption;<br>2) Medium = few measurements;<br>3) High = many measurements | | | |
| E12 | (For this reservoir) are H2S, CO2 or other constituents anticipated to be a problem? | | Significant ▼ | 9 | 5 |

APPENDIX A
CIRCE "S" -
STATIC QUESTIONS

| | | | | | | |
|---|---|---|---|---|---|---|
| | | No<br>Some<br>Significant | 1<br>5<br>9 | | | |
| | Confidence Level; | 1) Low = analogy, assumption;<br>2) Medium = few measurements;<br>3) High = many measurements | | | | |
| E13 | How many OWC and/or GOC's are present in the field? | 1<br>2<br>3<br>4<br>>4 | 1 ▼<br>1<br>3<br>5<br>7<br>9 | | 1 | 4 |
| | Confidence Level; | 1) Low = analogy, assumption<br>3) Medium = few wells, no direct contact observations<br>5) High = many wells, multiple consistent observations | | | | |
| E14 | (For this reservoir) what is the thickness of the oil/water transition zone relative to the HC column? | %<br>10<br>30<br>50<br>70<br>90 | 1<br>3<br>5<br>7<br>9 | 10 | 1 | 4 |
| | Confidence Level; | 1) Low = analogy, assumption; | | | | |

APPENDIX A
CIRCE "S" -
STATIC QUESTIONS

3) Medium = few wells, sparse capillary pressure/porosimetry data;
5) High = many wells, multiple consistent observations E15 For carbonate reservoirs, what is the complexity resulting from the dominant matrix pore type? | Low ▼ | 1 | 4

| | | |
|---|---|---|
| *Primary interparticle pore throats; intergrain, intercrystal* | N.A. | 0 |
| | Low | 1 |
| *Separate vug; moldic, intraparticle, intragrain, shelter* | Moderate | 5 |
| *Touching vug; fracture, cavernous, breccia, fenestral* | High | 9 |

Confidence Level;

Low = analogy, sparse wells and/or core data;
Medium = several wells, multiple core data, sparse thin section and porosimetry;
High = many wells, extensive core data, with thin section and porosimetry studies E16 How significant are diagenetic effects with respect to the complexity of this reservoir and/or aquifer? | Minor ▼ | 3 | 4

| | |
|---|---|
| None | 0 |
| Minor | 3 |
| Significant | 6 |
| Major | 9 |

Confidence Level:

APPENDIX A
CIRCE "S" -
STATIC QUESTIONS

| | | | | | |
|---|---|---|---|---|---|
| E17 | (For this reservoir) does the mineralogical composition of the reservoir introduce uncertainties in wireline PKS estimates? | None<br>Minor<br>Significant<br>Major | Significant<br>0<br>3<br>6<br>9 | 6 | 4 |
| | Confidence Level; | Low = analogy, assumption;<br>Medium = some data/observations;<br>High = many measurements | | | |
| E18 | (For this reservoir) does the mineralogy of the reservoir make it susceptible to formation damage? | None<br>Minor<br>Significant<br>Major | None<br>0<br>3<br>5<br>8 | 0 | 5 |
| | Confidence Level; | Low = analogy, assumption;<br>Medium = some data/observations;<br>High = many measurements | | | |

Low = analogy, sparse wells and/or core data;
Medium = several wells with core data, sparse well test information;
High = many wells, extensive core data, with consistent well test information

CIRCE "D" -
DYNAMIC QUESTIONS

| | | | (LUT) | Answer | FIELDNAME Score | Conf |
|---|---|---|---|---|---|---|
| F | **Reservoir Mechanisms** | | | | | |
| F1 | For this reservoir does this Development Plan include Primary or Secondary Recovery? | | | Improved | 0 | 5 |
| | | Primary | 0 | | | |
| | | Improved | 0 | | | |
| | Confidence assumed 100% (5) | | | | | |
| F2 | (For this reservoir) what percent of OOIP? RESERVES is expected to be recovered in the first 5 years of production? | % | | <20% | 1 | 5 |
| | | <20% | 1 | | | |
| | | 20-35% | 3 | | | |
| | | 35-50% | 5 | | | |
| | | 50-65% | 7 | | | |
| | | >65% | 9 | | | |
| | Confidence level: | Low/Analogy | | | | |
| | | Medium/Early production | | | | |
| | | High/Pilot/History-matched simulation | | | | |
| F3 | (For this reservoir) what total recovery factor is expected? (use database to determine LUT?) | % | | <20% | 1 | 4 |
| | | <20% | 1 | | | |
| | | 20-30% | 1 | | | |
| | | 30-40% | 1 | | | |
| | | 40-50% | 1 | | | |
| | | >50% | 1 | | | |
| | Confidence level: | | | | | |

CIRCE "D" -
DYNAMIC QUESTIONS

Low/Analogy
Medium/Early production
High/Pilot/History-matched simulation

| | | | | | |
|---|---|---|---|---|---|
| F4 | (For this reservoir) what is the estimated aquifer volume to reservoir volume ratio? | | Low (<10:1) | 9 | 3 |
| | | High (>100:1) | 1 | | |
| | | Moderate (10-100:1) | 5 | | |
| | | Low (<10:1) | 9 | | |
| | Confidence level: | Low/Analogy<br>Medium/Early production<br>High/Pilot/History-matched simulation | | | |
| F5 | (For this reservoir) how critical to success is aquifer support? | | Not important | 1 | 4 |
| | | Detrimental to recovery process | 9 | | |
| | | Not important | 1 | | |
| | | Important, recovery limited without it | 7 | | |
| | | Extremely critical, complete failure without it | 9 | | |
| | Confidence level: | Low/Unsure<br>Medium/analogy<br>High/observation | | | |
| F6 | (For this reservoir) will reservoir pressure fall below the initial bubble point during project life where expansion of a primary or secondary gas cap is expected? | | No | 1 | 4 |
| | | No | 1 | | |

CIRCE "D" -
DYNAMIC QUESTIONS

| | | | | | |
|---|---|---|---|---|---|
| | | Somewhat | 5 | | |
| | | Significantly | 9 | | |
| | Confidence level: | Low/Analogy<br>Medium/modeled<br>High/observed | | | |
| F7 | (For this reservoir) which reservoir force is expected to be dominant? | [Viscous forces will be d ▼] | | 9 | 3 |
| | | Gravity forces will be dominant (gravity stable) | 1 | | |
| | | No dominant force | 5 | | |
| | | Viscous forces will be dominant (not gravity stable) | 9 | | |
| | Confidence level: | Low/Analogy<br>Medium/Early production<br>High/Pilot/Observations/History-matched simulation | | | |
| F8 | (For this reservoir) what is the oil-water mobility ratio? | [<1.0 (favourable) ▼] | | 1 | 5 |
| | | <1.0 (favourable) | 1 | | |
| | | 1 - 5 (unfavourable | 5 | | |
| | | > 5 (highly unfavourable) | 9 | | |
| | Confidence Level: | Low/Analogy<br>Medium/one measurement<br>High/many measurements | | | |

CIRCE "D" -
DYNAMIC QUESTIONS

| | | | | | |
|---|---|---|---|---|---|
| F9 | (For this reservoir) how important are fractures to the proposed recovery process? | | Extremely critical, co | 9 | 5 |
| | | Detrimental to recovery process | 9 | | |
| | | Not important | 1 | | |
| | | Important, recovery limited without them | 7 | | |
| | | Extremely critical, complete failure without them | 9 | | |
| | Confidence Level: | Low/Analogy<br>Medium/one measurement<br>High/many measurements | | | |

G Improved Oil Recovery

| | | | | | |
|---|---|---|---|---|---|
| G1 | (For this reservoir) what incremental recovery factor is expected? (use database to determine LUT?) | | <10% OOIP | 1 | 2 |
| | | <10% OOIP | 1 | | |
| | | 10-20% | 1 | | |
| | | 20-30% | 1 | | |
| | | >30% | 1 | | |
| | Confidence Level: | Low/Analogy<br>Medium/Early Production<br>High/Pilot | | | |
| G2 | (For this reservoir) what fluid is to be injected? | | Hydrocarbon gas | 3 | 5 |
| | | Water | 1 | | |
| | | Hydrocarbon gas | 3 | | |
| | | Polymer | 5 | | |
| | | CO2 | 7 | | |

CIRCE "D" -
DYNAMIC QUESTIONS

| | | | | | |
|---|---|---|---|---|---|
| | | Steam | 7 | | |
| | | Water and Gas | 9 | | |
| | Confidence assumed 100% (5) | | | | |
| G3 | (For this reservoir) are injected fluids compatible with reservoir rocks and fluids? | | No interactions ▾ | 1 | 5 |
| | | No interactions | 1 | | |
| | | Some incompatibility | 5 | | |
| | | Steps will be needed to ensure compatibility | 9 | | |
| | Confidence Level: | Low/Analogy<br>Medium/one measurement<br>High/Many measurements | | | |
| G4 | (For this reservoir) what is the plan for injection well locations? | | Pattern or line-drive inj ▾ | 1 | 5 |
| | | Peripheral injection below HC contact | 1 | | |
| | | Pattern or line-drive injection within oil column | 1 | | |
| | | Crestal injection above GOC | 3 | | |
| | | Crestal or selected updip injection within oil column | 5 | | |
| | | Combination of above | 9 | | |
| | Confidence assumed 100% (5) | | | | |
| G5 | (For this reservoir) what is the planned injection rate (reservoir processing rate)?. (HCPV injected per year) | | <2% ▾ | 1 | 2 |
| | | <2% | 1 | | |
| | | 2-5% | 3 | | |
| | | 5-10% | 5 | | |
| | | 10-20% | 7 | | |

CIRCE "D" -
DYNAMIC QUESTIONS

| | | | | | |
|---|---|---|---|---|---|
| | | >20% | 9 | | |
| | Confidence Level; | Low/analogy<br>Medium/estimated<br>High/studied | | | |
| H | **Unwanted Fluids** | | | | |
| H1 | What is the probability that excessive water production will have a negative impact on hydrocarbon prodn? | | [<10% ▼] | 3 | 4 |
| | | 0%<br><10%<br>10-30%<br>30-50%<br>>50% | 1<br>3<br>5<br>7<br>9 | | |
| | Confidence Level; | Low/analogy<br>Medium/estimated<br>High/studied | | | |
| H2 | Is the disposition of produced water expected to be difficult? | | [Some ▼] | 5 | 4 |
| | | No<br>Some<br>Significant | 1<br>5<br>9 | | |
| | Confidence Level; | Low/analogy<br>Medium/estimated<br>High/studied | | | |

CIRCE "D" -
DYNAMIC QUESTIONS

H3 What is the probability that excessive gas production will have a negative impact on hydrocarbon production?

[>50% ▼] 9 3

| | |
|---|---|
| 0% | 1 |
| <10% | 3 |
| 10-30% | 5 |
| 30-50% | 7 |
| >50% | 9 |

Confidence Level;

Low/analogy
Medium/estimated
High/studied

H4 Is the disposition of produced gas expected to be difficult?

[Some ▼] 5 4

| | |
|---|---|
| No | 1 |
| Some | 5 |
| Significant | 9 |

Confidence Level;

Low/analogy
Medium/estimated
High/studied

I Production Wells

I1 (For this reservoir) what is the planned well spacing relative to average compartment size?

[Many wells per compar ▼] 1 1 4

| | |
|---|---|
| Many wells per compartment | 1 |
| Few wells per compartment | 4 |
| One well per compartment | 7 |
| Multiple compartments per well | 9 |

CIRCE "D" -
DYNAMIC QUESTIONS

Confidence Level;

Low/Analogy
Medium/one measurement
High/Many measurements

| | | | | | | |
|---|---|---|---|---|---|---|
| 12 | (For this reservoir) what percent of the production forecast comes from horizontal or multi-lateral wells? | <10%<br>10-50%<br>>50% | 1<br>5<br>9 | <10% | 1 | 5 |
| | Confidence assumed 100% (5) | | | | | |
| 13 | (For this reservoir) what percent of production forecast comes from wells with multiple completions? | <10%<br>10-50%<br>>50% | 1<br>5<br>9 | <10% | 1 | 5 |
| | Confidence assumed 100% (5) | | | | | |
| 14 | What percent of the production forecast comes from wells with co-mingled completions? | <10%<br>10-50%<br>>50% | 1<br>5<br>9 | >50% | 9 | 5 |
| | Confidence assumed 100% (5) | | | | | |
| 15 | What percent of the production forecast comes from wells with sub-sea trees? | | | <10% | 1 | 5 |

CIRCE "D" -
DYNAMIC QUESTIONS

| | | | | | |
|---|---|---|---|---|---|
| | | <10% | 1 | | |
| | | 10-50% | 5 | | |
| | | >50% | 9 | | |
| | Confidence assumed 100% (5) | | | | |
| 36 | What percent of the production forecast comes from infill drilling? | | 10-50% ▼ | 5 | 4 |
| | | <10% | 1 | | |
| | | 10-50% | 5 | | |
| | | >50% | 9 | | |
| | Confidence assumed 100% (5) | | | | |
| 37 | (For this reservoir) what initial stimulation treatments are planned? | | Acidizing & hydraulic f ▼ | 10 | 5 |
| | | None | 1 | | |
| | | Acidizing | 4 | | |
| | | Hydraulic fracturing | 7 | | |
| | | Acidizing & hydraulic fracturing | 10 | | |
| | Confidence assumed 100% (5) | | | | |
| 38 | (For this reservoir) is sand control planned? | | No ▼ | 1 | 5 |
| | | No | 1 | | |
| | | Yes | 9 | | |
| | Confidence Level. | | | | |
| | | Low/unsure | | | |
| | | Medium/analogy | | | |
| | | High/tested | | | |
| 39 | (For this reservoir) is artificial lift planned? | | No ▼ | 1 | 5 |

CIRCE "D" -
DYNAMIC QUESTIONS

No 1
Yes 5

Confidence Level;

Low/unsure
Medium/analogy
High/tested

I10 (For this reservoir) If artificial lift is not planned, what is the expected level of well draw down required to achieve target production rates?

20-50% ▼ 7 4

| | |
|---|---|
| N.A. | 0 |
| <5% of current reservoir pressure | 1 |
| 5-10% | 3 |
| 10-20% | 5 |
| 20-50% | 7 |
| >50% | 9 |

Confidence Level;

Low/unsure
Medium/analogy
High/tested

I11 On average, how many times are wells re-completed in the project plan?

0 1 3

| | |
|---|---|
| No planned recompletions | 1 |
| One planned recompletion per well | 5 |
| More than one planned recompletion per well | 9 |

Confidence Level;

Low/analogy
Medium/estimated
High/studied

CIRCE "D" -
DYNAMIC QUESTIONS

| | | | | | |
|---|---|---|---|---|---|
| I12 | What types of remedial well profile control are anticipated? | | None | 0 | 3 |
| | | None | 1 | | |
| | | Bottom-up or top-down recompletions only | 5 | | |
| | | Mechanical or chemical isolation of intermediate zones | 9 | | |
| | Confidence Level: | Low/analogy<br>Medium/estimated<br>High/studied | | | |

J Injection Wells

| | | | | | |
|---|---|---|---|---|---|
| J1 | (For this reservoir) what is the expected well injectivity required to achieve the target injection rates? | | 75-100% | 7 | 3 |
| | | <50% of average well productivity | 1 | | |
| | | 50-75% | 4 | | |
| | | 75-100% | 7 | | |
| | | >100% | 10 | | |
| | Confidence Level: | Low/unsure<br>Medium/analogy<br>High/tested | | | |
| J2 | (For this reservoir) what percent of the injection forecast comes from horizontal or multi-lateral wells? | | <10% | 1 | 5 |
| | | <10% | 1 | | |
| | | 10-50% | 5 | | |

CIRCE "D" -
DYNAMIC QUESTIONS

| | | | | | | |
|---|---|---|---|---|---|---|
| | | >50% | 9 | | | |
| | Confidence assumed 100% (5) | | | | | |
| J3 | (For this reservoir) what percent of the injecton forecast comes from wells with multiple completions? | <10%<br>10-50%<br>>50% | 1<br>5<br>9 | <10% | 1 | 5 |
| | Confidence assumed 100% (5) | | | | | |
| J4 | (For this reservoir) what percent of the injection forecast comes from wells with co-mingled completions? | <10%<br>10-50%<br>>50% | 1<br>5<br>9 | >50% | 9 | 5 |
| | Confidence assumed 100% (5) | | | | | |
| J5 | What percent of the injection forecast comes from wells with sub-sea trees? | <10%<br>10-50%<br>>50% | 1<br>5<br>9 | <10% | 1 | 5 |
| | Confidence assumed 100% (5) | | | | | |
| J6 | What percent of the injection forecast comes from infill drilling? | <10%<br>10-50%<br>>50% | 1<br>5<br>9 | 10-50% | 5 | 4 |

CIRCE "D" -
DYNAMIC QUESTIONS

Confidence level;

Low/analogy
Medium/estimated
High/studied

J7 (For this reservoir) what initial injection well stimulation treatments are planned? [Acidizing & hydraulic f ▼] 10 8

| | |
|---|---|
| None | 1 |
| Acidizing | 4 |
| Hydraulic fracturing | 7 |
| Acidizing & hydraulic fracturing | 10 |

Confidence assumed 100% (5)

J8 (For this reservoir) is sand control planned for the injection wells? [No ▼] 1 5

| | |
|---|---|
| No | 1 |
| Yes | 9 |

Confidence level;

Low/unsure
Medium/analogy
High/tested

J9 On average, how many times are wells re-completed in the project plan? 0 1 3

| | |
|---|---|
| No planned recompletions | 1 |
| One planned recompletion per well | 5 |
| More than one planned recompletion per well | 9 |

Confidence level;

Low/analogy
Medium/estimated

CIRCE "D" -
DYNAMIC QUESTIONS

| | | | | | |
|---|---|---|---|---|---|
| | | High/studied | | | |
| J10 | What types of remedial (injection) well profile control are anticipated? | | Mechanical or chemical ▼ | 10 | 1 |
| | | None | 0 | | |
| | | Bottom-up or top-down recompletions only | 5 | | |
| | | Mechanical or chemical isolation of intermediate zones | 10 | | |
| | Confidence level; | Low/analogy<br>Medium/estimated<br>High/studied | | | |

APPENDIX B

| MI_Wts LUT | Dynamic Q. | F1 (Primary / 2ndary) | F2 (5 yr recovery) | F3 (Total rec) | F4 (Aquifer size) | F5 (Aquifer imp) | F6 (Bubble Pt) | F7 (Res Force) | F8 (Mobility) | F9 (Fractures) |
|---|---|---|---|---|---|---|---|---|---|---|
| Static Q. | Ideal conf | MI Wt | MI Wt | MI Wt | MI Wt | MI Wt | MI Wt | MI Wt | MI Wt | MI Wt |
| A1 (Depth) | 5 | 0 | 0 | 0 | 0 | 0 | 0 | 0 | 0 | 0 |
| A2 (DipAvg) | 5 | 4 | 4 | 4 | 0 | 0 | 0 | 0 | 0 | 0 |
| A3 (DipVar) | 5 | 1 | 0 | 0 | 0 | 0 | 0 | 0 | 0 | 0 |
| A4 (Form) | 5 | 0 | 0 | 0 | 0 | 0 | 0 | 0 | 0 | 0 |
| A5 (FltTrap) | 5 | 0 | 0 | 0 | 0 | 0 | 0 | 0 | 0 | 0 |
| A6 (CombTrap) | 5 | 0 | 0 | 0 | 0 | 0 | 0 | 0 | 0 | 0 |
| A7 (FltStyle) | 5 | 0 | 0 | 0 | 0 | 0 | 0 | 0 | 0 | 0 |
| A8 (FltTiming) | 5 | 0 | 0 | 0 | 0 | 0 | 0 | 0 | 0 | 0 |
| B1 (Ncmprt) | 5 | 3 | 3 | 2 | 0 | 0 | 0 | 0 | 0 | 0 |
| B2 (Npenetr) | 5 | 5 | 2 | 4 | 0 | 0 | 0 | 0 | 0 | 0 |
| C1 (DepoSystem) | 5 | 0 | 0 | 0 | 0 | 0 | 0 | 0 | 0 | 0 |
| C2 (ClasticDepoEnv) | 5 | 0 | 0 | 0 | 0 | 0 | 0 | 0 | 0 | 0 |
| C3 (Net-to-Gross) | 5 | 0 | 0 | 0 | 0 | 0 | 0 | 0 | 0 | 0 |
| C4 (AvGrThick) | 5 | 0 | 0 | 0 | 0 | 0 | 0 | 0 | 0 | 0 |
| C5 (Nunits) | 5 | 2 | 3 | 3 | 0 | 0 | 0 | 0 | 0 | 0 |
| C6 (P_comm) | 5 | 2 | 3 | 3 | 0 | 0 | 0 | 0 | 0 | 0 |
| C7 (FU_var) | 5 | 0 | 0 | 0 | 0 | 0 | 0 | 0 | 0 | 0 |
| D1 (RT_prop) | 5 | 0 | 0 | 0 | 0 | 0 | 0 | 0 | 0 | 0 |
| D2 (RT_pay) | 5 | 0 | 0 | 0 | 0 | 0 | 0 | 0 | 0 | 0 |
| E1 (MedPerm) | 5 | 3 | 3 | 2 | 0 | 0 | 0 | 0 | 0 | 0 |
| E2 (LatPermVar) | 5 | 3 | 3 | 2 | 0 | 0 | 0 | 0 | 0 | 0 |
| E3 (Fractures) | 5 | 3 | 3 | 2 | 0 | 0 | 0 | 0 | 0 | 3 |
| E4 (FracOrient) | 5 | 2 | 3 | 2 | 0 | 0 | 0 | 0 | 0 | 2 |
| E5 (Kv/Kh) | 5 | 3 | 3 | 3 | 0 | 0 | 0 | 0 | 0 | 0 |
| E6 (Thief) | 5 | 3 | 3 | 3 | 0 | 0 | 0 | 0 | 0 | 0 |
| E7 (HC_type) | 5 | 2 | 2 | 2 | 0 | 0 | 0 | 0 | 0 | 0 |
| E8 (API) | 5 | 2 | 3 | 2 | 0 | 0 | 0 | 0 | 0 | 0 |
| E9 (Psat) | 5 | 1 | 1 | 1 | 0 | 0 | 3 | 0 | 0 | 0 |
| E10 (Pdew) | 5 | 0 | 1 | 1 | 0 | 0 | 0 | 0 | 0 | 0 |
| E11 (Fluid_const) | 5 | 2 | 2 | 2 | 0 | 0 | 0 | 0 | 0 | 0 |
| E12 (Fluid_const) | 5 | 0 | 0 | 0 | 0 | 0 | 0 | 0 | 0 | 0 |
| E13 (fl_contacts) | 5 | 2 | 3 | 2 | 0 | 0 | 0 | 0 | 0 | 0 |
| E14 (TransZone Z) | 5 | 3 | 2 | 2 | 0 | 0 | 0 | 0 | 0 | 0 |
| E15 (CO3Poretype) | 5 | 0 | 0 | 0 | 0 | 0 | 0 | 0 | 0 | 0 |
| E16 (Diagen) | 5 | 0 | 0 | 0 | 0 | 0 | 0 | 0 | 0 | 0 |
| E17 (Min/PKS) | 5 | 0 | 0 | 0 | 0 | 0 | 0 | 0 | 0 | 0 |
| E18 (Fm Damage) | 5 | 2 | 2 | 2 | 0 | 0 | 0 | 0 | 0 | 0 |

MI_Wts LUT

| Static Q. | G1 (IOR RF) MI Wt | G2 (Inj fluid) MI Wt | G3 (Inj fluid compat) MI Wt | G4 (Inj locns) MI Wt | G5 (Inj rate) MI Wt | H1 (Excess H20 prodn) MI Wt | H2 (H20 disposal) MI Wt | H3 (Excess gas prodn) MI Wt | H4 (Gas disposal) MI Wt |
|---|---|---|---|---|---|---|---|---|---|
| A1 (Depth) | 0 | 2 | 0 | 0 | 0 | 0 | 0 | 0 | 0 |
| A2 (DipAvg) | 1 | 1 | 1 | 2 | 1 | 2 | 2 | 2 | 2 |
| A3 (DipVar) | 0 | 0 | 0 | 2 | 0 | 0 | 0 | 0 | 0 |
| A4 (Form) | 0 | 0 | 0 | 0 | 0 | 0 | 0 | 0 | 0 |
| A5 (FltTrap) | 0 | 0 | 0 | 0 | 0 | 0 | 0 | 0 | 0 |
| A6 (CombTrap) | 0 | 0 | 0 | 0 | 0 | 0 | 0 | 0 | 0 |
| A7 (FltStyle) | 0 | 0 | 0 | 0 | 0 | 0 | 0 | 0 | 0 |
| A8 (FltTiming) | 0 | 0 | 0 | 0 | 0 | 0 | 0 | 0 | 0 |
| B1 (Ncmprt) | 3 | 0 | 0 | 3 | 2 | 2 | 2 | 2 | 2 |
| B2 (Npenetr) | 3 | 0 | 0 | 3 | 2 | 3 | 3 | 3 | 3 |
| C1 (DepoSystem) | 0 | 0 | 0 | 0 | 0 | 0 | 0 | 0 | 0 |
| C2 (ClasticDepoEnv) | 0 | 0 | 0 | 0 | 0 | 0 | 0 | 0 | 0 |
| C3 (Net-to-Gross) | 0 | 0 | 0 | 0 | 0 | 0 | 0 | 0 | 0 |
| C4 (AvGrThick) | 0 | 0 | 0 | 0 | 0 | 0 | 0 | 0 | 0 |
| C5 (Nunits) | 2 | 0 | 0 | 2 | 2 | 2 | 2 | 2 | 2 |
| C6 (P_comm) | 2 | 0 | 0 | 2 | 2 | 2 | 2 | 2 | 2 |
| C7 (FU_var) | 0 | 0 | 0 | 0 | 0 | 0 | 0 | 0 | 0 |
| D1 (RT_prop) | 0 | 0 | 0 | 0 | 0 | 0 | 0 | 0 | 0 |
| D2 (RT_pay) | 0 | 0 | 0 | 0 | 0 | 0 | 0 | 0 | 0 |
| E1 (MedPerm) | 3 | 1 | 0 | 2 | 3 | 2 | 3 | 2 | 2 |
| E2 (LatPermVar) | 3 | 0 | 0 | 3 | 2 | 3 | 3 | 3 | 2 |
| E3 (Fractures) | 3 | 0 | 0 | 2 | 2 | 2 | 1 | 2 | 2 |
| E4 (FracOrient) | 2 | 0 | 0 | 3 | 2 | 3 | 2 | 3 | 2 |
| E5 (Kv/Kh) | 3 | 2 | 0 | 3 | 2 | 2 | 2 | 2 | 2 |
| E6 (Thief) | 3 | 0 | 0 | 3 | 3 | 3 | 3 | 3 | 2 |
| E7 (HC_type) | 1 | 3 | 3 | 0 | 0 | 0 | 0 | 0 | 0 |
| E8 (API) | 1 | 3 | 0 | 2 | 2 | 2 | 2 | 2 | 2 |
| E9 (Psat) | 3 | 0 | 0 | 2 | 2 | 1 | 1 | 3 | 3 |
| E10 (Pdew) | 3 | 0 | 0 | 2 | 0 | 0 | 0 | 1 | 3 |
| E11 (Fluid_const) | 2 | 2 | 3 | 0 | 2 | 1 | 1 | 1 | 1 |
| E12 (Fluid_const) | 0 | 0 | 3 | 0 | 0 | 0 | 3 | 1 | 3 |
| E13 (N_contacts) | 2 | 0 | 0 | 2 | 0 | 2 | 2 | 2 | 2 |
| E14 (TransZone Z) | 2 | 0 | 0 | 2 | 0 | 2 | 2 | 0 | 0 |
| E15 (CO3Poretype) | 0 | 0 | 0 | 0 | 0 | 0 | 0 | 0 | 0 |
| E16 (Diagen) | 0 | 0 | 0 | 0 | 0 | 0 | 0 | 0 | 0 |
| E17 (Min/PKS) | 0 | 0 | 0 | 0 | 0 | 0 | 0 | 0 | 0 |
| E18 (Fm Damage) | 1 | 3 | 3 | 0 | 3 | 2 | 2 | 1 | 1 |

MI_Wts LUT

| Static Q. | I1 (Well spacing) MI Wt | I2 (Hrz well prodn) MI Wt | I3 (Mult compl prodn) MI Wt | I4 (Comingled prodn) MI Wt | I5 (SS tree prodn) MI Wt | I6 (infill prodn) MI Wt |
|---|---|---|---|---|---|---|
| A1 (Depth) | 3 | 3 | 3 | 1 | 1 | 2 |
| A2 (DipAvg) | 0 | 2 | 3 | 1 | 1 | 1 |
| A3 (DipVar) | 2 | 0 | 0 | 0 | 0 | 2 |
| A4 (Form) | 0 | 0 | 0 | 0 | 0 | 0 |
| A5 (FltTrap) | 0 | 0 | 0 | 0 | 0 | 0 |
| A6 (CombTrap) | 0 | 0 | 0 | 0 | 0 | 0 |
| A7 (FltStyle) | 0 | 0 | 0 | 0 | 0 | 0 |
| A8 (FltTiming) | 0 | 0 | 0 | 0 | 0 | 0 |
| B1 (Ncmprt) | 3 | 3 | 2 | 2 | 2 | 3 |
| B2 (Npenetr) | 3 | 3 | 3 | 2 | 2 | 3 |
| C1 (DepoSystem) | 0 | 0 | 0 | 0 | 0 | 0 |
| C2 (ClasticDepoEnv) | 0 | 0 | 0 | 0 | 0 | 0 |
| C3 (Net-to-Gross) | 0 | 2 | 0 | 0 | 0 | 0 |
| C4 (AvGrThick) | 0 | 2 | 1 | 0 | 0 | 0 |
| C5 (Nunits) | 0 | 3 | 2 | 3 | 1 | 2 |
| C6 (P_comm) | 0 | 4 | 2 | 3 | 1 | 2 |
| C7 (FU_var) | 0 | 2 | 1 | 1 | 0 | 0 |
| D1 (RT_prop) | 0 | 0 | 0 | 0 | 0 | 0 |
| D2 (RT_pay) | 0 | 0 | 0 | 0 | 0 | 0 |
| E1 (MedPerm) | 2 | 2 | 3 | 3 | 0 | 2 |
| E2 (LatPermVar) | 3 | 3 | 2 | 2 | 0 | 3 |
| E3 (Fractures) | 2 | 4 | 2 | 2 | 0 | 2 |
| E4 (FracOrient) | 2 | 2 | 2 | 2 | 0 | 3 |
| E5 (Kv/Kh) | 0 | 3 | 3 | 4 | 0 | 2 |
| E6 (Thief) | 0 | 2 | 2 | 3 | 0 | 3 |
| E7 (HC_type) | 2 | 0 | 0 | 0 | 0 | 2 |
| E8 (API) | 2 | 1 | 1 | 2 | 2 | 2 |
| E9 (Psat) | 3 | 2 | 0 | 2 | 3 | 1 |
| E10 (Pdew) | 2 | 4 | 0 | 0 | 0 | 0 |
| E11 (Fluid_const) | 0 | 2 | 3 | 3 | 3 | 1 |
| E12 (Fluid_const) | 0 | 0 | 0 | 0 | 3 | 0 |
| E13 (N_contacts) | 3 | 3 | 3 | 3 | 0 | 2 |
| E14 (TransZone Z) | 0 | 2 | 2 | 2 | 0 | 1 |
| E15 (CO3Poretype) | 0 | 0 | 0 | 0 | 0 | 0 |
| E16 (Diagen) | 0 | 0 | 0 | 0 | 0 | 0 |
| E17 (MinPKS) | 0 | 0 | 0 | 0 | 0 | 0 |
| E18 (Fm Damage) | 2 | 2 | 2 | 3 | 3 | 2 |

MI_Wts LUT

| Static Q. | I7 (Initial stim) MI Wt | I8 (Sand Control) MI Wt | I9 (Artificial lift) MI Wt | I10 (Drawdown) MI Wt | I11 (Recompletions) MI Wt | I12 (Profile control) MI Wt |
|---|---|---|---|---|---|---|
| A1 (Depth) | 2 | 2 | 3 | 0 | 2 | 2 |
| A2 (DipAvg) | 1 | 1 | 2 | 1 | 1 | 4 |
| A3 (DipVar) | 0 | 0 | 0 | 0 | 0 | 0 |
| A4 (Form) | 0 | 0 | 0 | 0 | 0 | 0 |
| A5 (FltTrap) | 0 | 0 | 0 | 0 | 0 | 0 |
| A6 (CombTrap) | 0 | 0 | 0 | 0 | 0 | 0 |
| A7 (FltStyle) | 0 | 0 | 0 | 0 | 0 | 0 |
| A8 (FltTiming) | 0 | 0 | 0 | 0 | 0 | 0 |
| B1 (Ncmprt) | 0 | 0 | 0 | 1 | 0 | 0 |
| B2 (Npenetr) | 0 | 0 | 0 | 0 | 0 | 0 |
| C1 (DepoSystem) | 0 | 0 | 0 | 0 | 0 | 0 |
| C2 (ClasticDepoEnv) | 0 | 0 | 0 | 0 | 0 | 0 |
| C3 (Net-to-Gross) | 0 | 0 | 0 | 0 | 0 | 2 |
| C4 (AvGrThick) | 0 | 0 | 0 | 0 | 0 | 1 |
| C5 (Nunits) | 2 | 2 | 0 | 2 | 3 | 3 |
| C6 (F_comm) | 2 | 0 | 1 | 2 | 3 | 3 |
| C7 (FU_var) | 1 | 0 | 0 | 0 | 0 | 0 |
| D1 (RT_prop) | 0 | 0 | 0 | 0 | 0 | 0 |
| D2 (RT_pay) | 0 | 0 | 0 | 0 | 0 | 0 |
| E1 (MedPerm) | 3 | 0 | 4 | 3 | 2 | 1 |
| E2 (LatPermVar) | 2 | 0 | 1 | 2 | 2 | 2 |
| E3 (Fractures) | 3 | 0 | 0 | 2 | 2 | 3 |
| E4 (FracOrient) | 2 | 0 | 0 | 1 | 2 | 3 |
| E5 (Kv/Kh) | 0 | 0 | 0 | 2 | 2 | 2 |
| E6 (Thief) | 2 | 2 | 0 | 2 | 2 | 3 |
| E7 (HC_type) | 0 | 0 | 0 | 2 | 0 | 0 |
| E8 (API) | 0 | 0 | 2 | 3 | 0 | 0 |
| E9 (Psat) | 4 | 0 | 3 | 3 | 2 | 0 |
| E10 (Pdew) | 0 | 0 | 2 | 3 | 0 | 0 |
| E11 (Fluid_const) | 2 | 0 | 2 | 2 | 2 | 2 |
| E12 (Fluid_const) | 0 | 0 | 3 | 0 | 2 | 0 |
| E13 (N_contacts) | 0 | 0 | 0 | 1 | 3 | 2 |
| E14 (TransZone Z) | 0 | 0 | 0 | 4 | 2 | 3 |
| E15 (CO3Poretype) | 0 | 0 | 0 | 0 | 0 | 0 |
| E16 (Diagen) | 0 | 0 | 0 | 0 | 0 | 0 |
| E17 (Min/PKS) | 0 | 0 | 0 | 0 | 0 | 0 |
| E18 (Fm Damage) | 3 | 2 | 2 | 3 | 3 | 3 |

MI_Wts LUT

| Static Q. | J1 (Injectivity) MI Wt | J2 (Horiz / ML Inj) MI Wt | J3 (Mult compl Inj) MI Wt | J4 (Comingled Inj) MI Wt | J5 (SS tree Inj) MI Wt | J6 (Infill Inj) MI Wt | J7 (Inj stim) MI Wt | J8 (Inj sand control) MI Wt | J9 (Inj recompletions) MI Wt | J10 (Inj well prof control) MI Wt |
|---|---|---|---|---|---|---|---|---|---|---|
| A1 (Depth) | 0 | 3 | 2 | 0 | 0 | 2 | 3 | 2 | 2 | 2 |
| A2 (DipAvg) | 1 | 2 | 1 | 1 | 1 | 1 | 1 | 1 | 1 | 1 |
| A3 (DipVar) | 0 | 3 | 0 | 0 | 0 | 2 | 0 | 0 | 0 | 0 |
| A4 (Form) | 0 | 0 | 0 | 0 | 0 | 0 | 0 | 0 | 0 | 0 |
| A5 (FltTrap) | 0 | 0 | 0 | 0 | 0 | 0 | 0 | 0 | 0 | 0 |
| A6 (CombTrap) | 0 | 0 | 0 | 0 | 0 | 0 | 0 | 0 | 0 | 0 |
| A7 (FltStyle) | 0 | 0 | 0 | 0 | 0 | 0 | 0 | 0 | 0 | 0 |
| A8 (FltTiming) | 0 | 0 | 0 | 0 | 0 | 0 | 0 | 0 | 0 | 0 |
| B1 (Ncmprt) | 1 | 5 | 4 | 2 | 2 | 3 | 0 | 0 | 2 | 0 |
| B2 (Npenetr) | 1 | 3 | 2 | 2 | 2 | 3 | 0 | 0 | 2 | 0 |
| C1 (DepoSystem) | 0 | 0 | 0 | 0 | 0 | 0 | 0 | 0 | 0 | 0 |
| C2 (ClasticDepoEnv) | 0 | 0 | 0 | 0 | 0 | 0 | 0 | 0 | 0 | 0 |
| C3 (Net-to-Gross) | 1 | 2 | 0 | 0 | 0 | 0 | 0 | 0 | 0 | 1 |
| C4 (AvGrThick) | 1 | 3 | 0 | 0 | 0 | 0 | 0 | 0 | 0 | 0 |
| C5 (Nunits) | 2 | 3 | 2 | 2 | 2 | 2 | 0 | 0 | 3 | 3 |
| C6 (P_comm) | 2 | 3 | 2 | 3 | 2 | 2 | 0 | 0 | 3 | 3 |
| C7 (FU_var) | 1 | 0 | 0 | 0 | 0 | 0 | 0 | 0 | 0 | 0 |
| D1 (RT_prop) | 0 | 0 | 0 | 0 | 0 | 0 | 0 | 0 | 0 | 0 |
| D2 (RT_pay) | 0 | 0 | 0 | 0 | 0 | 0 | 0 | 0 | 0 | 0 |
| E1 (MedPerm) | 3 | 2 | 1 | 2 | 0 | 2 | 3 | 0 | 2 | 2 |
| E2 (LatPermVar) | 2 | 2 | 2 | 2 | 0 | 3 | 1 | 0 | 2 | 2 |
| E3 (Fractures) | 2 | 2 | 1 | 3 | 0 | 2 | 2 | 0 | 3 | 3 |
| E4 (FracOrient) | 2 | 3 | 2 | 2 | 0 | 3 | 2 | 0 | 2 | 2 |
| E5 (Kv/Kh) | 2 | 3 | 2 | 1 | 0 | 2 | 0 | 0 | 2 | 2 |
| E6 (Thief) | 2 | 3 | 2 | 3 | 0 | 2 | 2 | 2 | 3 | 3 |
| E7 (HC_type) | 2 | 0 | 0 | 0 | 0 | 0 | 0 | 0 | 0 | 0 |
| E8 (API) | 2 | 0 | 0 | 0 | 0 | 0 | 0 | 0 | 0 | 0 |
| E9 (Psat) | 2 | 1 | 1 | 2 | 0 | 1 | 0 | 0 | 0 | 0 |
| E10 (Pdew) | 0 | 0 | 0 | 0 | 0 | 0 | 0 | 0 | 0 | 0 |
| E11 (Fluid_const) | 2 | 0 | 0 | 0 | 0 | 0 | 2 | 0 | 2 | 2 |
| E12 (Fluid_const) | 0 | 0 | 0 | 0 | 0 | 0 | 0 | 0 | 2 | 0 |
| E13 (N_contacts) | 0 | 3 | 2 | 3 | 0 | 1 | 0 | 0 | 3 | 3 |
| E14 (TransZone Z) | 0 | 1 | 0 | 1 | 0 | 0 | 0 | 0 | 2 | 2 |
| E15 (CO3Poretype) | 0 | 0 | 0 | 0 | 0 | 0 | 0 | 0 | 0 | 0 |
| E16 (Diagen) | 3 | 0 | 0 | 0 | 0 | 0 | 3 | 1 | 0 | 0 |
| E17 (Min/PKS) | 0 | 0 | 0 | 0 | 0 | 0 | 0 | 0 | 0 | 0 |
| E18 (Fm Damage) | 3 | 0 | 0 | 0 | 0 | 2 | 3 | 2 | 3 | 3 |

| Dynamic Questions | Dynamic Q Ideal | F1 (Primary / 2ndary) BI_wt | F2 (3 yr recovery) | F3 (Total rec) | F4 (Aquifer size) | F5 (Aquifer imp) | F6 (Bubble Pt) | F7 (Res Force) | F8 (Mobility) | F9 (Fractures) |
|---|---|---|---|---|---|---|---|---|---|---|
| F1 Primary/EOR | 5 | 5 | 0 | 0 | 0 | 0 | 0 | 0 | 0 | 0 |
| F2 (3 yr recovery) | 5 | 5 | 0 | 0 | 0 | 0 | 0 | 0 | 0 | 0 |
| F3 (total recovery) | 5 | 5 | 0 | 2 | 0 | 0 | 0 | 0 | 0 | 0 |
| F4 (Aquifer size) | 5 | | | | 0 | 0 | 0 | 0 | 0 | 0 |
| F5 (Aquifer imp) | 5 | | | | 0 | 0 | 0 | 0 | 0 | 0 |
| F6 (Bubble Pt) | 5 | | | | 0 | 0 | 0 | 0 | 0 | 0 |
| F7 (Res Force) | 5 | | | | 0 | 0 | 0 | 0 | 0 | 0 |
| F8 (Mob Ratio) | 5 | | | | 0 | 0 | 0 | 0 | 0 | 0 |
| F9 (Fract imp) | 5 | | | | 0 | 0 | 0 | 0 | 0 | 0 |
| G1 (EOR WF) | 5 | | | | 0 | 0 | 0 | 0 | 0 | 0 |
| G2 (Injection fluid) | 5 | | | | 0 | 0 | 0 | 0 | 0 | 0 |
| G3 (Inj fluid compat) | 5 | | | | 0 | 0 | 0 | 0 | 0 | 0 |
| G4 (Injector locat) | 5 | | | | 0 | 0 | 0 | 0 | 0 | 0 |
| G5 (Injection rate) | 5 | | | | 0 | 0 | 0 | 0 | 0 | 0 |
| H1 (Excess H2O prodn) | 5 | 0 | | | 0 | 0 | 0 | 0 | 0 | 0 |
| H2 (H2O disposal) | 5 | 0 | | | 0 | 0 | 0 | 0 | 0 | 0 |
| H3 (Excess gas prodn) | 5 | 0 | | | 0 | 0 | 0 | 0 | 0 | 0 |
| H4 (Gas disposal) | 5 | 0 | | | 0 | 0 | 0 | 0 | 0 | 0 |
| I1 (Well spacing) | 5 | 0 | | | 0 | 0 | 0 | 0 | 0 | 0 |
| I2 (Hor well prodn) | 5 | 0 | 0 | 0 | 0 | 0 | 0 | 0 | 0 | 0 |
| I3 (Mult compl prodn) | 5 | 0 | 0 | 0 | 0 | 0 | 0 | 0 | 0 | 0 |
| I4 (Commingled prodn) | 5 | 0 | | | 0 | 0 | 0 | 0 | 0 | 0 |
| I5 (SS tree prodn) | 5 | 0 | 0 | 0 | 0 | 0 | 0 | 0 | 0 | 0 |
| I6 (Infill prodn) | 5 | 0 | | | 0 | 0 | 0 | 0 | 0 | 0 |
| I7 (Initial stim) | 5 | 0 | 0 | 0 | 0 | 0 | 0 | 0 | 0 | 0 |
| I8 (Sand Control) | 5 | 0 | 0 | 0 | 0 | 0 | 0 | 0 | 0 | 0 |
| I9 (Artificial lift) | 5 | 0 | 0 | 0 | 0 | 0 | 0 | 0 | 0 | 0 |
| I10 (Drawdown) | 5 | 0 | | | 0 | 0 | 0 | 0 | 0 | 0 |
| I11 (Recompletions) | 5 | 0 | 0 | 0 | 0 | 0 | 0 | 0 | 0 | 0 |
| I12 (Profile control) | 5 | 0 | 0 | 0 | 0 | 0 | 0 | 0 | 0 | 0 |
| J1 (Injectivity) | 5 | 0 | | | 0 | 0 | 0 | 0 | 0 | 0 |
| J2 (Horiz/ML Inj) | 5 | 0 | 0 | 0 | 0 | 0 | 0 | 0 | 0 | 0 |
| J3 (Mult compl Inj) | 5 | 0 | 0 | 0 | 0 | 0 | 0 | 0 | 0 | 0 |
| J4 (Commingled Inj) | 5 | 0 | | | 0 | 0 | 0 | 0 | 0 | 0 |
| J5 (SS tree Inj) | 5 | 0 | 0 | 0 | 0 | 0 | 0 | 0 | 0 | 0 |
| J6 (Infill Inj) | 5 | 0 | | | 0 | 0 | 0 | 0 | 0 | 0 |
| J7 (Inj stim) | 5 | 0 | 0 | 0 | 0 | 0 | 0 | 0 | 0 | 0 |
| J8 (Inj sand control) | 5 | 0 | 0 | 0 | 0 | 0 | 0 | 0 | 0 | 0 |
| J9 (Inj recompletions) | 5 | 0 | 0 | 0 | 0 | 0 | 0 | 0 | 0 | 0 |
| J10 (Inj well prof control) | 5 | 0 | 0 | 0 | 0 | 0 | 0 | 0 | 0 | 0 |

| Dynamic Questions | G1 (IOR RF) | G2 (Inj fluid) | G3 (Inj fluid compat) | G4 (Inj locus) | G5 (Inj rate) | H1 (Excess H2O prodn) | H2 (H2O disposal) | H3 (Excess gas prodn) | H4 (Gas disposal) |
|---|---|---|---|---|---|---|---|---|---|
| F1 Primary/IOR | | 0 | 0 | 0 | 0 | 0 | 0 | 0 | 0 |
| F2 (5 yr recovery) | | 0 | 0 | 0 | 0 | 0 | 0 | 0 | 0 |
| F3 (total recovery) | | 0 | 0 | 0 | 0 | 0 | 0 | 0 | 0 |
| F4 (Aquifer size) | | 0 | 0 | | | | | | |
| F5 (Aquifer loc) | | 0 | 0 | | | | | | |
| F6 (Outside IP) | | | 0 | | | 0 | | | |
| F7 (Mkt Forces) | | | 0 | | | | | | |
| F8 (Stimulation) | | | 0 | | | | | | |
| F9 (Fract Inst) | | | 0 | | | | | | |
| G1 (IOR RF) | 0 | 0 | 0 | 0 | 0 | 0 | 0 | 0 | 0 |
| G2 (Injection fluid) | | 0 | 0 | 0 | 0 | 0 | 0 | 0 | 0 |
| G3 (Inj fluid compat) | | 0 | 0 | 0 | 0 | 0 | 0 | 0 | 0 |
| G4 (Injector locus) | | 0 | 0 | 0 | 0 | 0 | 0 | 0 | 0 |
| G5 (Injection rate) | | 0 | 0 | 0 | 0 | 0 | 0 | 0 | 0 |
| H1 (Excess H2O prodn) | | 0 | 0 | 0 | 0 | 0 | 0 | 0 | 0 |
| H2 (H2O disposal) | | 0 | 0 | 0 | 0 | 0 | 0 | 0 | 0 |
| H3 (Excess gas prodn) | | 0 | 0 | 0 | 0 | 0 | 0 | 0 | 0 |
| H4 (Gas disposal) | | 0 | 0 | 0 | 0 | 0 | 0 | 0 | 0 |
| I1 (Well spacing) | | 0 | 0 | 0 | 0 | 0 | 0 | 0 | 0 |
| I2 (Hz well prodn) | 0 | 0 | 0 | 0 | 0 | 0 | 0 | 0 | 0 |
| I3 (Mult compl prodn) | 0 | 0 | 0 | 0 | 0 | 0 | 0 | 0 | 0 |
| I4 (Comingled prodn) | | 0 | 0 | 0 | 0 | 0 | 0 | 0 | 0 |
| I5 (SS tree prodn) | 0 | 0 | 0 | 0 | 0 | 0 | 0 | 0 | 0 |
| I6 (Infill prodn) | | 0 | 0 | 0 | 0 | 0 | 0 | 0 | 0 |
| I7 (Infill rate) | 0 | 0 | 0 | 0 | 0 | 0 | 0 | 0 | 0 |
| I8 (Sand Control) | 0 | 0 | 0 | 0 | 0 | 0 | 0 | 0 | 0 |
| I9 (Artificial lift) | 0 | 0 | 0 | 0 | 0 | 0 | 0 | 0 | 0 |
| I10 (Downtime) | 0 | 0 | 0 | 0 | 0 | | 0 | | 0 |
| I11 (Recompletions) | 0 | 0 | 0 | 0 | 0 | 0 | 0 | 0 | 0 |
| I12 (Profile control) | 0 | 0 | 0 | 0 | 0 | 0 | 0 | 0 | 0 |
| J1 (Injectivity) | | 0 | 0 | 0 | 0 | 0 | 0 | 0 | 0 |
| J2 (Horiz/ML Inj) | 0 | 0 | 0 | 0 | 0 | 0 | 0 | 0 | 0 |
| J3 (Mult compl Inj) | 0 | 0 | 0 | 0 | 0 | 0 | 0 | 0 | 0 |
| J4 (Comingled Inj) | 0 | 0 | 0 | 0 | 0 | 0 | 0 | 0 | 0 |
| J5 (SS tree Inj) | 0 | 0 | 0 | 0 | 0 | 0 | 0 | 0 | 0 |
| J6 (Infill Inj) | 0 | 0 | 0 | 0 | 0 | 0 | 0 | 0 | 0 |
| J7 (Inj site) | 0 | 0 | 0 | 0 | 0 | 0 | 0 | 0 | 0 |
| J8 (Inj sand control) | 0 | 0 | 0 | 0 | 0 | 0 | 0 | 0 | 0 |
| J9 (Inj recompletions) | 0 | 0 | 0 | 0 | 0 | 0 | 0 | 0 | 0 |
| J10 (Inj well prof control) | 0 | 0 | 0 | 0 | 0 | 0 | 0 | 0 | 0 |

| Dynamic Questions | I1 (Well spacing) | I2 (Hz well prodn) | I3 (Mult compl prodn) | I4 (Comingled prodn) | I5 (SS tree prodn) | I6 (Infill prodn) |
|---|---|---|---|---|---|---|
| F1 PrimaryEOR | 0 | 0 | 0 | 0 | 0 | 0 |
| F2 (5 yr recovery) | 0 | 0 | 0 | 0 | 0 | 0 |
| F3 (total recovery) | 0 | 0 | 0 | 0 | 0 | 0 |
| F4 (Aquifer size) | 2 | 1 | 1 | [illegible] | 0 | 2 |
| F5 (Aquifer type) | 2 | 2 | 1 | [illegible] | 0 | 1 |
| F6 (Bubble Pt) | 2 | 2 | 2 | 2 | 0 | 2 |
| F7 (Res Press) | 2 | 2 | 2 | 2 | 0 | 2 |
| F8 (Mobility) | 3 | 2 | 2 | 2 | 0 | 2 |
| F9 (Pract lmt) | 2 | 2 | 2 | 2 | 0 | 2 |
| G1 (EOR RF) | 0 | 0 | 0 | 0 | 0 | 0 |
| G2 (Injection fluid) | 0 | 0 | 0 | 0 | 0 | 0 |
| G3 (Inj fluid compat) | 0 | 0 | 0 | 0 | 0 | 0 |
| G4 (Injector locns) | 0 | 0 | 0 | 0 | 0 | 0 |
| G5 (Injection rate) | 0 | 0 | 0 | 0 | 0 | 0 |
| H1 (Excess H2O prodn) | 1 | 2 | 4 | 2 | 0 | 2 |
| H2 (H2O disposal) | 0 | 0 | 0 | 0 | 0 | 0 |
| H3 (Excess gas prodn) | 0 | 2 | 1 | 2 | 2 | 2 |
| H4 (Gas disposal) | 0 | 0 | 0 | 0 | 0 | 0 |
| I1 (Well spacing) | 0 | 0 | 0 | 0 | 0 | 0 |
| I2 (Hz well prodn) | 2 | 0 | 0 | 0 | 0 | 0 |
| I3 (Mult compl prodn) | 2 | 0 | 0 | 0 | 0 | 0 |
| I4 (Comingled prodn) | 2 | 0 | 0 | 0 | 0 | 0 |
| I5 (SS tree prodn) | 2 | 0 | 0 | 0 | 0 | 0 |
| I6 (Infill prodn) | 2 | 0 | 0 | 0 | 0 | 0 |
| I7 (Initial stim) | 1 | 0 | 0 | 0 | 2 | 0 |
| I8 (Sand Control) | 0 | 2 | 1 | 0 | 2 | 0 |
| I9 (Artificial lift) | 0 | 0 | 1 | [illegible] | 2 | 0 |
| I10 (Drawdown) | 0 | 1 | 1 | 2 | 1 | 2 |
| I11 (Recompletions) | 0 | 1 | 2 | 2 | 1 | 2 |
| I12 (Profile control) | 0 | 1 | 2 | 2 | 1 | 1 |
| J1 (Injectivity) | 0 | 0 | 0 | 0 | 0 | 0 |
| J2 (Horiz/ML Inj) | 0 | 0 | 0 | 0 | 0 | 0 |
| J3 (Mult compl Inj) | 0 | 0 | 0 | 0 | 0 | 0 |
| J4 (Comingled Inj) | 0 | 0 | 0 | 0 | 0 | 0 |
| J5 (SS tree Inj) | 0 | 0 | 0 | 0 | 0 | 0 |
| J6 (Infill Inj) | 0 | 0 | 0 | 0 | 0 | 0 |
| J7 (Inj stim) | 0 | 0 | 0 | 0 | 0 | 0 |
| J8 (Inj sand control) | 0 | 0 | 0 | 0 | 0 | 0 |
| J9 (Inj recompletions) | 0 | 0 | 0 | 0 | 0 | 0 |
| J10 (Inj well prof control) | 0 | 0 | 0 | 0 | 0 | 0 |

| Dynamic Questions | I7 (Initial stim) | I8 (Sand Control) | I9 (Artificial lift) | I10 (Drawdown) | I11 (Recompletions) | I12 (Profile control) |
|---|---|---|---|---|---|---|
| F1 Primary/IOR | 0 | 0 | 0 | 0 | 0 | 0 |
| F2 (5 yr recovery) | 0 | 0 | 0 | 0 | 0 | 0 |
| F3 (total recovery) | 0 | 0 | 0 | 0 | 0 | 0 |
| F4 (Aquifer size) | 0 | 0 | | | | |
| F5 (Aquifer loc) | 0 | 0 | | | | |
| F6 [illegible] | 0 | | | | | |
| F7 [illegible] | 0 | | | | | |
| F8 [illegible] | 0 | | | | | |
| F9 (Fract [illegible]) | | | | | | |
| | | | | | | |
| | | | | | | |
| | | | | | | |
| | | | | | | |
| G1 (IOR RF) | 0 | 0 | 0 | 0 | 0 | 0 |
| G2 (Injection fluid) | 0 | 0 | 0 | 0 | 0 | 0 |
| G3 (Inj fluid compat) | 0 | 0 | 0 | 0 | 0 | 0 |
| G4 (Injector locns) | 0 | 0 | 0 | 0 | 0 | 0 |
| G5 (Injection rate) | 0 | 0 | 0 | 0 | 0 | 0 |
| | | | | | | |
| | | | | | | |
| | | | | | | |
| | | | | | | |
| H1 (Excess H2O prodn) | 0 | 0 | | | | |
| H2 (H2O disposal) | 0 | 0 | 0 | 0 | 0 | 0 |
| H3 (Excess gas prodn) | 0 | 0 | | | | |
| H4 (Gas disposal) | 0 | 0 | 0 | 0 | 0 | 0 |
| | | | | | | |
| | | | | | | |
| | | | | | | |
| | | | | | | |
| I1 (Well spacing) | 0 | 0 | 0 | 0 | 0 | 0 |
| I2 (Hz well prodn) | 0 | 0 | 0 | 0 | 0 | 0 |
| I3 (Mult compl prodn) | 0 | 0 | 0 | 0 | 0 | 0 |
| I4 (Comingled prodn) | 0 | 0 | 0 | 0 | 0 | 0 |
| I5 (SS tree prodn) | 0 | 0 | 0 | 0 | 0 | 0 |
| I6 (Infill prodn) | 0 | 0 | 0 | 0 | 0 | 0 |
| I7 (Initial stim) | 0 | 0 | 0 | 0 | 0 | 0 |
| I8 (Sand Control) | 0 | 0 | 0 | 0 | 0 | 0 |
| I9 (Artificial lift) | 0 | 0 | 0 | 0 | 0 | 0 |
| I10 (Drawdown) | 0 | 0 | | 0 | 0 | 0 |
| I11 (Recompletions) | 0 | 0 | 0 | 0 | 0 | 0 |
| I12 (Profile control) | 0 | 0 | 0 | 0 | 0 | 0 |
| | | | | | | |
| | | | | | | |
| | | | | | | |
| | | | | | | |
| J1 (Injectivity) | 0 | 0 | 0 | 0 | 0 | 0 |
| J2 (Horiz/ML inj) | 0 | 0 | 0 | 0 | 0 | 0 |
| J3 (Mult compl inj) | 0 | 0 | 0 | 0 | 0 | 0 |
| J4 (Comingled inj) | 0 | 0 | 0 | 0 | 0 | 0 |
| J5 (SS tree inj) | 0 | 0 | 0 | 0 | 0 | 0 |
| J6 (Infill inj) | 0 | 0 | 0 | 0 | 0 | 0 |
| J7 (Inj stim) | 0 | 0 | 0 | 0 | 0 | 0 |
| J8 (Inj sand control) | 0 | 0 | 0 | 0 | 0 | 0 |
| J9 (Inj recompletions) | 0 | 0 | 0 | 0 | 0 | 0 |
| J10 (Inj well prof control) | 0 | 0 | 0 | 0 | 0 | 0 |

| Dynamic Questions | J1 (Injectivity) | J2 (Horiz / ML Inj) | J3 (Mult compl Inj) | J4 (Commingled Inj) | J5 (SS tree Inj) | J6 (Infill Inj) | J7 (Inj stim) | J8 (Inj sand control) | J9 (Inj recompletions) | J10 (Inj well prof control) |
|---|---|---|---|---|---|---|---|---|---|---|
| F1 Primary/IOR | 0 | 0 | 0 | 0 | 0 | 0 | 0 | 0 | 0 | 0 |
| F2 (5 yr recovery) | 0 | 0 | 0 | 0 | 0 | 0 | 0 | 0 | 0 | 0 |
| F3 (Total recovery) | 0 | 0 | 0 | 0 | 0 | 0 | 0 | 0 | 0 | 0 |
| F4 (Aquifer size) | 0 | 0 | 0 | 0 | 0 | | 0 | 0 | | |
| F5 (Aquifer Inst) | | 0 | 0 | 0 | 0 | | 0 | 0 | | |
| F6 (Mobile Fl) | | 0 | 0 | 0 | 0 | | 0 | 0 | | |
| F7 (Res Force) | | 0 | 0 | 0 | 0 | | 0 | 0 | | |
| F8 (MobRatio) | | | 0 | 0 | 0 | | 0 | 0 | | |
| F9 (Front Imp) | | | | | 0 | | | 0 | | |
| G1 (IOR RF) | 0 | 0 | 0 | 0 | 0 | 0 | 0 | 0 | 0 | 0 |
| G2 (Injection fluid) | | 0 | 0 | 0 | | 0 | 0 | 0 | 0 | 0 |
| G3 (Inj fluid compat) | | 0 | 0 | 0 | | 0 | 0 | 0 | 0 | 0 |
| G4 (Injector locat) | | 0 | | | 0 | | | 0 | | |
| G5 (Injection rate) | | 0 | 0 | 0 | 0 | 0 | 0 | 0 | 0 | 0 |
| H1 (Excess H2O prodn) | 0 | 0 | 0 | 0 | 0 | 0 | 0 | 0 | 0 | 0 |
| H2 (H2O disposal) | 0 | 0 | 0 | 0 | 0 | 0 | 0 | 0 | 0 | 0 |
| H3 (Excess gas prodn) | 0 | 0 | 0 | 0 | 0 | 0 | 0 | 0 | 0 | 0 |
| H4 (Gas disposal) | 0 | 0 | 0 | 0 | 0 | 0 | 0 | 0 | 0 | 0 |
| I1 (Well spacing) | 0 | 0 | 0 | 0 | 0 | 0 | 0 | 0 | 0 | 0 |
| I2 (Hrz well prodn) | 0 | 0 | 0 | 0 | 0 | 0 | 0 | 0 | 0 | 0 |
| I3 (Mult compl prodn) | 0 | 0 | 0 | 0 | 0 | 0 | 0 | 0 | 0 | 0 |
| I4 (Commingled prodn) | 0 | 0 | 0 | 0 | 0 | 0 | 0 | 0 | 0 | 0 |
| I5 (SS tree prodn) | 0 | 0 | 0 | 0 | 0 | 0 | 0 | 0 | 0 | 0 |
| I6 (Infill prodn) | 0 | 0 | 0 | 0 | 0 | 0 | 0 | 0 | 0 | 0 |
| I7 (Initial stim) | 0 | 0 | 0 | 0 | 0 | 0 | 0 | 0 | 0 | 0 |
| I8 (Sand Control) | 0 | 0 | 0 | 0 | 0 | 0 | 0 | 0 | 0 | 0 |
| I9 (Artificial lift) | 0 | 0 | 0 | 0 | 0 | 0 | 0 | 0 | 0 | 0 |
| I10 (Drawdown) | 0 | 0 | 0 | 0 | 0 | 0 | 0 | 0 | 0 | 0 |
| I11 (Recompletions) | 0 | 0 | 0 | 0 | 0 | 0 | 0 | 0 | 0 | 0 |
| I12 (Profile control) | 0 | 0 | 0 | 0 | 0 | 0 | 0 | 0 | | |
| J1 (Injectivity) | 0 | 0 | 0 | 0 | 0 | 0 | 0 | 0 | 0 | 0 |
| J2 (Horiz/ML Inj) | | 0 | 0 | 0 | 0 | 0 | 0 | 0 | 0 | 0 |
| J3 (Mult compl Inj) | | 0 | 0 | 0 | 0 | 0 | 0 | 0 | 0 | 0 |
| J4 (Commingled Inj) | | 0 | 0 | 0 | 0 | 0 | 0 | 0 | 0 | 0 |
| J5 (SS tree Inj) | | 0 | 0 | 0 | 0 | 0 | 0 | 0 | 0 | 0 |
| J6 (Infill Inj) | | 0 | 0 | 0 | 0 | 0 | 0 | 0 | 0 | 0 |
| J7 (Inj stim) | | 0 | 0 | 0 | | 0 | 0 | | 0 | 0 |
| J8 (Inj sand control) | | 0 | 0 | 0 | | 0 | | 0 | 0 | 0 |
| J9 (Inj recompletions) | | 0 | 0 | 0 | | | 0 | 0 | 0 | 0 |
| J10 (Inj well prof control) | | 0 | 0 | | | | 0 | 0 | 0 | 0 |

APPENDIX C: DESIGN AND OPERATION OF THE GRAPHIC FEEDBACK TOOL

The Graphic Feedback tool is based on a beta probability distribution. The standard form of the beta probability distribution is $f_X(x) = \frac{1}{B(p,q)} x^{p-1}(1-x)^{q-1}$ for $0 \le x \le 1$ where $B(p,q) = B(q,p) = \int_0^1 t^{p-1}(1-t)^{q-1}\,dt = \frac{\Gamma(p)\Gamma(q)}{\Gamma(p+q)}$ and $\Gamma(p) = \int_0^\infty t^{p-1}e^{-t}\,dt$.

The gamma function, $\Gamma(p)$, and hence, the beta function, $B(p,q)$, is numerically calculated using a polynomial approximation.

<u>Properties of the beta distribution</u>

The beta distribution function has the following properties:

1. mean $= E(X) = \frac{p}{p+q}$;
2. variance $= Var(X) = \frac{pq}{(p+q)^2(p+q+1)}$ (the expected value $p/(p+q)$ depends on the ratio $p/q$; if this ratio is kept constant, but $p$ and q both increased, then the variance decreases);
3. if $p > 1$ and $q > 1$, then the density function has a single mode at $x = \frac{p-1}{p+q-2}$; and 4. knowing the mean and variance, $\mu$ and $\sigma^2$, one can calculate the two parameters of the distribution with $p = \frac{\mu^2(1-\mu)}{\sigma^2} - \mu$ and $$q = p\frac{1-\mu}{\mu} = \left(\frac{\mu^2(1-\mu)}{\sigma^2}\right)\frac{1-\mu}{\mu}.$$

<u>Using the beta distribution in interactive mode</u>

The users' confidence in a given reservoir component definition is captured via the beta distribution in an interactive environment, which quantifies the users' input and provides instant feedback. To achieve this, the user is queried for an estimate and an associated "confidence factor" ranging from 0 to 5, with 5 representing the highest level of confidence (narrowest uncertainty). The estimate is then assumed to represent the mode (most likely value) of the component value and the confidence factor is transformed into a standard deviation. Given the desired mode and standard deviation, the $p$ and $q$ parameters of the beta distribution can then be derived. There is no simple analytical expression relating $p$ and $q$ to the mode and standard deviation, unlike the case when mean and standard deviation are known (see property 4 above). However, p and q can be calculated using the bisection method since the (p, q) combinations corresponding to a minimum variance case (an arbitrarily selected quasi-zero value) and the maximum variance case (that of the uniform distribution) can be defined. The bisection method is efficiently used to calculate the (p, q) pair which identifies any variance value that lies within the allowable variance range. It is then a trivial linear mapping of the confidence factor to the allowable variance range where a confidence factor of 0 represents the maximum variance case and a confidence factor of 5 represents minimum variance case.

What is claimed is:

1. A method for computing an evaluation index for an evaluation of a reservoir, the method comprising the steps of:

(a) making estimates of reservoir components which are associated with a subsurface reservoir evaluation;

(b) making estimates of confidence values for the estimates of the reservoir components; and (c) computing an evaluation index for the evaluation of the reservoir based upon at least one of the estimates of the reservoir components and the estimates of the confidence values.

2. The method of claim 1 further comprising:

(a) determining component complexity scores associated with the estimate of the reservoir components; and (b) computing a complexity index as the evaluation index based upon the complexity scores.

3. The method of claim 1 further comprising:

(a) determining confidence scores associated with the estimate of the confidence values; and (b) computing a confidence index as the evaluation index based upon the confidence scores.

4. The method of claim 1 wherein:

the reservoir components include at least one subsurface characteristic component.

5. The method of claim 1 wherein:

the reservoir components include at least one developmental scheme component of the reservoir.

6. The method of claim 1 wherein:

the reservoir components include at least one of a subsurface characteristic component and at least one developmental scheme characteristic.

7. The method of claim 1 wherein:

estimating confidence values is made in cooperation with a graphic feedback display which depicts at least one probability curve dependent upon the relative level of an estimated confidence value.

8. The method of claim 1 wherein:

at least one of the estimates of the reservoir components and the confidence values is made in response to literal and numerical descriptions.

9. The method of claim 1 wherein:

a complexity look-up table is used to establish the relationship between the estimate of reservoir components and their associated complexity scores.

10. The method of claim 9 wherein:

the complexity look-up table is updated using an experience based knowledge updating scheme.

11. The method of claim 1 wherein:

a non-linear weighting scheme is used in computing the complexity index.

12. The method of claim 11 wherein:

the weighting scheme is one an exponentiated power law average scheme and an arithmetic power law scheme and a logistic sigmoid exponential weighting scheme.

13. The method of claim 2 further comprising:

determining which of the estimates of the reservoir components is most outcome determinative in computing the complexity index.

14. The method of claim 13 further comprising:

(a) visually displaying an data input tree which includes input nodes representative of reservoir components and connecting branches leading to an output node representative of the overall complexity index; and (b) visually displaying which branch of the data input tree is most outcome determinative of the complexity index.

15. The method of claim 3 further comprising:

(a) visually displaying an data input tree which includes input nodes representative of reservoir components and connecting branches leading to an output node representative of the overall confidence index; and (b) visually displaying which branch of the data input tree is most outcome determinative of the confidence index.

16. The method of claim 1 wherein:

the evaluation index is a technical maturity index (TMI) for the reservoir evaluation which is a function of the confidence values for the reservoir components and a function of maturity index weights which relate the impact of uncertainty that a reservoir component will have on the predicted outcome of a reservoir evaluation.

17. The method of claim 16 wherein:

a maturity lookup table is used to determine the estimated maturity index weights.

18. The method of claim 16 further comprising:

determining which of the confidence scores associated with a reservoir component is most outcome determinative of the TMI score.

19. The method of claim 1 wherein a technical maturity index is calculated using the following formula:

$$TMI = \left[ \frac{\sum MI\_Wts * 5 - \sum MI\_Wts * \Delta conf}{\sum MI\_Wts * 5} \right]$$

where TMI=technical maturity index;

MI_Wts=maturity index weight; and

Δconf=confidence difference between perfect knowledge and the confidence score for an estimate of a reservoir component.

20. A computer readable media containing executable code for carrying out the operational steps of:

(a) making estimates of reservoir components which are associated with a subsurface reservoir evaluation;

(b) making estimates of confidence values for the estimates of the reservoir components; and (c) computing an evaluation index for the evaluation of the reservoir based upon at least one of the estimates of the reservoir components and the estimates of the confidence values.

21. The media of claim 20 further carrying out operational steps comprising:

(a) determining component complexity scores associated with the estimate of the reservoir components; and (b) computing a complexity index as the evaluation index based upon the complexity scores.

22. The media of claim 20 further carrying out operational steps comprising:

(a) determining confidence scores associated with the estimate of the confidence values; and (b) computing a confidence index as the evaluation index based upon the confidence scores.

23. The media of claim 20 wherein:

the reservoir components include at least one of a subsurface characteristic component and at least one developmental scheme characteristic.

24. The media of claim 20 wherein:

estimating confidence values is made in cooperation with a graphic feedback display which depicts at least one probability curve dependent upon the relative level of an estimated confidence value.

25. The media of claim 22 further carrying out the operational steps of:

(a) visually displaying an data input tree which includes input nodes representative of reservoir components and connecting branches leading to an output node representative of the overall complexity index; and (b) visually displaying which branch of the data input tree is most outcome determinative of the complexity index.

26. The media of claim 22 further carrying out the operational steps of:

(a) visually displaying an data input tree which includes input nodes representative of reservoir components and connecting branches leading to an output node representative of the overall confidence index; and (b) visually displaying which branch of the data input tree is most outcome determinative of the confidence index.

27. The media of claim 22 wherein:

the evaluation index is a technical maturity index (TMI) for the reservoir evaluation which is a function of the confidence values for the reservoir components and a function of maturity index weights which relate the impact of uncertainty that a reservoir component will have on the predicted outcome of a reservoir evaluation.

28. The media of claim 27 wherein:

the technical maturity index is calculated using the following formula:

$$TMI = \left[\frac{\Sigma MI\_Wts * 5 - \Sigma MI\_Wts * \Delta conf}{\Sigma MI\_Wts * 5}\right]$$

where TMI=technical maturity index;

MI_Wts=maturity index weight; and

Δconf=confidence difference between perfect knowledge and the confidence score for an estimate of a reservoir component.

* * * * *